(12) United States Patent
Verdura et al.

(10) Patent No.: US 7,366,643 B2
(45) Date of Patent: Apr. 29, 2008

(54) SYSTEM, METHOD, AND STORAGE MEDIUM FOR DETERMINING A PACKAGING DESIGN FOR A CONTAINER

(75) Inventors: Philip Verdura, West Bloomfield, MI (US); Jayson D. Pankin, Grosse Pointe Park, MI (US); William F. Eckenwiler, Ortonville, MI (US); Andrzej M. Pawlak, Rochester Hills, MI (US); Tammy L. Neil, Highland, MI (US); Kenneth E. Johnson, South Lyon, MI (US)

(73) Assignee: Delphi Technologies, Inc., Troy, MI (US)

(*) Notice: Subject to any disclaimer, the term of this patent is extended or adjusted under 35 U.S.C. 154(b) by 466 days.

(21) Appl. No.: 10/909,186

(22) Filed: Jul. 30, 2004

(65) Prior Publication Data

US 2005/0055181 A1 Mar. 10, 2005

Related U.S. Application Data

(63) Continuation-in-part of application No. 10/393,027, filed on Mar. 20, 2003, now Pat. No. 7,085,687.

(60) Provisional application No. 60/548,041, filed on Feb. 25, 2004, provisional application No. 60/492,383, filed on Aug. 4, 2003.

(51) Int. Cl.
G06F 17/50 (2006.01)
B65B 3/02 (2006.01)

(52) U.S. Cl. .................... 703/1; 703/7; 53/452; 700/96

(58) Field of Classification Search .................... 703/1, 703/2, 7; 707/104.1, 102; 53/474, 452; 700/98, 118
See application file for complete search history.

(56) References Cited

U.S. PATENT DOCUMENTS

| 4,815,190 | A | * | 3/1989 | Haba et al. .................... 29/430 |
| 5,656,799 | A | | 8/1997 | Ramsden et al. ............... 177/2 |
| 6,151,582 | A | * | 11/2000 | Huang et al. ................... 705/8 |
| 6,721,762 | B1 | | 4/2004 | Levine et al. ............ 707/104.1 |
| 6,957,186 | B1 | * | 10/2005 | Guheen et al. .................. 705/1 |
| 7,085,687 | B2 | * | 8/2006 | Eckenwiler et al. ........... 703/1 |
| 2001/0017023 | A1 | | 8/2001 | Armington et al. ........... 53/472 |
| 2003/0163292 | A1 | | 8/2003 | Eckenwiler et al. ........... 703/1 |
| 2003/0195824 | A1 | * | 10/2003 | Duffy et al. .................. 705/26 |
| 2004/0127341 | A1 | * | 7/2004 | Kung et al. .................. 493/352 |
| 2006/0089865 | A1 | * | 4/2006 | Mazur et al. .................. 705/8 |

* cited by examiner

*Primary Examiner*—Thai Phan
(74) *Attorney, Agent, or Firm*—Douglas D. Fekete

(57) ABSTRACT

A system, method, and storage medium for determining packaging design for one or more containers are provided. The method includes selecting at least one 3-D CAD model of a manufactured part. The method further includes selecting a first 3-D CAD model of a first container defining a first receiving region. The method further includes automatically generating a first plurality of 3-D part packaging designs for the first receiving region wherein each 3-D part packaging design comprises a distinct orientation or positioning of at least the 3-D CAD model of the manufactured part and a second 3-D CAD model and selecting a first 3-D part packaging design from the first plurality of 3-D part packaging designs. The method further includes generating a first dunnage design based on the first 3-D part packaging design and the first receiving region, wherein a first volume defined by the first 3-D part packaging design and the first dunnage design can be held within the first receiving region.

29 Claims, 49 Drawing Sheets

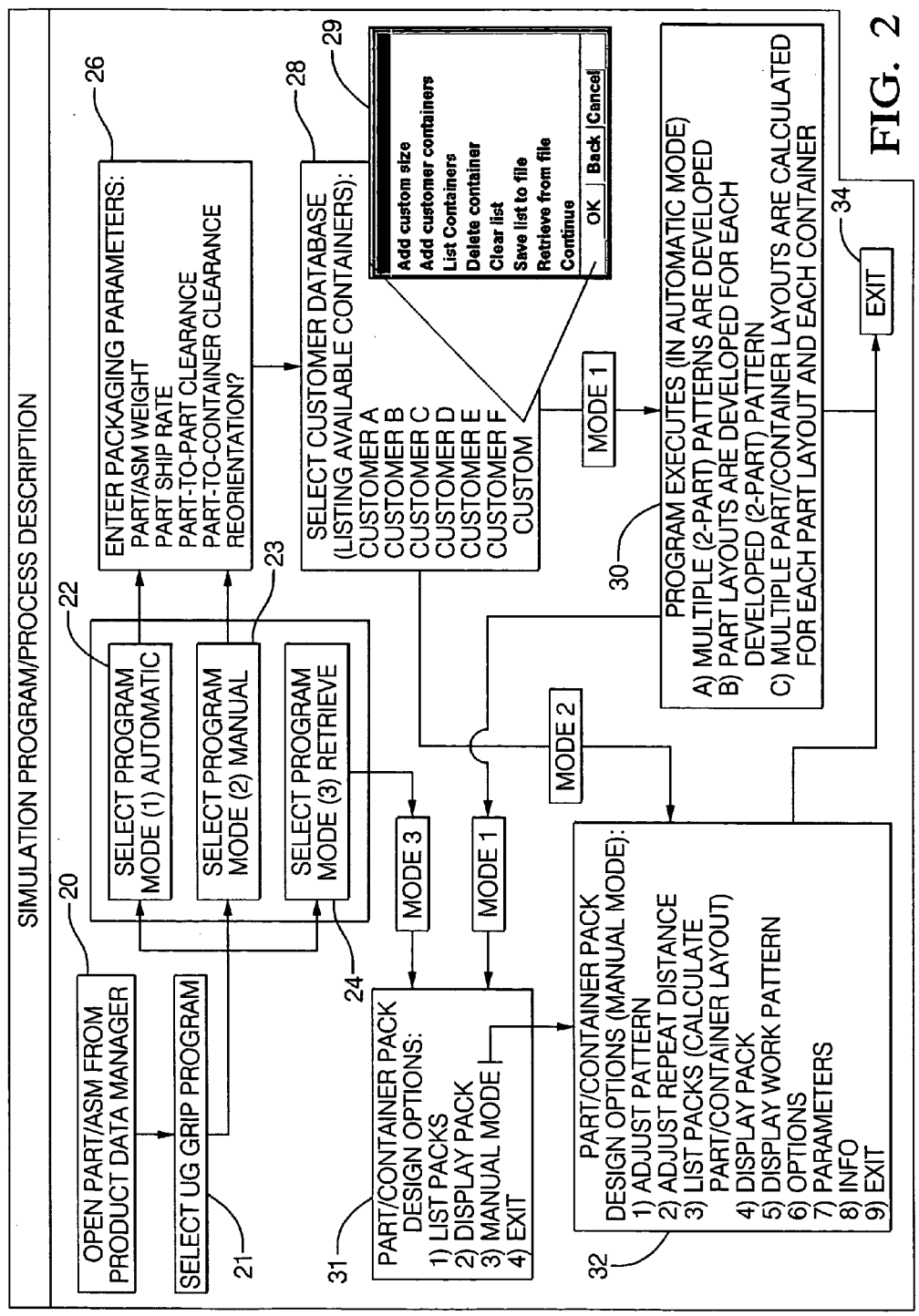

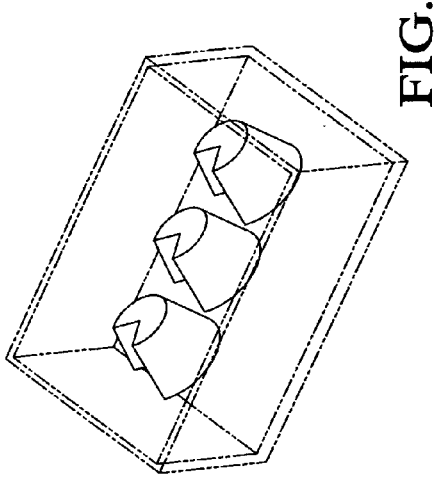
FIG. 32 A
NON-DESIRED PART ORIENTATION
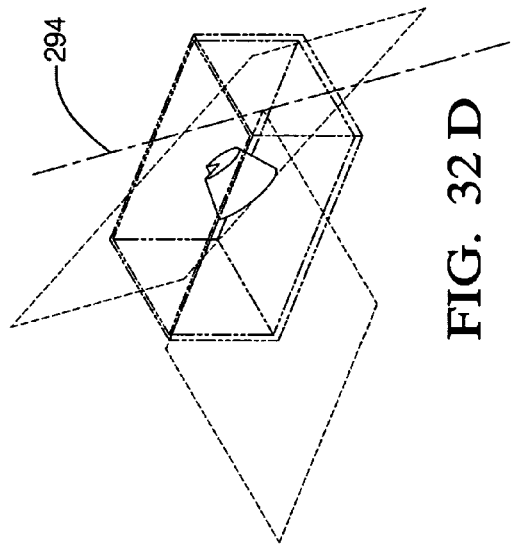
FIG. 32 B
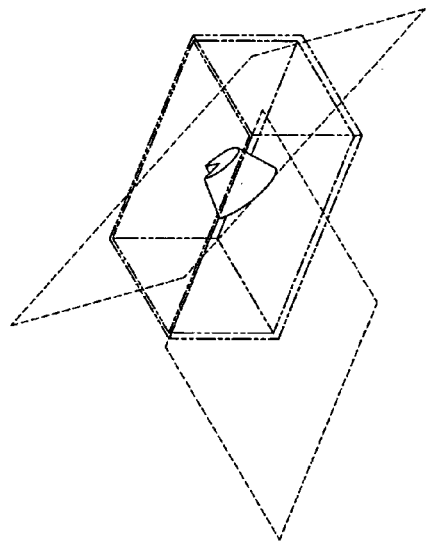
FIG. 32 C
FIG. 32 D

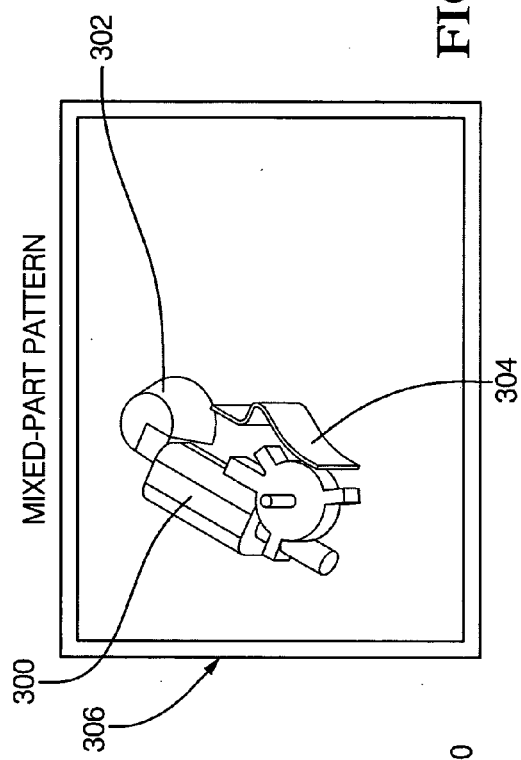
FIG. 33 D
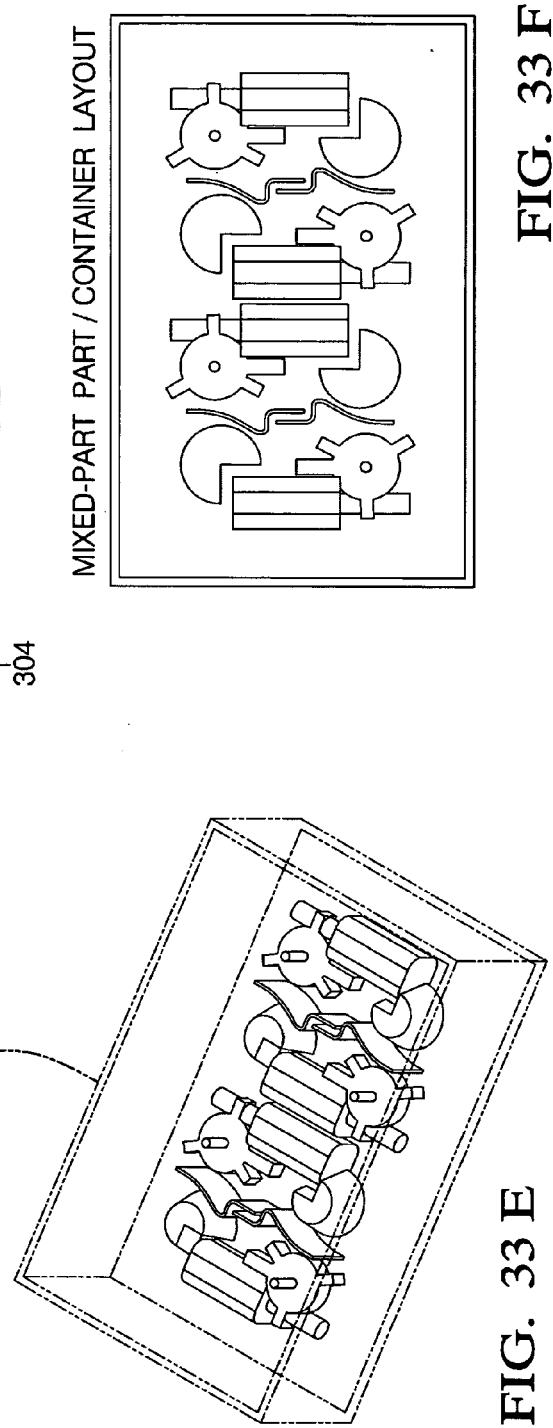
FIG. 33 F
FIG. 33 E

US 7,366,643 B2

SYSTEM, METHOD, AND STORAGE MEDIUM FOR DETERMINING A PACKAGING DESIGN FOR A CONTAINER

CROSS REFERENCE TO RELATED APPLICATIONS

This application is a Continuation-In-Part of U.S. patent application Ser. No. 10/393,027, filed Mar. 20, 2003 now U.S. Pat. No. 7,085,687, the contents of which are incorporated herein by reference thereto. U.S. patent application Ser. No. 10/393,027 claims priority to U.S. patent application Ser. No. 09/910,989, filed on Jul. 23, 2001, now abandoned, the contents of which are incorporated herein by reference thereto. This application also claims priority to U.S. provisional patent application Ser. No. 60/492,383, filed on Aug. 4, 2003, the contents of which are incorporated herein by reference thereto. This application also claims priority to U.S. provisional patent application Ser. No. 60/548,041, filed on Feb. 25, 2004, the contents of which are incorporated herein by reference thereto.

TECHNICAL FIELD

This application relates to a system, method, and storage medium for determining a packaging design for one or more containers and for determining transportation costs associated with the packaging design.

BACKGROUND

Manufactured products are generally held within containers while transporting the products from a departure location to a destination location. To develop a part-packaging configuration for a plurality of parts within a container, industrial and packaging engineers generally use a "best guess" methodology and manually align physical parts/assemblies in the container. However, manually aligning a plurality of parts at different positions and orientations in a plurality of containers is labor-intensive and time consuming. Further, an optimal packaging design may not be obtained utilizing this manual methodology which results in containers being used that hold fewer than an optimal number of parts.

Further, the containers generally hold dunnage therein for further supporting the manufactured parts within the containers. Industrial and packaging engineers generally manually develop the dunnage design for holding a part. Thus, the current design process for developing the dunnage design is labor-intensive and time consuming.

Still further, during the packaging design, packaging engineers do not currently have the ability to quickly determine and reduce transportations costs associated with a packaging design. Thus, the resultant packaging design may result in relatively high transportation costs that are not determined until extremely late in a life-cycle of a manufactured part.

Accordingly, there is a need for a system, method and storage medium for determining an optimal packaging design for a container and for reducing and/or minimizing transportation costs associated with the packaging design.

SUMMARY

A method for determining a packaging design for one or more containers in accordance with an exemplary embodiment is provided. The method includes selecting at least one 3-D CAD model of a manufactured part. The method further includes selecting a first 3-D CAD model of a first container defining a first receiving region. The method further includes automatically generating a first plurality of 3-D part packaging designs for the first receiving region wherein each 3-D part packaging design comprises a distinct orientation or positioning of at least the 3-D CAD model of the manufactured part and a second 3-D CAD model and selecting a first 3-D part packaging design from the first plurality of 3-D part packaging designs. The method further includes generating a first dunnage design based on the first 3-D part packaging design and the first receiving region, wherein a first volume defined by the first 3-D part packaging design and the first dunnage design can be held within the first receiving region.

A system for determining a packaging design for one or more containers in accordance with another exemplary embodiment is provided. The system includes a database storing a 3-D CAD model of a manufactured part and a first 3-D CAD model of a first container defining a first receiving region. The system further includes a computer operably coupled to the database. The computer is configured to retrieve both the 3-D CAD model of the manufactured part and the first 3-D CAD model of the first container from the database. The computer is further configured to automatically generate a first plurality of 3-D part packaging designs for the first receiving region wherein each 3-D part packaging design comprises a distinct orientation or positioning of at least the 3-D CAD model of the manufactured part and a second 3-D CAD model and to select a first 3-D part packaging design from the first plurality of 3-D part packaging designs. The computer is further configured to generate a first dunnage design based on the first 3-D part packaging design and the first receiving region, wherein a first volume defined by the first 3-D part packaging design and the first dunnage design can be held within the first receiving region.

A method for estimating transportation costs for transporting manufactured parts from a departure location to a destination location in accordance with another exemplary embodiment is provided. The method includes selecting at least one 3-D CAD model of a manufactured part. The method further includes determining a number of manufactured parts to be transported from the departure location to the destination location. The method further includes selecting a vehicle type for transporting the manufactured parts. The method further includes selecting a 3-D CAD model of a container defining a receiving region. The method further includes automatically generating a plurality of 3-D part packaging designs for the receiving region wherein each 3-D part packaging design comprises a distinct orientation or positioning of at least the 3-D CAD model of the manufactured part and a first 3-D CAD model and selecting a first 3-D part packaging design from the plurality of 3-D part packaging designs. The method further includes automatically determining a number of containers for transporting the manufactured parts based on the first 3-D part packaging design and the number of manufactured parts to be transported. The method further includes automatically determining a number of vehicles for transporting the manufactured parts based on the number of containers to be transported and a number of containers that can be held with the cargo volume of the selected vehicle type. Finally, the method includes automatically determining an overland transportation cost associated with transporting the parts from the departure location to the destination location based on the number of vehicles.

A method for estimating a cost of dunnage for protecting parts while transporting manufactured parts in accordance with another exemplary embodiment is provided. The method includes selecting at least one 3-D CAD model of a manufactured part. The method further includes determining a desired number of manufactured parts to transport. The method further includes selecting a 3-D CAD model of a container defining a receiving region. The method further includes automatically generating a plurality of 3-D part packaging designs for the receiving region wherein each 3-D part packaging design comprises a distinct orientation or positioning of at least the 3-D CAD model of the manufactured part and a second 3-D CAD model and selecting a first 3-D part packaging design from the plurality of 3-D part packaging designs. The method further includes selecting a type of dunnage to be used in the container. The method further includes automatically determining a desired amount of dunnage for the selected type of container based on the first 3-D part packaging design and the type of container. Finally, the method includes automatically determining a cost of the selected type of dunnage based on the amount of the dunnage to be used in the container and a number of the containers to be utilized for holding the desired number of manufactured parts.

A storage medium encoded with machine-readable program code for determining a packaging design for one or more containers in accordance with another exemplary embodiment is provided. The program code includes instructions for causing a processor to implement a method. The method includes selecting at least one 3-D CAD model of a manufactured part. The method further includes selecting a first 3-D CAD model of a first container defining a first receiving region. The method further includes automatically generating a first plurality of 3-D part packaging designs for the first receiving region wherein each 3-D part packaging design comprises a distinct orientation or positioning of at least the 3-D CAD model of the manufactured part and a second 3-D CAD model and selecting a first 3-D part packaging design from the first plurality of 3-D part packaging designs. The method further includes generating a first dunnage design based on the first 3-D part packaging design and the first receiving region, wherein a first volume defined by the first 3-D part packaging design and the first dunnage design can be held within the first receiving region.

A storage medium encoded with machine-readable program code for estimating transportation costs for transporting manufactured parts from a departure location to a destination location in accordance with another exemplary embodiment is provided. The program code includes instructions for causing a processor to implement a method. The method includes selecting at least one 3-D CAD model of a manufactured part. The method further includes determining a number of manufactured parts to be transported from the departure location to the destination location. The method further includes selecting a vehicle type for transporting the manufactured parts. The method further includes selecting a 3-D CAD model of a container defining a receiving region. The method further includes automatically generating a plurality of 3-D part packaging designs for the receiving region wherein each 3-D part packaging design comprises a distinct orientation or positioning of at least the 3-D CAD model of the manufactured part and a first 3-D CAD model and selecting a first 3-D part packaging design from the plurality of 3-D part packaging designs. The method further includes automatically determining a number of containers for transporting the manufactured parts based on the first 3-D part packaging design and the number of manufactured parts to be transported. The method further includes automatically determining a number of vehicles for transporting the manufactured parts based on the number of containers to be transported and a number of containers that can be held with the cargo volume of the selected vehicle type. Finally, the method includes automatically determining an overland transportation cost associated with transporting the parts from the departure location to the destination location based on the number of vehicles.

A storage medium encoded with machine-readable program code for estimating a cost of dunnage for protecting parts while transporting manufactured parts in accordance with another exemplary embodiment is provided. The program code includes instructions for causing a processor to implement a method. The method includes selecting at least one 3-D CAD model of a manufactured part. The method further includes determining a desired number of manufactured parts to transport. The method further includes selecting a 3-D CAD model of a container defining a receiving region. The method further includes automatically generating a plurality of 3-D part packaging designs for the receiving region wherein each 3-D part packaging design comprises a distinct orientation or positioning of at least the 3-D CAD model of the manufactured part and a second 3-D CAD model and selecting a first 3-D part packaging design from the plurality of 3-D part packaging designs. The method further includes selecting a type of dunnage to be used in the container. The method further includes automatically determining a desired amount of dunnage for the selected type of container based on the first 3-D part packaging design and the type of container. Finally, the method includes automatically determining a cost of the selected type of dunnage based on the amount of the dunnage to be used in the container and a number of the containers to be utilized for holding the desired number of manufactured parts.

The above-described and other features and advantages of the present invention will be appreciated and understood by those skilled in the art from the following detailed description, drawings, and appended claims.

BRIEF DESCRIPTION OF THE DRAWINGS

FIG. 2B is a diagrammatic illustration of portions of a manual mode portion of the control algorithm for the packaging optimization method of an exemplary embodiment of the present invention;

DESCRIPTION OF EXEMPLARY EMBODIMENTS

Figure 1:
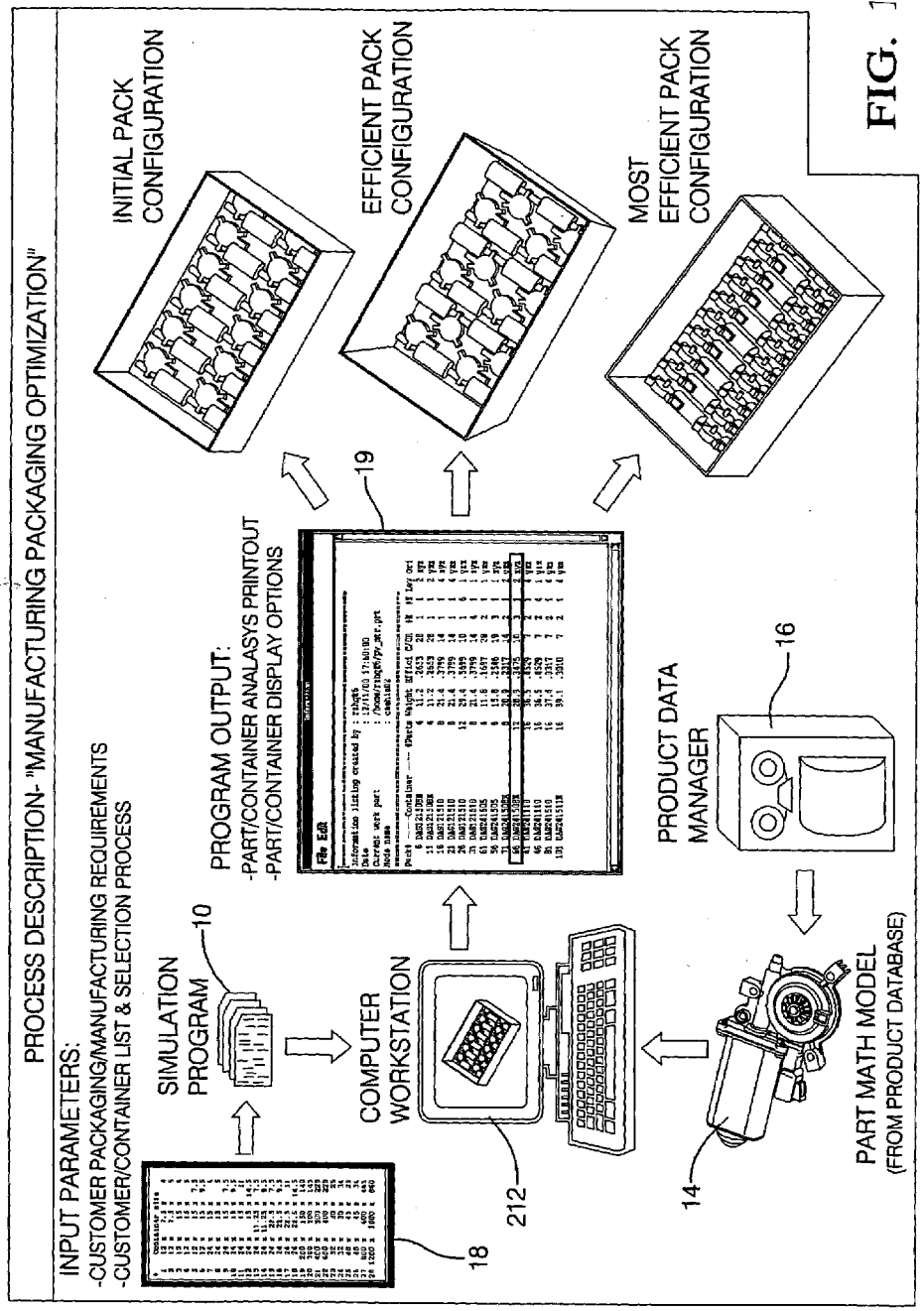
FIG. 1 is a schematic illustration of the packaging optimization process of an exemplary embodiment of the present invention.

Disclosed herein is a system, method, and storage medium for determining a substantially optimal packaging design for a container. In particular, the system, method, and storage medium can be used to collaboratively optimize the packaging design for storing manufactured parts in a container at any time during a life cycle of the part. The life-cycle of the part being from either (i) conception through production of the part, or (ii) during production of the part. The system utilizes 3-D packaging simulation technology to enable various players or stakeholders in the product life cycle to provide input wherein their specific design considerations may be viewed, considered and modified in view of specific design considerations of other related players or stake holders.

The various stakeholders provide inputs such as a 3-D model of a part, a 3-D model of a container, container costs, availability, reusability, required dunnage, product orientation, requested product flow, part to container density, for example, to a 3-D packaging simulation program wherein a substantially optimized packaging configuration for a selected container is provided. As used herein the term "container" is intended to include any configurable item whether enclosed, open, stackable, reusable, disposable, related to product use and any equivalents thereof, whose parameters may be provided for use in simulations in accordance with exemplary embodiments of the present invention or may be items constructed and/or designed in accordance with exemplary embodiments of the present invention. Non-limiting examples of configurable items include trays, racks, returnable packaging, pallets, as well as boxes, hand held containers, collapsible containers, enclosed containers, partially enclosed containers, stackable racks and trays configured for insertion into containers, tubes, spherical containers, rectangular trays, or combinations thereof. Other examples are types of items sold by for example, Creative Techniques Inc.

The selected container and packaging configuration including dunnage will be a culmination of a collaborative engineering process wherein 3-D modeling simulations are employed. Accordingly, product price is reduced by removing cost associated with shipping and the modeling programs will simulate collaboration in advance of production whereby consensus driven pack layouts are determined in advance of production. These predetermined pack layouts will reduce material and handling costs as well as lower freight and warehousing costs by managing transportations of products prior to their production.

Also, and in an alternative embodiment when applying the simulation programs of exemplary embodiments to requests for quotations on business not yet obtained, which may require product design, by obtaining in advance the customer packing requirements, weight limits, part-to-part clearance, part volume flow, part orientation and preferred containers a simulation program can be run and collaborative engineering techniques can be employed to provide business quotations which not only meet design requirements but also factor in shipping requirements.

Referring now to FIGS. 1-20, a method for substantially optimizing a packaging design of one or more manufactured parts to be transported in accordance with an exemplary embodiment is illustrated. The method may be implemented using a simulation software program 10 that is executed on a computer 212. In response to a request for an input of the item to be used in the simulation, the program runs in either a manual, automatic or retrieval mode.

The item inputted is a computer aided design (CAD) model representation 14 of the physical part/assembly to be transported. In the exemplary embodiment, the CAD model comprises a 3-D solid model. In an alternate embodiment, the CAD model comprises a 3-D wireframe model, or any other electronically storable model of a 3-D part design known to those skilled in the art. This computer model is selected from a product database 16. For example, model 14 can be a CAD representation of an automotive part such as a window regulator motor. Of course, the simulated part may be any part capable of being represented by a computer aided design model. Further, model 14 may be a CAD representation of a part still under development or in a design stage. Further, and in accordance with exemplary embodiments of the present invention and through collaborative engineering techniques of the present invention the design of the part may change based upon the output of one or more modeling simulations.

It is also contemplated that the part used may be for an existing production part or part of a competitive bid process wherein the simulations of exemplary embodiments are used to provide a quotation for business wherein a collaborative engineering process for a lean product life cycle is employed in order to provide the most competitive bid. It is, of course, understood in these applications product parameters such as but not limited to weight limits, part/container clearance, part volume/flow, part constraints and/or orientation and preferred container listings are solicited from the potential customer in advance of the operation of the simulation. Of course, these simulations may be run internally within a business entity.

The simulation arranges model 14 (primary) with a duplicate model (secondary) in a variety of configurations for both the primary and the secondary. Here, these two configured parts serve as the unit of measure for the development of part/container layouts. These unit patterns are oriented into six unique pattern orientations, which are considered for each packaging container. These six orientations relate to movement of the configured patterns about the x, y and z axis. Each of these pattern orientations is considered for each packaging container available from a container database 18. Accordingly, program 10 analyzes many arrangements of the model and numerous configurations for comparison to multiple containers in order to provide the most efficient configuration.

Upon completion of the simulation the most efficient packaging configuration is determined with reference to the container size, the number of parts incorporated into the container, the overall weight of the container and efficiency of the pack configuration.

Figure 2A:
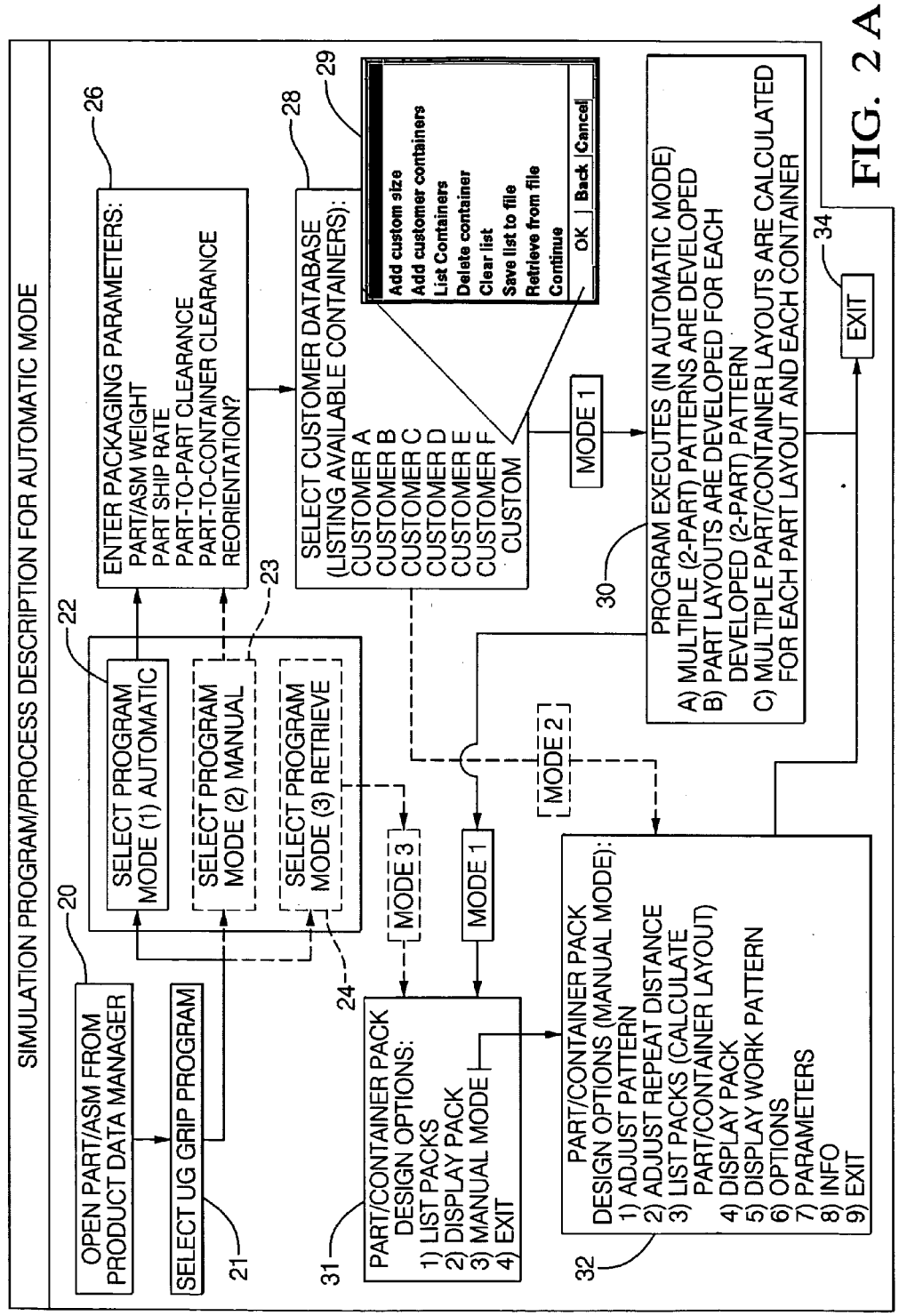
FIG. 2A is a diagrammatic illustration of portions of an automatic mode portion of the control algorithm for the packaging optimization method of an exemplary embodiment of the present invention.
Figure 2:
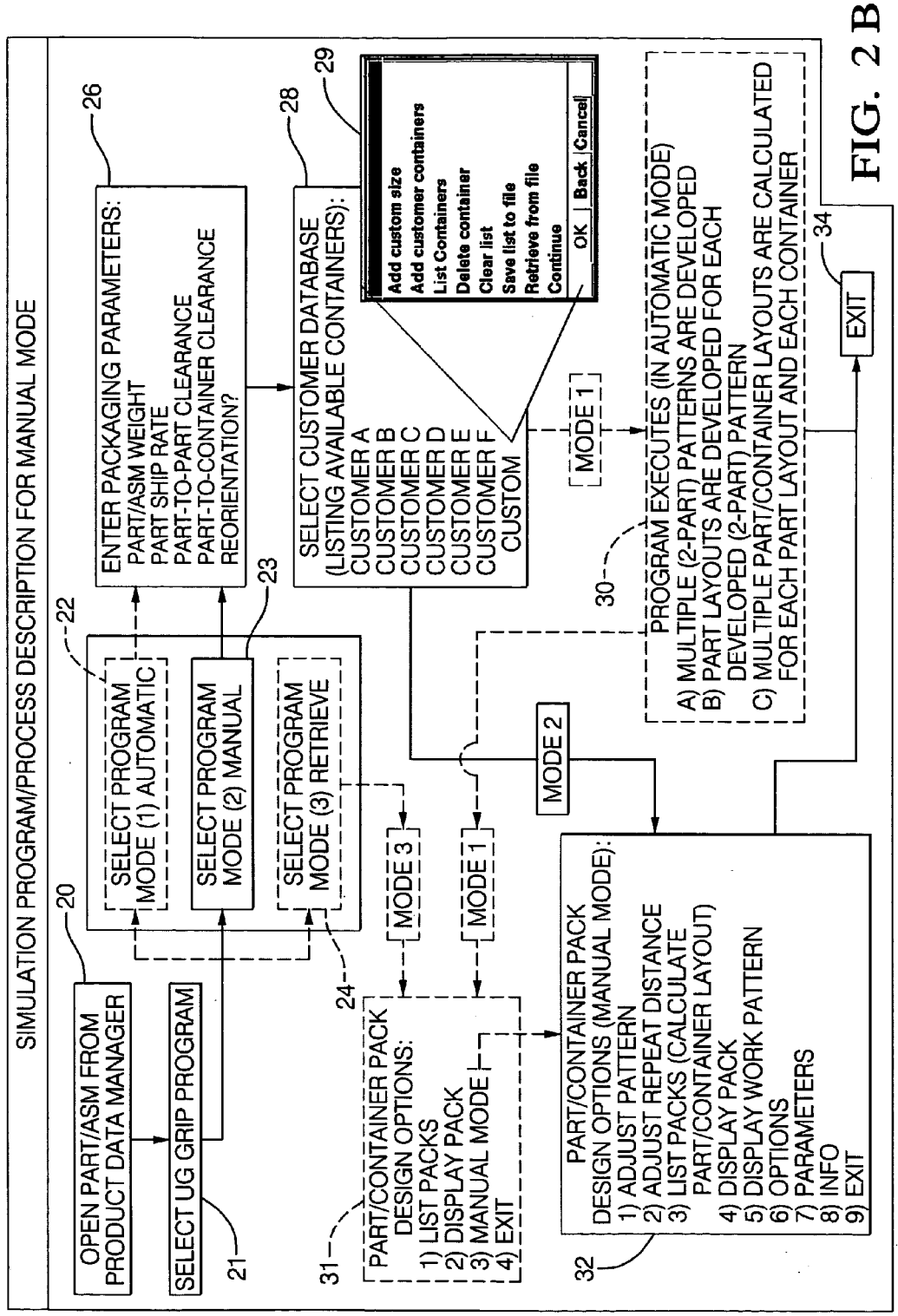
FIG. 2 is a diagrammatic illustration of portions of a control algorithm for the packaging optimization method of an exemplary embodiment of the present invention.

Referring to FIG. 2, the operation of program 10 is illustrated schematically. The program user executes step 20 to open the file for a CAD model 14 from the product database 16. The program user selects the packaging simulation program 21 from a database 16.

Figure 2C:
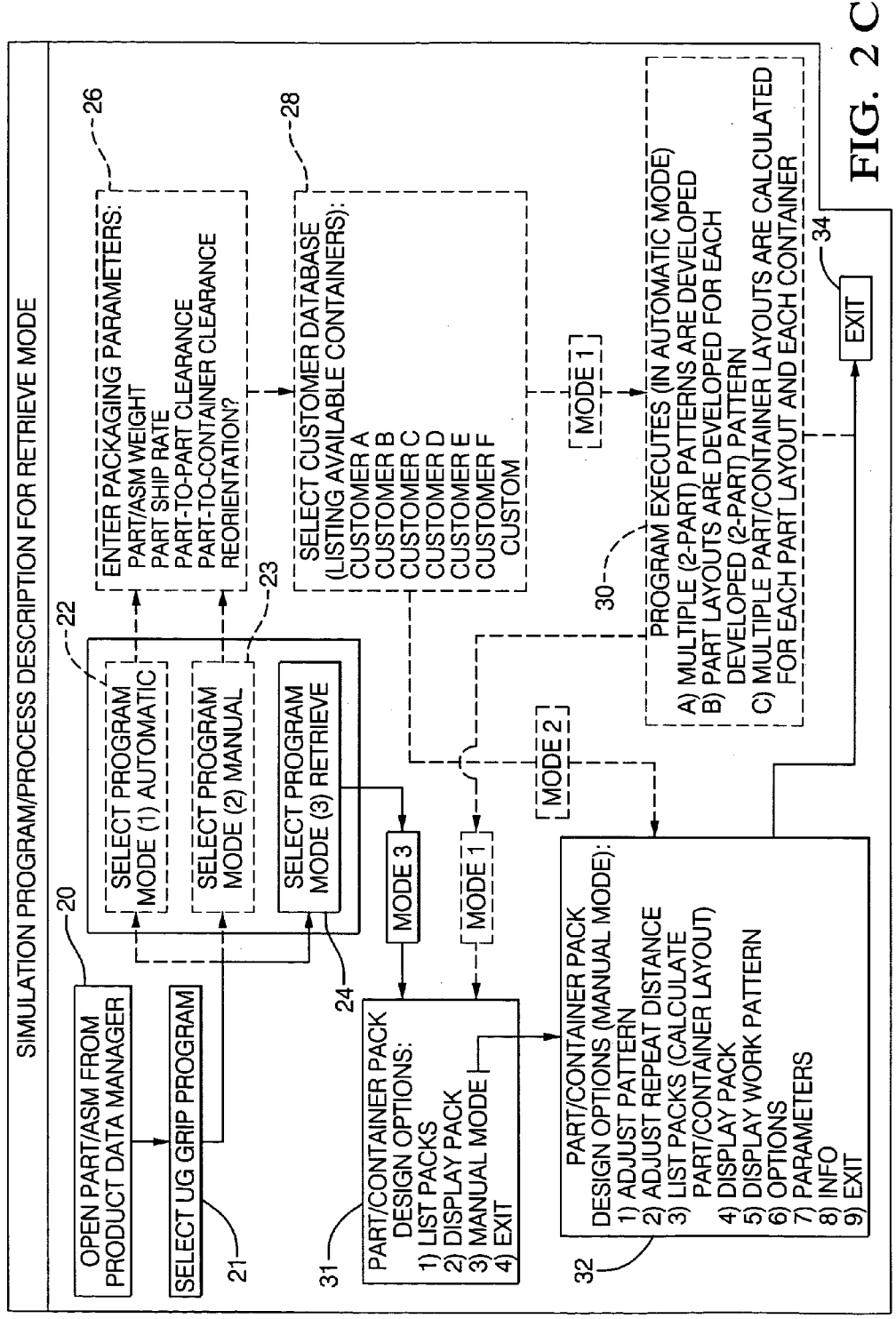
FIG. 2C is a diagrammatic illustration of portions of a retrieval mode portion of the control algorithm for the packaging optimization method of an exemplary embodiment of the present invention.

The simulation program prompts the user to select the packaging mode option to be used by the program, either step 22, 23 or 24. In this embodiment there are three options; step 22 is the option for the automatic mode (FIG. 2A), step 23 is the option for the manual mode (FIG. 2B), and step 24 is the option for the retrieval mode (FIG. 2C).

A saved pack layout is opened from a database 16 with the selection of the retrieval mode 24. And the packaging simulation program 21 advances to step 31, where the program user can interact with the saved data through display and printout options.

The simulation program will run faster with a simplified CAD part model, (i.e., a simplified CAD model representation of the original CAD model), than say that of the actual CAD part model that is available from the product database. Therefore, pack layouts can be created (and saved) using the simplified CAD part model. And these pack-layouts are then retrieved after the original CAD part model has been opened, with the intent of "fine-tuning" the two-part pattern. This allows for improved pack-layout efficiencies when using the Manual mode of the simulation program.

If either the manual or automatic mode is selected, the simulation program advances to step 26. The program user is then prompted to enter packaging parameters, which include but are not limited to the following items; part weight, part ship rate, part to part clearance, part to container clearance, and part orientation options (or limitations).

Once the packaging parameters are inputted at step 26, the simulation program advances to step 28, and the program user is prompted to select a customer container database that includes the listing of available containers for multiple customers. Each customer container database in 28 has the listing of available containers and the selection criteria (if applicable) for choosing the appropriate container. With selecting the 'CUSTOM' option in step 28, the program user can create a new container database in step 29. The 'CUSTOM' option 29 includes: creating a unique list of containers by selecting any number of customer databases and/or by individually defining container sizes; saving and retrieving the newly created container list; and displaying options for listing and clearing the container list.

Referring to FIG. 2, if the manual mode is selected in step 23, then step 32 provides the program user with a plurality of part/container pack design options. These options include but are not limited to the following: adjustment of the pattern, adjustment of the repeat distance, lists packs, display packs, displays of the work pattern, available options, parameters, information and of course an exit prompt. All of these options in step 32 are interactive and can be continuously selected until the exit option is selected. Additionally, the options of steps 32 are presented to the program user in the recommended order of usage. Although these options are in the order of recommended usage the order of their usage may vary.

Figure 3:
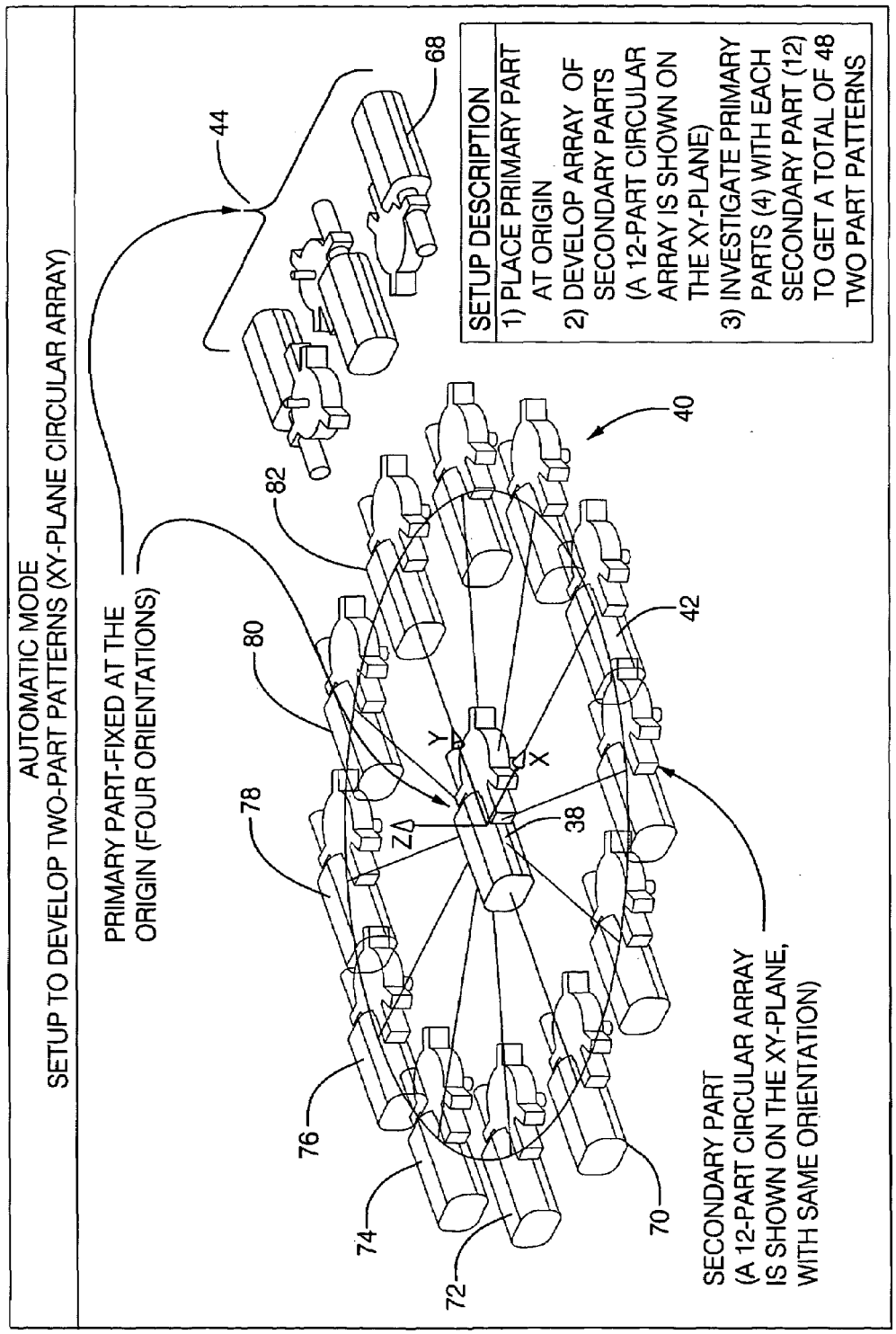
FIGS. 3-7 illustrate an automatic mode of the packaging optimization method illustrated in FIG. 2.

Referring to FIGS. 3-7, portions of the simulation run by the automatic mode, which can be selected in step 22, are illustrated. FIGS. 3-7 illustrate just one example of a simulation run with a particular model 38. Referring in particular to FIG. 3, the development of a two-part pattern about the xy plane is illustrated. Here, a primary part 38 is fixed at the origin of a principal plane 40. Primary part 38 corresponds to the CAD model selected in step 20 of FIG. 2. In this Figure principal plane 40 is configured about the xy axis. During execution of the simulation program, primary part 38 is compared with a plurality of secondary part locations 42 and are arranged in an array about primary part 38 in principal plane 40.

For purposes of illustration, twelve positions of secondary part 42 are arranged in an array about primary part 38. It is, of course, contemplated that more or less locations of the secondary part 42 may be arranged in an array about primary part 38. However, for purposes of this illustration twelve positions are used.

In addition, four unique orientations of the primary part are also investigated with each of the secondary part locations. Three primary part orientations are illustrated by bracket 44, the fourth configuration being the primary part 38 orientation that is currently being investigated by the simulation program and is illustrated at the origin of principal plane 40.

Accordingly, FIG. 3 illustrates that 48 two-part pattern configurations in the xy plane are available for comparison by the simulation program.

Figure 4:
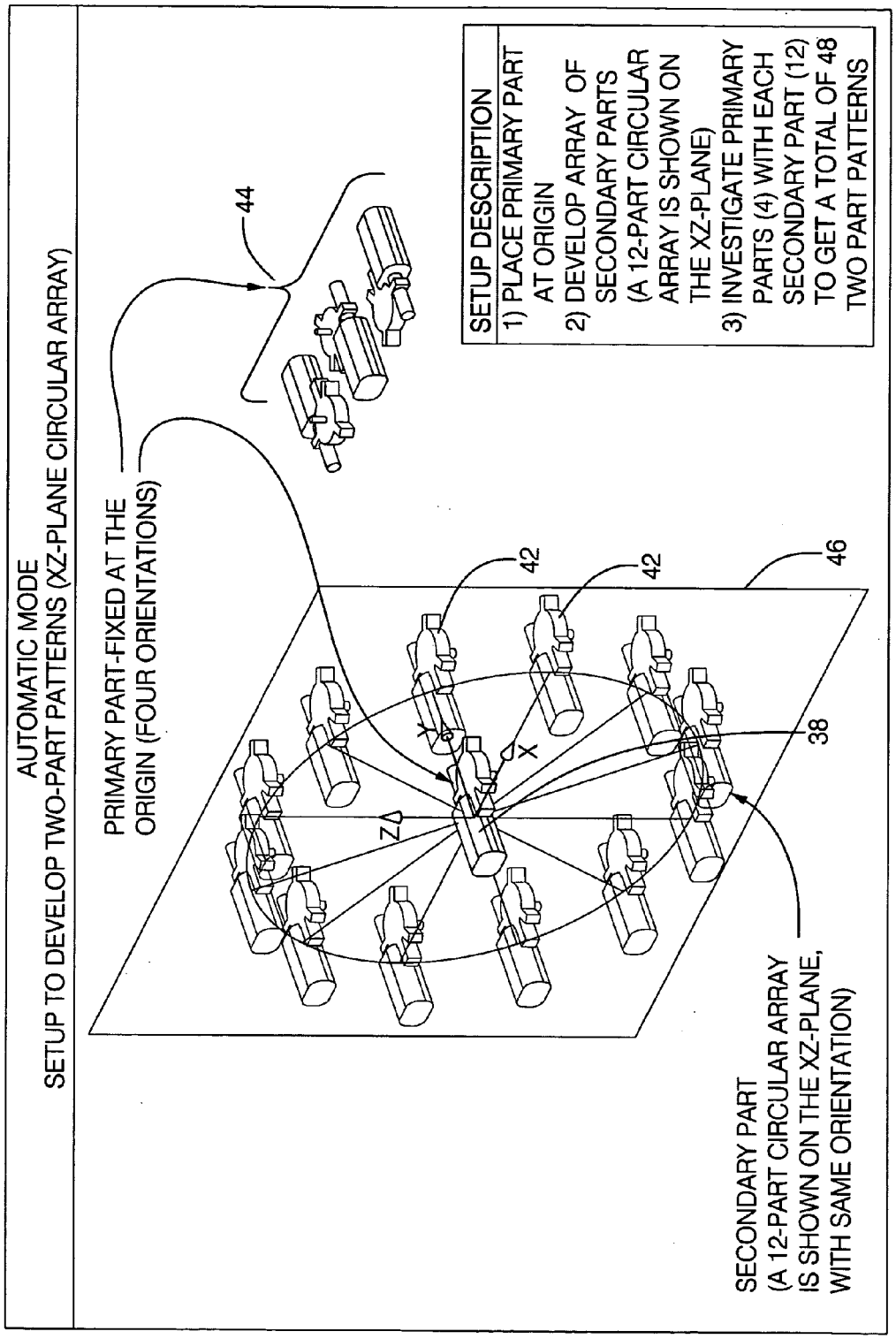

Referring now to FIG. 4, the analysis of a two-part pattern for the same CAD model selected in step 20 is illustrated about the xz plane. Here, a primary part 38 is fixed at the origin of a principal plane 46. In this Figure principal plane 46 is configured about the xz axis. Similar to the comparison of FIG. 3, and during execution of the simulation program, primary part 38 is compared with a plurality of secondary parts 42 which are arranged in an array about principal plane 40 (FIG. 3).

In addition, four unique orientations of the primary part are also investigated with each of the secondary part locations. Three primary part orientations are illustrated by bracket 44, the fourth configuration being the primary part 38 orientation that is currently being investigated by the simulation program and is illustrated at the origin of principal plane 46. Accordingly, FIG. 4 illustrates that 48 two-part pattern configurations in the xz plane are available for comparison by the simulation program.

Figure 5:
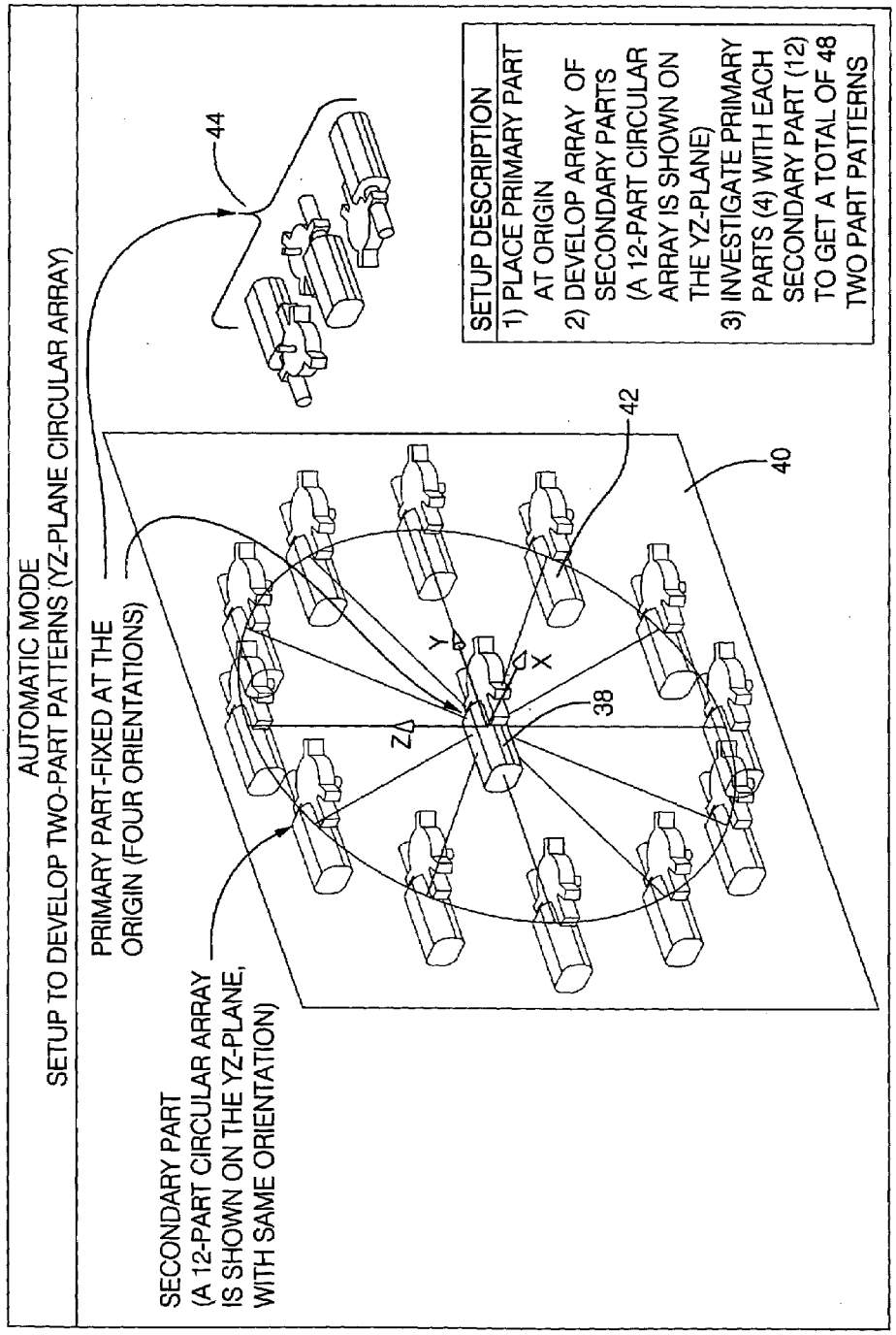

Referring to FIG. 5, the analysis of a two-part pattern for the same CAD model selected in step 20 is illustrated about the yz plane. Here, a primary part 38 is fixed at the origin of a principal plane 50. In this Figure principal plane 50 is configured about the yz axis. During execution of the simulation program primary part 38 is compared with a plurality of the secondary parts 42 which are arranged in an array about principal plane 50 (FIG. 5).

In addition, four unique orientations of the primary part are also investigated with each of the secondary part locations. Three primary part orientations are illustrated by bracket 44, the fourth configuration being the primary part 38 orientation that is currently being investigated by the simulation program and is illustrated at the origin of principal plane 50. Accordingly, FIG. 5 illustrates that 48 two-part pattern configurations in the yz plane are available for comparison by the simulation program.

Figure 6:
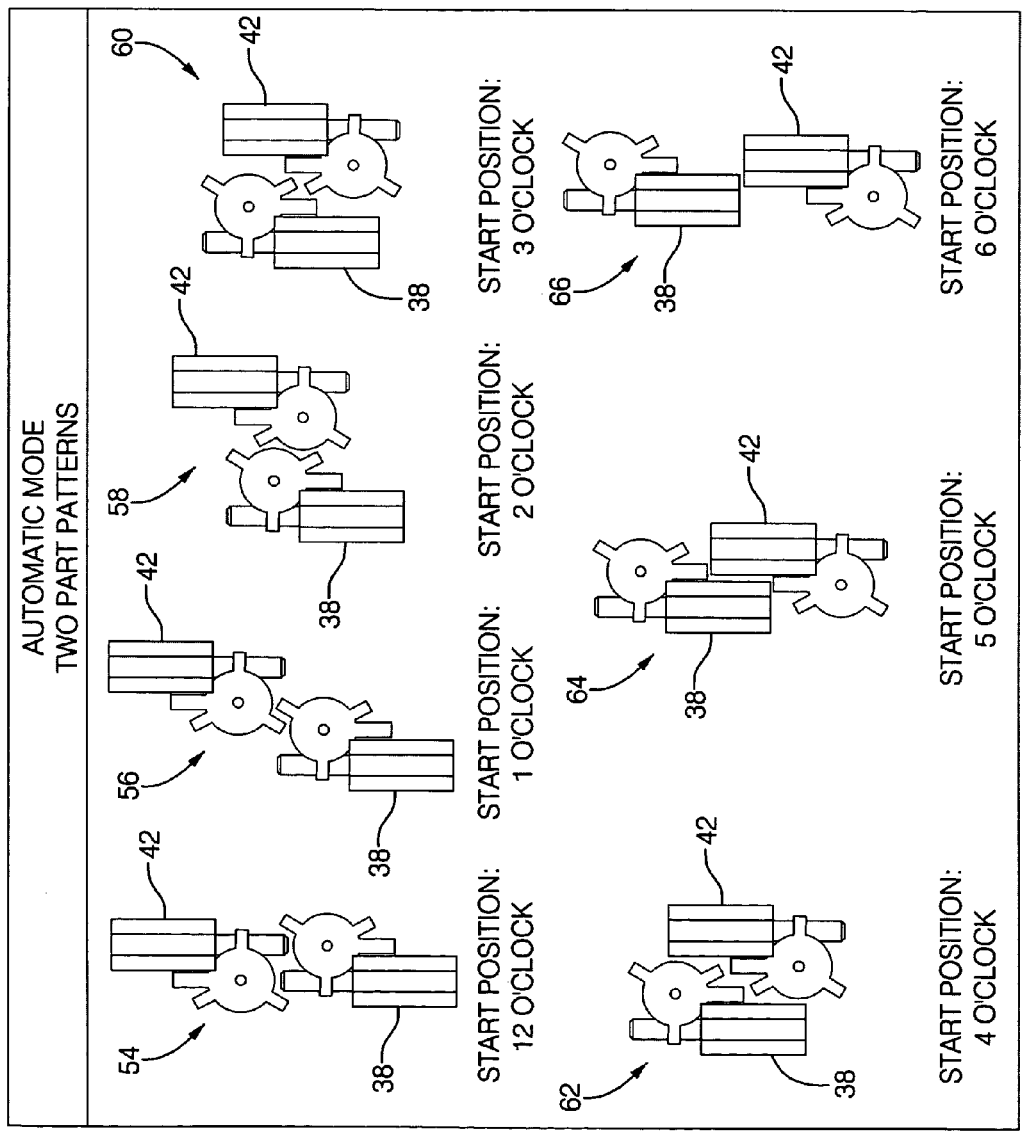

Referring to FIG. 6, several two-part pattern configurations 54, 56, 58, 60, 62, 64 and 66 are shown between primary part 38 and secondary part 42 which are utilized by the packaging optimization simulation system. For purposes of illustration, and referring now to FIGS. 3 and 6, the two-part configurations illustrated in FIG. 6 represent the configurations of primary part 38 when it has the initial configuration illustrated as 68 in FIG. 3 and it is being configured with secondary part 42 having the configuration illustrated by (70-84) in FIG. 3. The configuration of secondary part 42 with respect to primary part 38, namely configurations (70, 72, 74, 76, 78, 80, and 82) corresponds to the configurations illustrated in FIG. 6 by items (54 and 70), (56 and 72), (58 and 74), (60 and 76), (62 and 78), (64 and 80) and (66 and 82), respectively.

Accordingly, one hundred and twenty, two-part patterns are determined from FIGS. 3-5. This number is based upon a twelve point array of secondary part 42, which as previously mentioned may be modified to include more or less positions, and the factoring out of redundant patterns which may be determined (twenty four in all) from the simulation run in FIGS. 3-5. Of course, and if the number of positions in the array varies this number will also vary.

Figure 7:
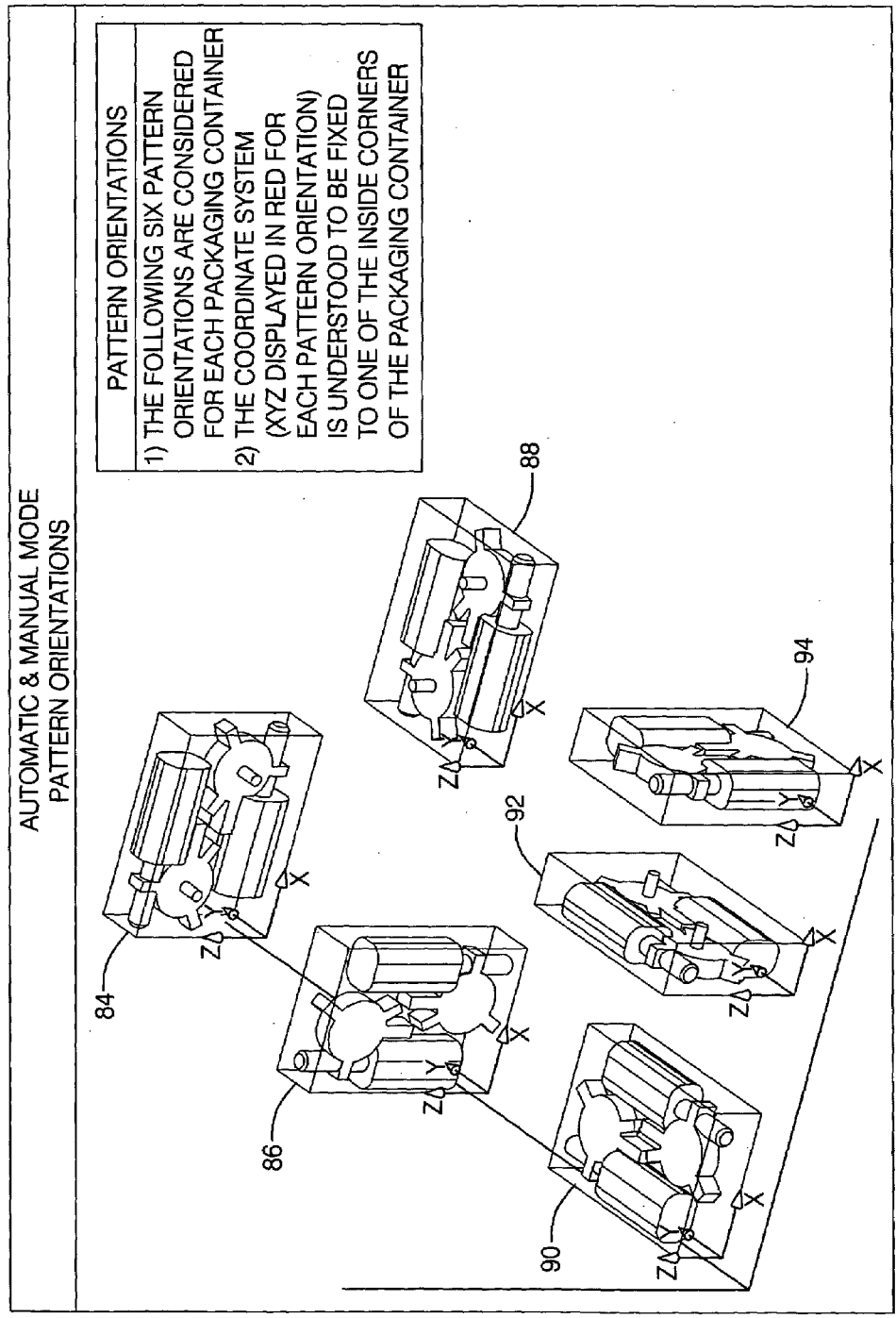

Referring to FIG. 7, each two-part pattern orientation is considered in six orientations 84, 86, 88, 90, 92 and 94; corresponding to orientations of the two-part patterns about the x, y and z axis. And the coordinate system (x, y and z) is understood to be fixed to one of the inside corners of the packaging container during simulation. Accordingly, each orientation is considered for each packaging container available from the database.

Accordingly, the simulation calculates seven hundred and twenty possible configurations (or part layouts) of the developed two-part patterns. Here, a part layout can be understood to be the unbounded three dimensional array of a two-part pattern. These seven hundred twenty part layouts or configurations are then compared to each of the containers selected from the database in order to generate the part/container layouts. If any of the calculated part/container layouts do not meet the customers' packaging requirements, then these layouts are not considered as a valid (or potential) packaging design and (by default) will not be displayed to the program user as such. All of the valid part/container layouts are organized in a list and presented to the program user as an on-screen display printout (illustrated as box 19, FIG. 1).

As an alternative, the simulation can provide a container design, which may not be in the database of usable containers however; if the simulation determines that a particular product orientation provides exceptional optimization an option may be available for providing a new container design. Further, the arrays are also used to define dunnage designs, which may or may not be acceptable for use in particular container designs or types of transportation.

Referring to FIG. 2, box 30 summarizes the execution of the simulation program in the automatic mode. Item (A) in box 30 summarizes the run of the simulation program that develops the one hundred and twenty possible configurations of the two-part pattern described in FIGS. 3-6. Item (B) in box 30 summarizes the run of the simulation program that executes the calculations used to develop the part layouts described in FIG. 7. Item (C) in box 30 summarizes the run of the simulation program that develops the part/container layouts. Thus, a user can select one or more containers and one or more types of parts and the simulation program generates a plurality of part/container layouts for each selected container.

Referring to FIGS. 2, and 8-10, portions of the manual mode of program 10 are illustrated. The manual mode is selectable from box 23. During manual mode the user obtains the CAD part model from the database and is illustrated in box 100 as the primary part. The simulation program prompts the user to develop the pattern by selecting the pattern direction from the options available in the box 102. In an exemplary embodiment, the default pattern direction in box 102 coincides with the smallest dimension of the primary part. Of course, and as an alternative the default direction may vary. In addition, the user may select any pattern direction available in box 102.

Once the pattern direction is selected, the simulation program creates a copy (secondary part) of the primary part and is located in the pattern direction as chosen in box 102. This is illustrated in box 104.

Referring to FIG. 2, after the pattern direction is selected, the simulation prompts the user with a menu of options, as illustrated in box 32. The first option listed (recommended) is to adjust the part-pattern and is illustrated in box 106. Adjustment of the part-pattern consists of configuring the secondary part relative to the primary part that is fixed in position. The part-pattern adjustment options illustrated in box 106 consists of the following: 3-D translation of the secondary part in the six axial directions, translation distance value setting (illustrated in box 107), re-orienting the secondary part 180 degrees about an axis, change of the pattern direction, and nesting options.

For example, box 108 illustrates the 180 degrees flipping of the secondary part along the z-axis.

Figure 8:
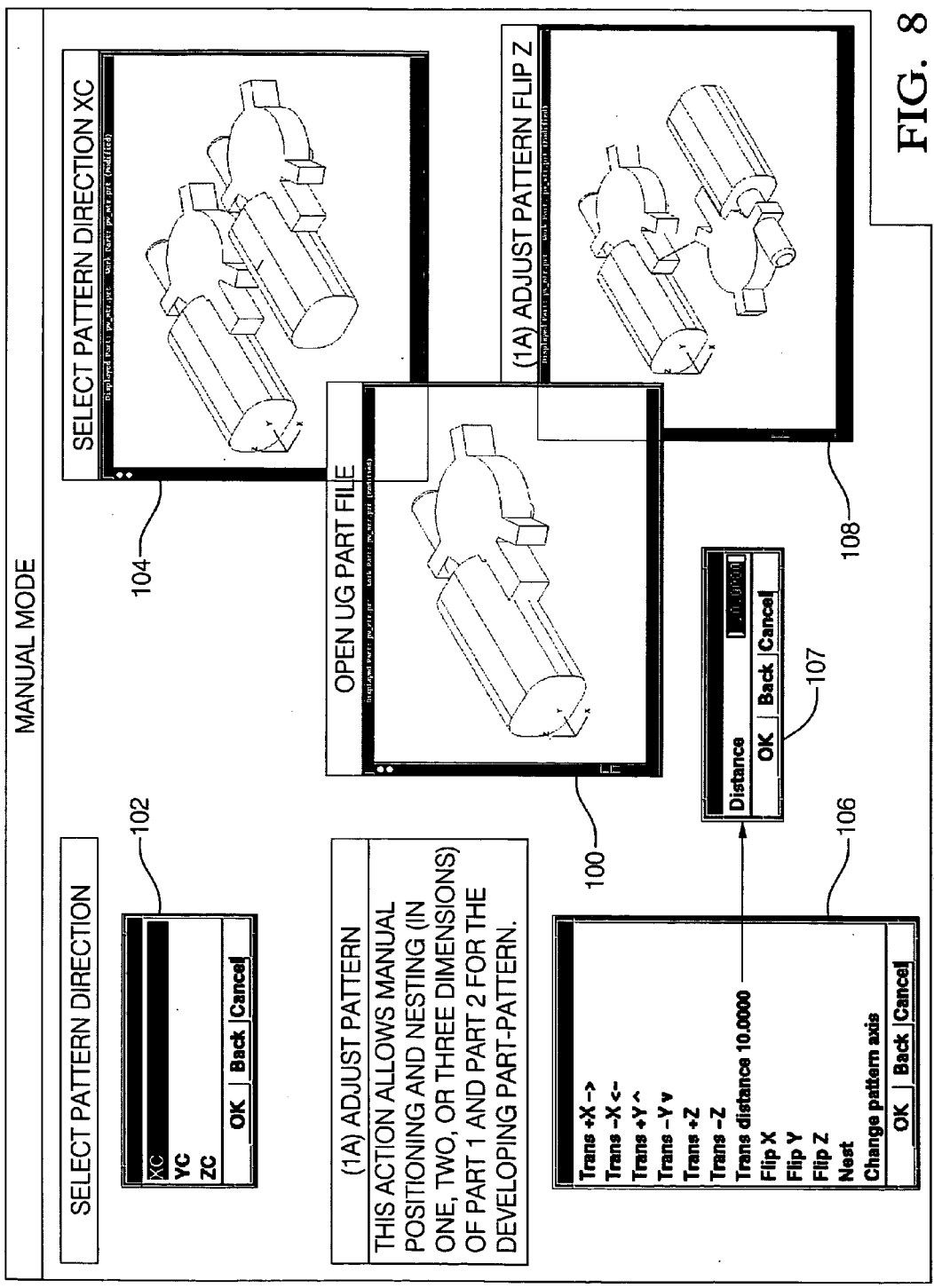
FIGS. 8-9 illustrate a manual mode of the packaging optimization method illustrated in FIG. 2.
Figure 9:
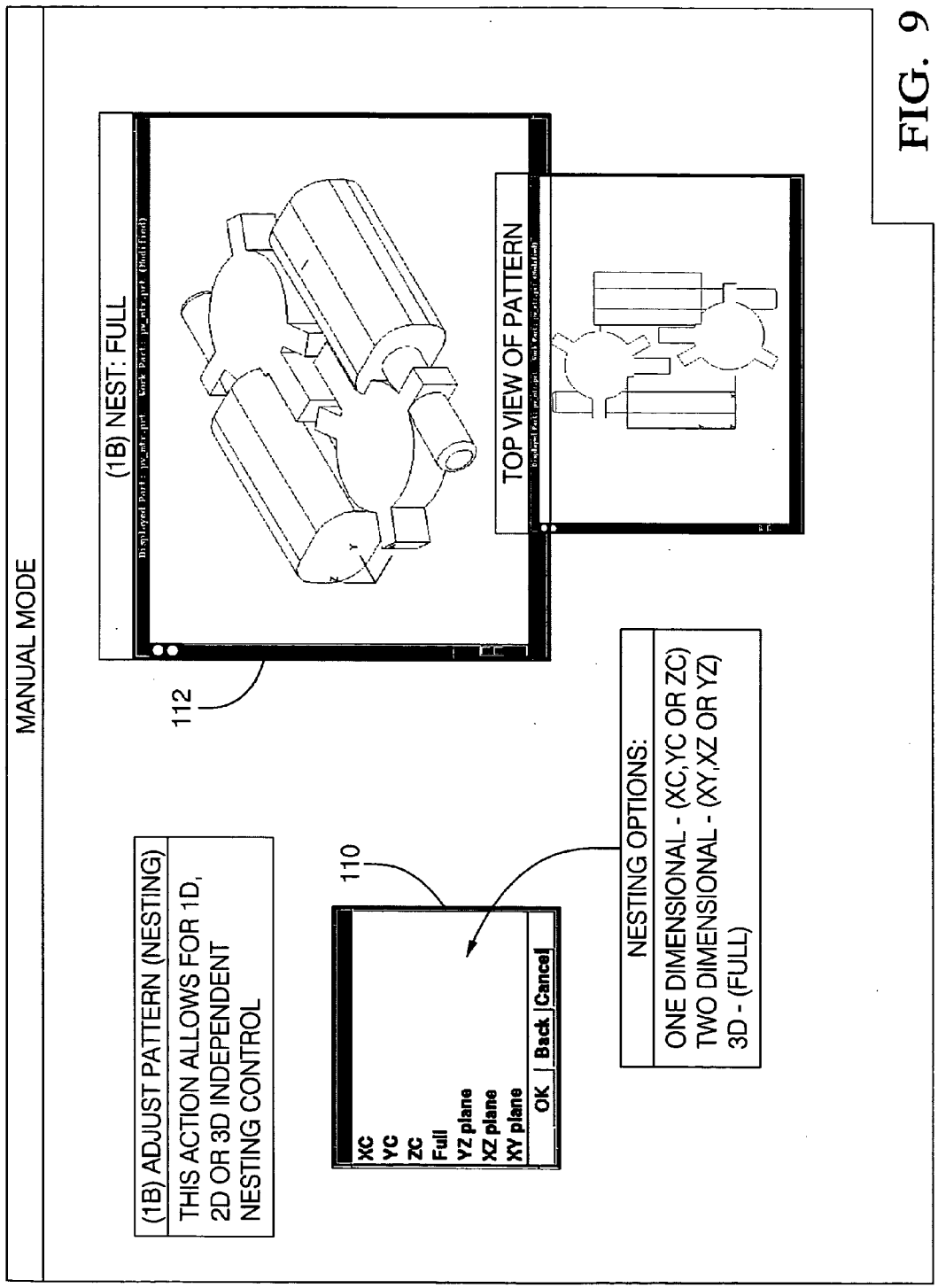
Figure 10:
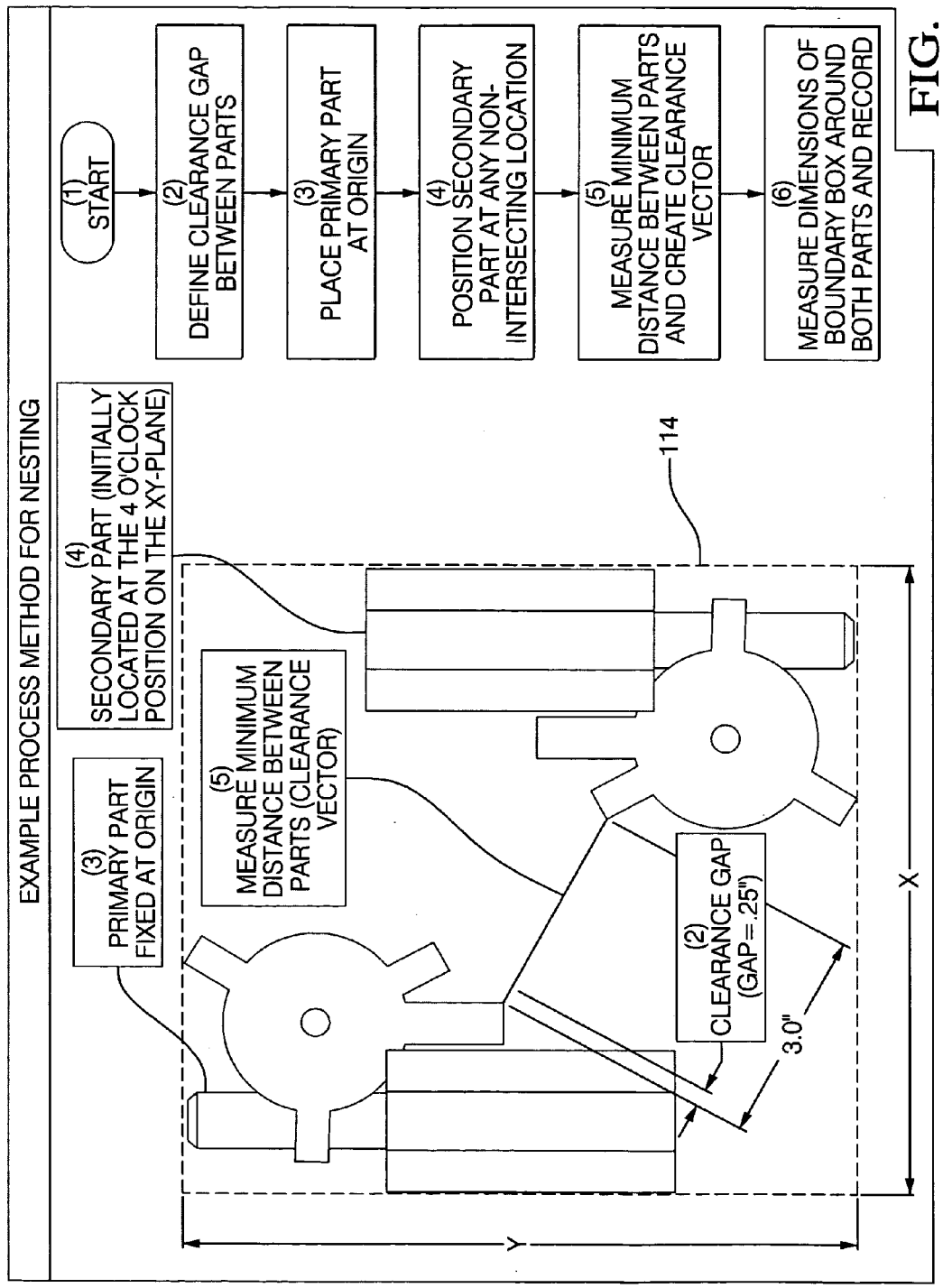
FIGS. 10-16 illustrate a 3-D nesting method illustrated in FIG. 2 and FIG. 3.

Referring to FIGS. 8 and 9, after accepting the position of the secondary part, selecting the Nest option in box 106 allows the program user to select the dimensional control for nesting. This is illustrated in box 110. For example, box 110 provides the user with nesting options in either one dimension (along the XC, YC or ZC axis), or two dimensional (in the XY, YZ, or XZ plane), or three-dimensional indicated as full (box 112).

Referring now to FIGS. 10-15, the nesting process method is illustrated two dimensionally for simplicity and understanding. During this process an initial clearance gap (between the primary and secondary part) is provided from the user input for the desired part-to-part clearance (FIG. 2, Box 26); and stored as a calibration constant. The primary part is fixed in location at an origin location and then the secondary part is positioned at any non-intersecting location. The minimum distance between the primary part and the secondary is measured and stored in memory as the clearance vector. In addition, the dimensions (x, y, and z) of a boundary box 114 around both parts is measured and recorded. In addition, and as an added feature or an alternative embodiment, the design process provides a visual representation to the user which, may elicit the user to select another configuration or provide new parameters to the nesting process even though density is not maximized as the user or operator may prefer a particular part to container orientation.

Figure 11:
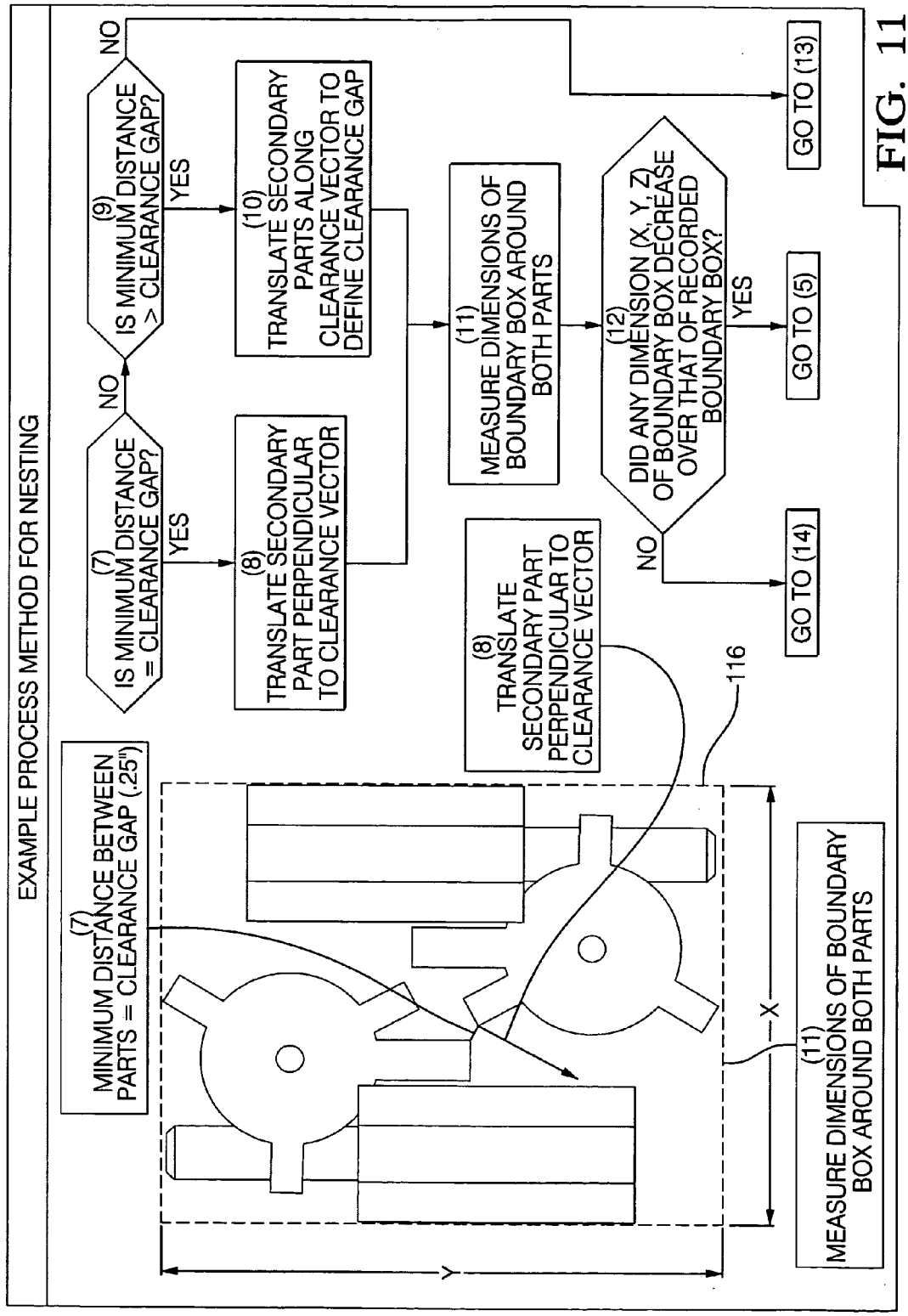
Figure 12:
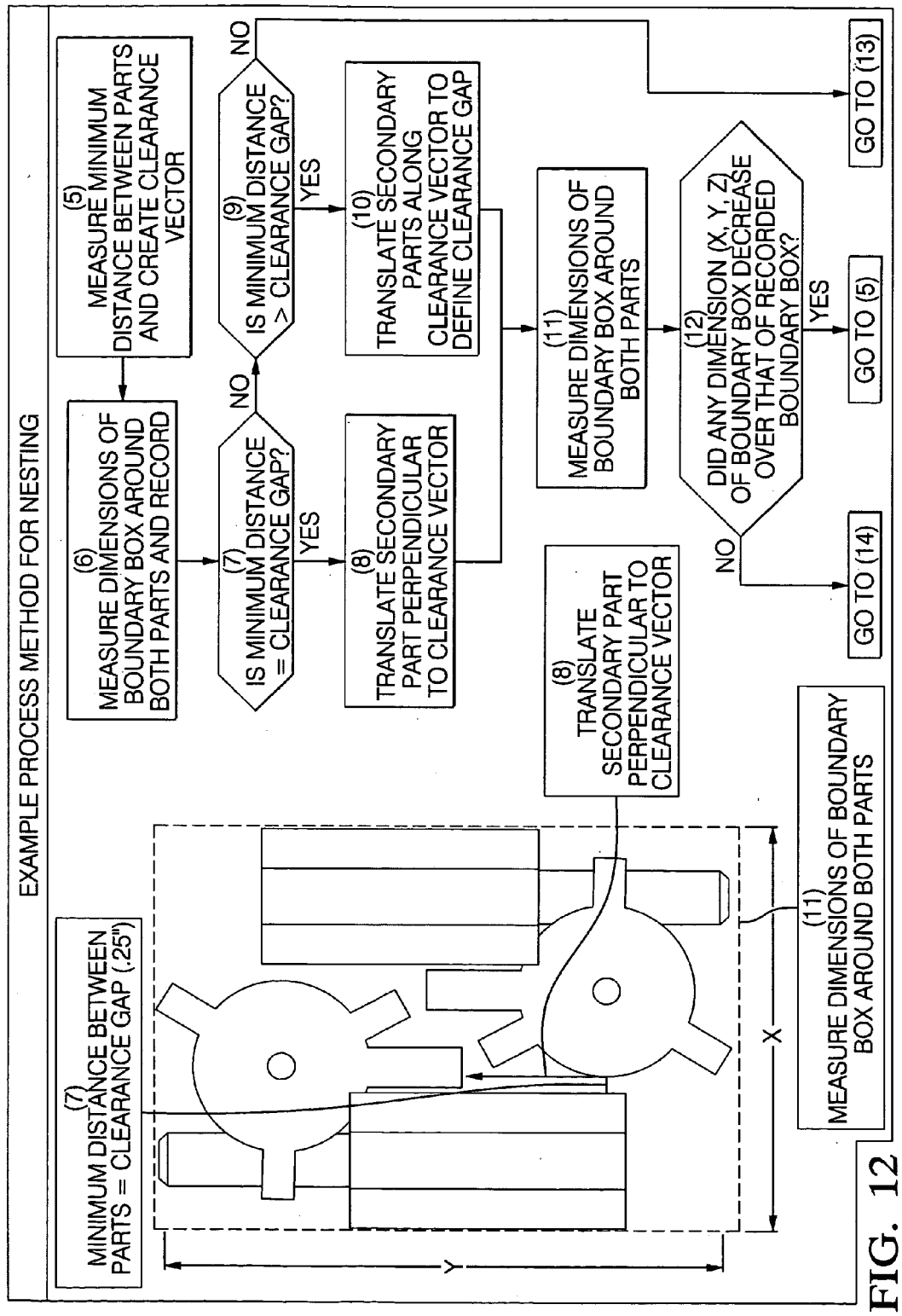
Figure 13:
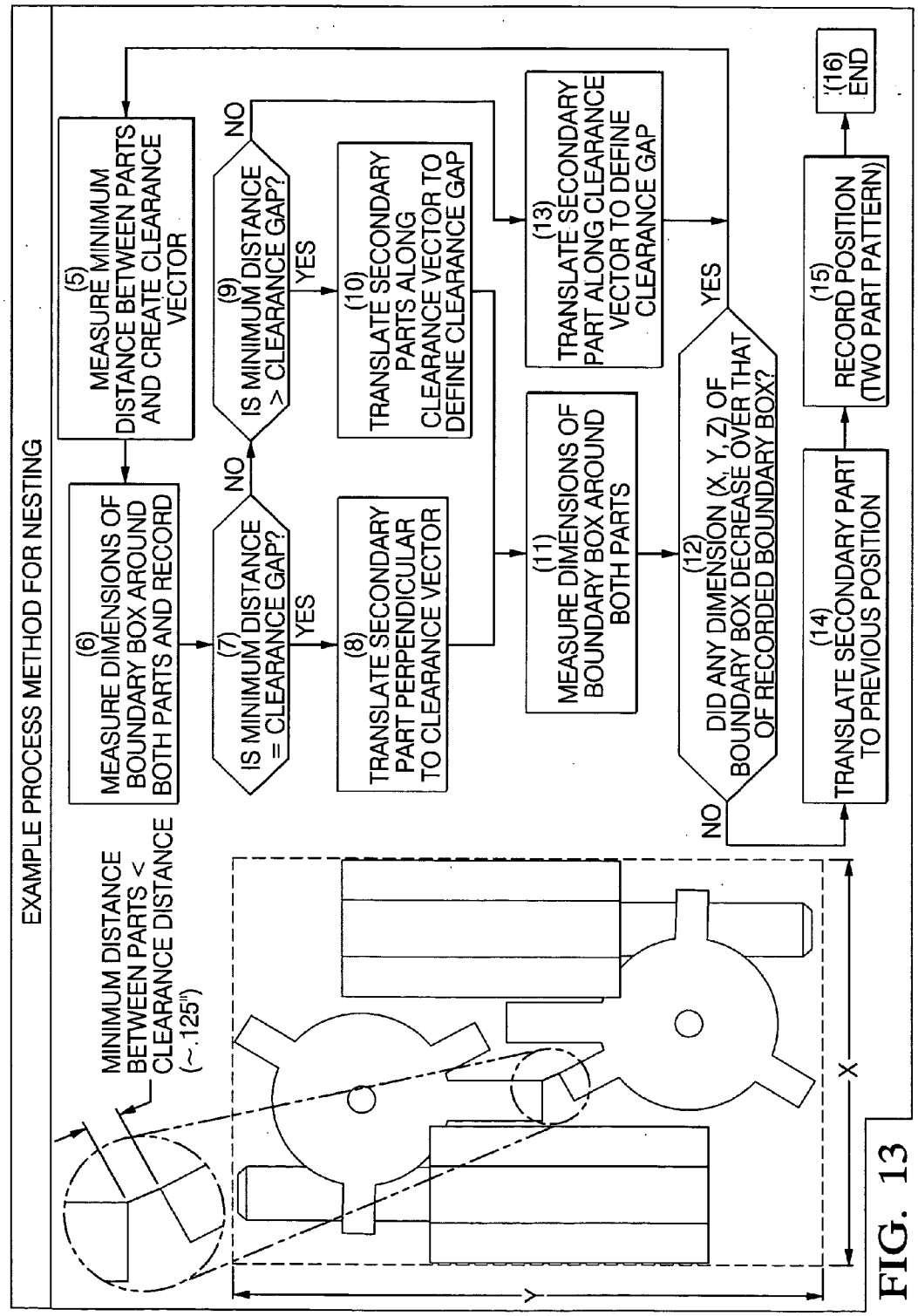
Figure 14:
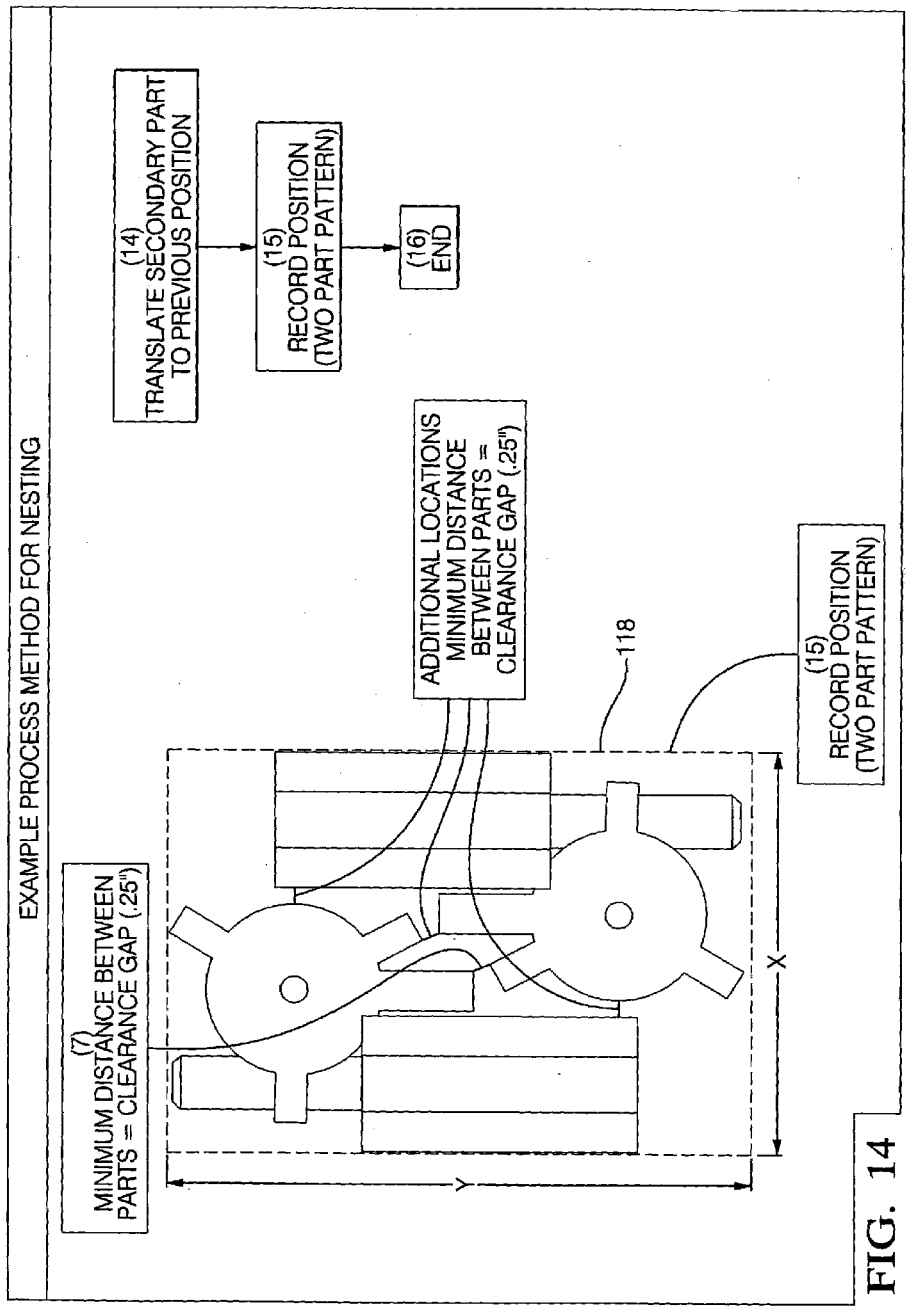

Referring to FIGS. 11 and 14, during operation of the nesting process, the minimum distance is measured between parts and is compared to the user defined clearance gap. If the minimum distance is greater than the desired part-to-part clearance, then the secondary part is translated along a clearance vector toward the primary part and to the location where the minimum distance between parts is now equal to the clearance gap (Box 116). If the dimensions of the new boundary box 116 decreases, the secondary part is translated incrementally and perpendicularly to the clearance vector until the minimum distance between the parts is reached which will provide the smallest possible dimensions of the boundary box 118.

Figure 15:
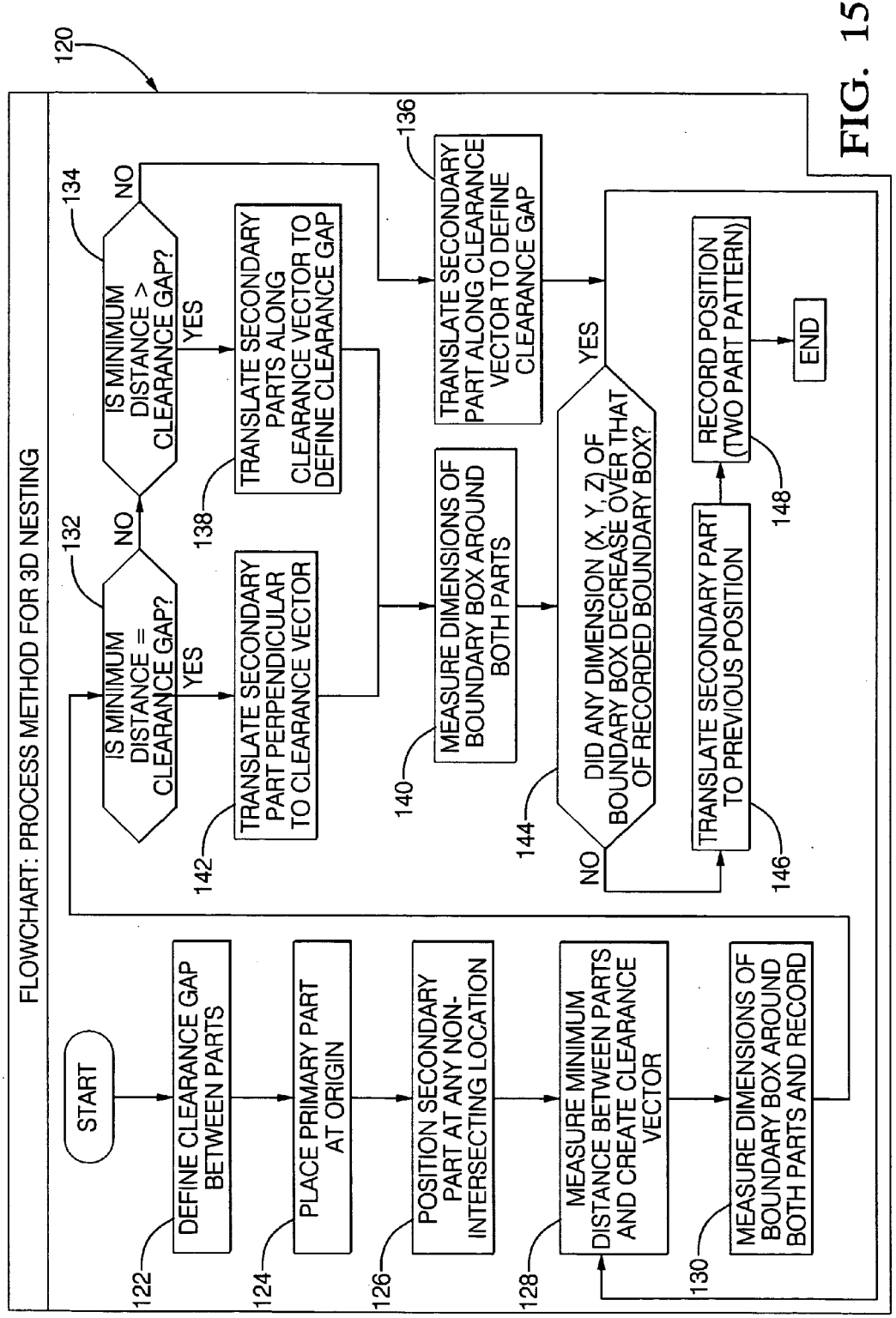

For example, referring to FIG. 15, portions of a control algorithm 120 for performing the nesting process method is illustrated. The steps of the control algorithm 120 are also illustrated sequentially in FIGS. 10-14.

The box 122 represents the request for a clearance gap input for the two parts. Box 124 represents the positioning of the primary part at an origin point. Box 126 represents the manual positioning of the secondary part at any non-intersecting location. Box 128 represents the logic for measuring the minimum distance between the parts and the assignment of a value to a variable defined as the clearance vector.

The box 130 represents the measurement of the dimensions of the boundary box defining or enclosing both the secondary and primary parts. This value is stored in a memory.

A decision node 132 determines whether the minimum distance is equal to the clearance gap. If not, a decision node 134 determines whether the minimum distance is greater than the clearance gap. If not, then the minimum distance is less than the clearance gap. And with box 136, the secondary part is translated along the clearance vector to the location where the length of the clearance vector is equal to that of the clearance gap. Here, the secondary part moves away from the primary part and in the direction of the clearance vector. Thereafter, the logic of box 128 is repeated.

If however, the minimum distance measured is greater than the clearance gap, box 138 instructs the system to move along the clearance vector in the direction toward the primary part to the location where the length of the clearance vector is equal to that of the clearance gap.

After this process is performed, box 140 represents the re-measurement of the boundary box around both parts and the new value is assigned to a new boundary box measurement stored in memory.

Alternatively, and if the minimum distance is equal to the clearance gap, the box 142 represents the instruction to translate the secondary part along a line perpendicular to the clearance vector. After this process is performed box 140 represents the re-measurement of the boundary box defined around both parts and this value is assigned to new boundary box measurement stored in memory.

After the commands of box 140 are executed, a decision node 144 determines whether any of the edge dimensions (x, y or z) of the boundary box decreased over the previously recorded dimensions, (i.e., comparison of new measurement vs. previous measurement).

If there was no measured decrease in any of the dimensions of the boundary box, box 146 instructs the secondary part to be translated back to its previous position. Then box 148 stores that positional information of the two-part pattern to be used.

Alternatively, and if any of the dimensions of the boundary box decreased, the logic of box 128 is repeated. This process will continue until the minimum boundary box dimensions are obtained.

Figure 16:
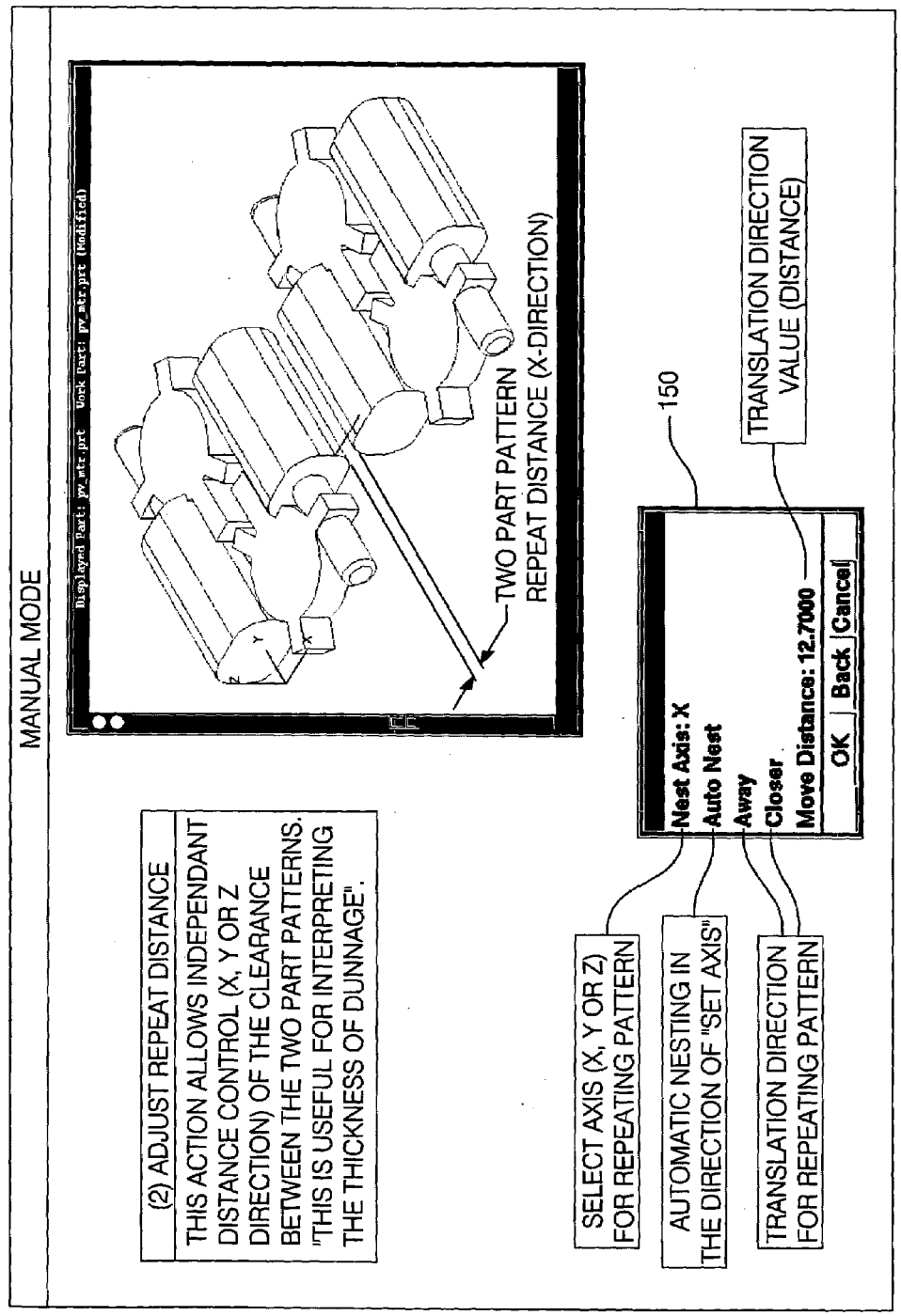

Referring to FIG. 16, the option for adjusting the repeat distance of the two-part pattern is illustrated. Here a command prompt 150 provides a user with selections for allowing independent control (x, y and z directions) of the clearance between the two-part patterns. This is particularly useful for interpreting the thickness of dunnage required for packaging the considered part. Command prompt 150 allows the user to manually set the value for the (two-part) pattern repeat distance by translating the repeated (second) two-part pattern either away or closer to the initial two-part pattern. The magnitude for translating the two-part pattern can be set by the user with the 'Move Distance' option. One dimensional nesting (in the direction of 'Set Axis' of the two two-part patterns is available with the 'Auto' option.

Figure 17:
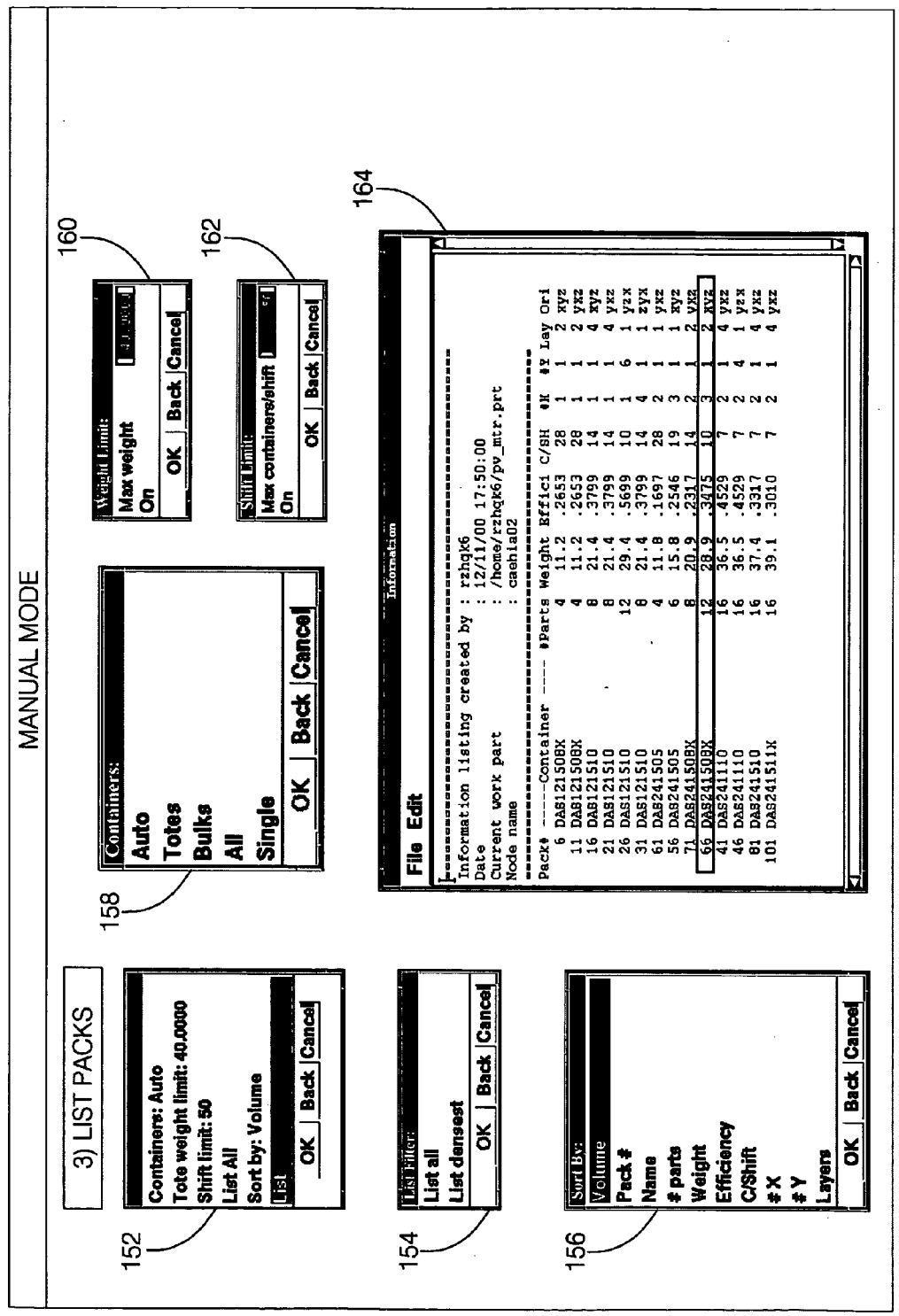
FIGS. 17-20 illustrate options available for the control algorithm of an exemplary embodiment of the present invention.

Referring to FIGS. 2 and 17, the options for the listing pack command of box 32 is illustrated as dialog box or prompt 152. And each option in box 152 has its own menu of options, (i.e., prompts 154, 156, 158, 160 and 162). Box 164 represents the information obtained after the containerization optimization method has been performed. It is noted that here this option is available for all packaging modes, (e.g., automatic, retrieve and manual). Box 164 provides the user with necessary information in order to select the most efficient packaging container. For example, outlined in box 164 a line of text reveals that twelve parts with an overall (packed container) weight of 28.9 pounds and overall efficiency of 0.3475 is obtained from pack No. 66. Prompt 158 allows the user the option to list results by container style, (e.g., Totes, Bulk Packs, All Styles, Single Container and Auto). The 'Auto' container style is the default setting which selects the container style based on the customer's requirements; that is, if a customer database was selected in Box 28 (FIG. 2).

The prompt 160 allows the user to input the maximum weight limit for the container to be used. The prompt 162 allows the user to input a shift limit, (i.e., maximum amount of containers to be transported during an eight hour work period). Both prompts 160 and 162 have an on/off toggle feature that allows the weight and shift limit control feature to be either considered or ignored by the simulation program. Prompt 154 allows either all the pack results to be listed or to consider only the most efficient results for each unique container size. All of these features allow the user to modify the output for display purposes. The prompt 156 provides data sorting options that allows the user to sort the column data in Box 164, (e.g., container volume, total number of parts per container, containers per shift, efficiency, etc.).

Figure 18:
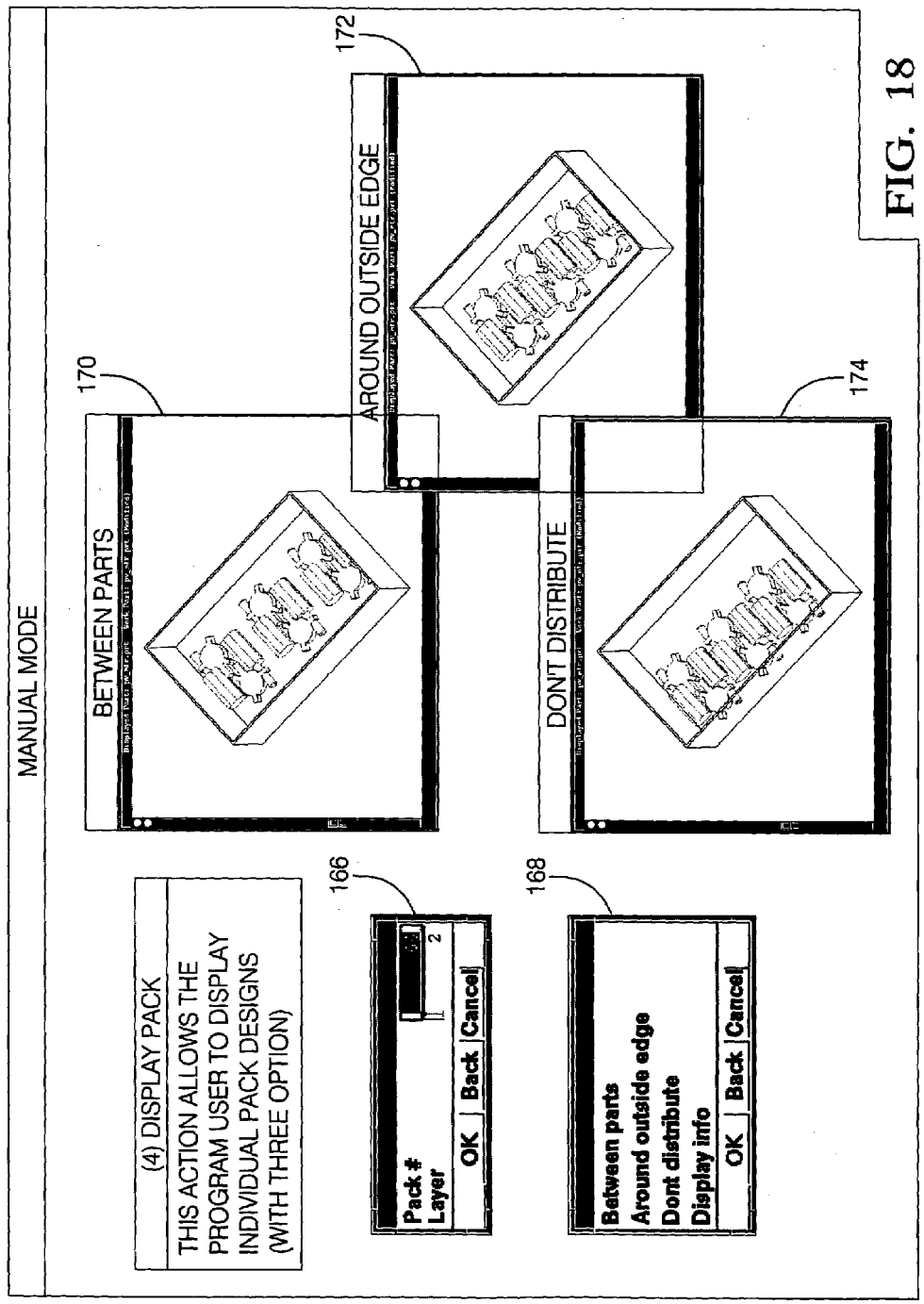

Referring to FIGS. 2 and 18, the display pack option of box 32 is illustrated by dialog boxes and or command prompts 166, 168, 170, 172 and 174. Prompts 166 and 168 provide the user with the selections settings and the options for allowing the program user to display the individual pack designs with three different pack-layout options; namely, between parts, around outside edge and don't distribute identified as information boxes 170, 172 and 174, respectively. It is noted that this option is available for all packaging modes selected, (e.g., automatic, retrieve and manual).

Figure 19:
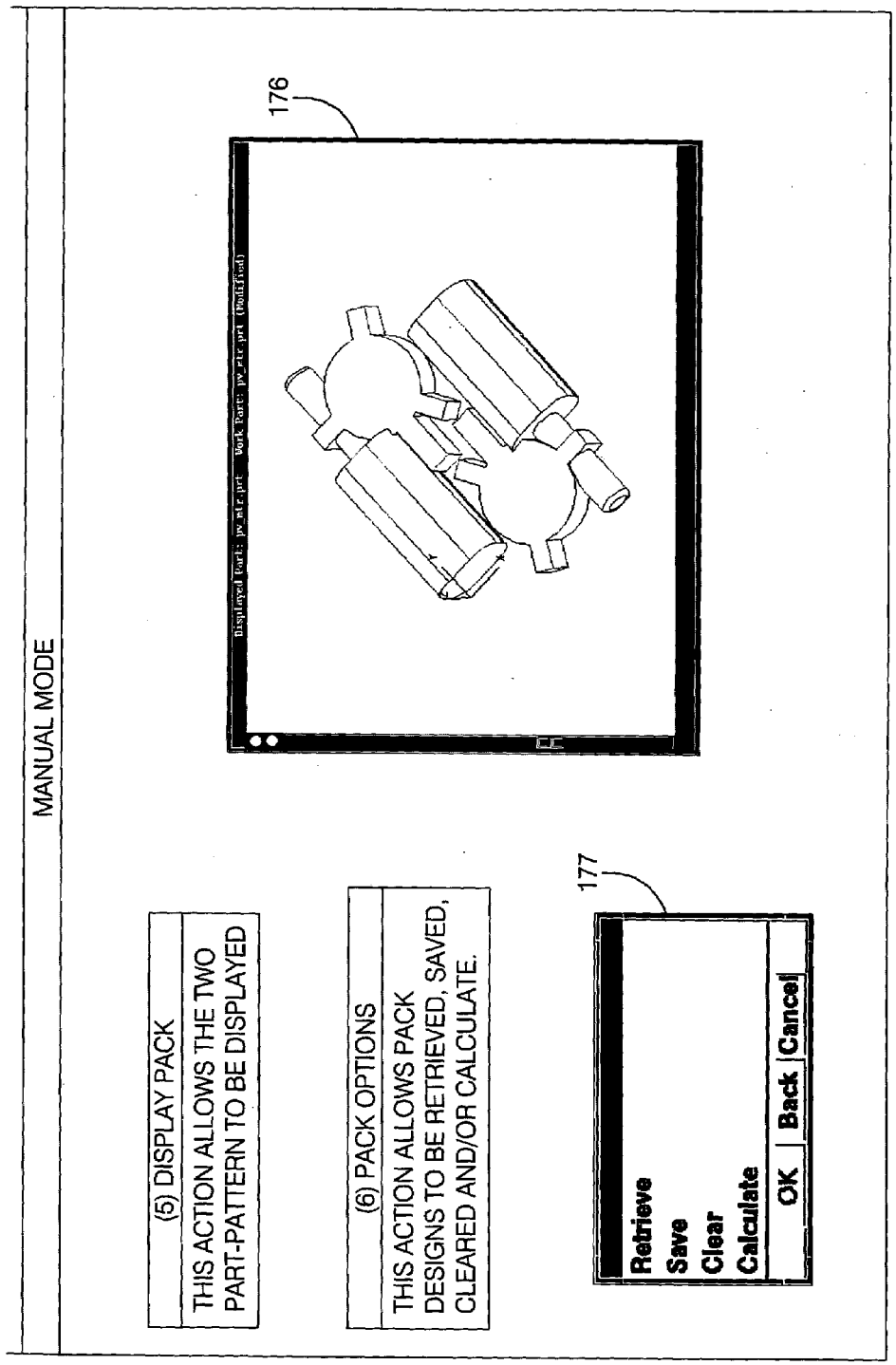

Referring to FIG. 19, the display work pattern option of box 32 (FIG. 2) is illustrated by box 176. This action allows the part pattern to be displayed. This is useful for editing the two-part pattern. The pack options in box 32 are illustrated by box 177. This action allows the pack-layout design to be saved (for use in retrieval mode), cleared, retrieved and/or calculated. The 'Calculate' option is useful if changes are made to the original two-part pattern, when using the 'Display Work Pattern' option (box 176).

Figure 20:
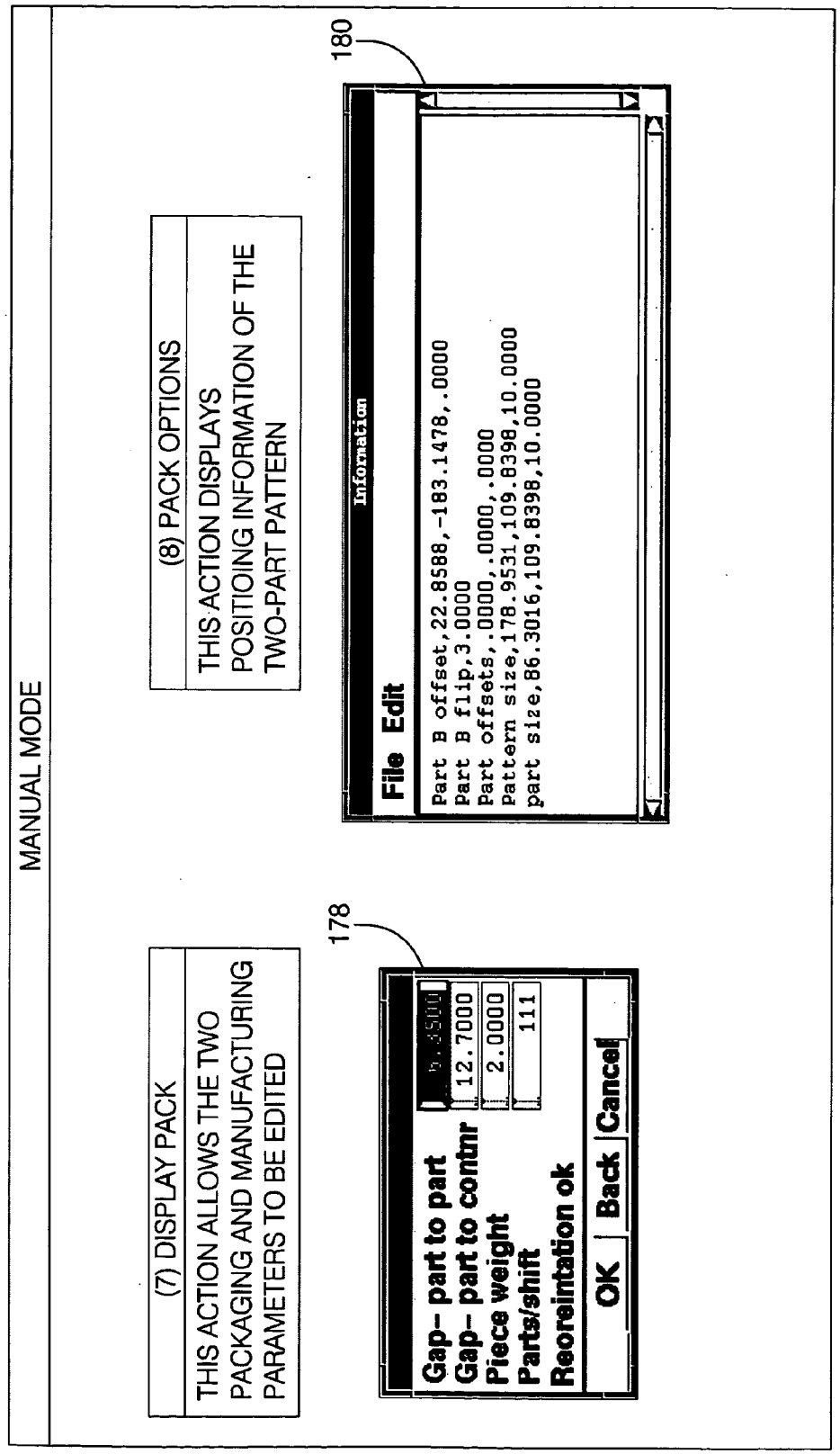

Referring to FIGS. 2 and 20, the 'Parameters' display and information option of box 32 are illustrated by dialog box 178 and box 180. The parameter option allows the packaging and manufacturing parameters to be edited by the user. The information option displays positioning information regarding the considered two-part pattern.

As an alternative to the previous embodiments, a "Faster Run Time" algorithm, based upon a proportional relationship between the desired "part-to-part gap" and the (x,y,z)

part envelope dimensions of the part to be packaged, is implemented within the simulation program. Based upon the above-mentioned algorithm, a convergence method is used by continuously "halving" the "part-to-part gap" once the two-part pattern is initially developed. The values generated in this convergence method are used as the translation steps in the "NESTING" routine within the simulation program. Accordingly, and depending upon the initial "part-to-part gap" as well as the original placement of the primary part and secondary parts, the series of steps in the "NESTING" routine is significantly reduced therefore providing a faster calculation process.

Figure 21:
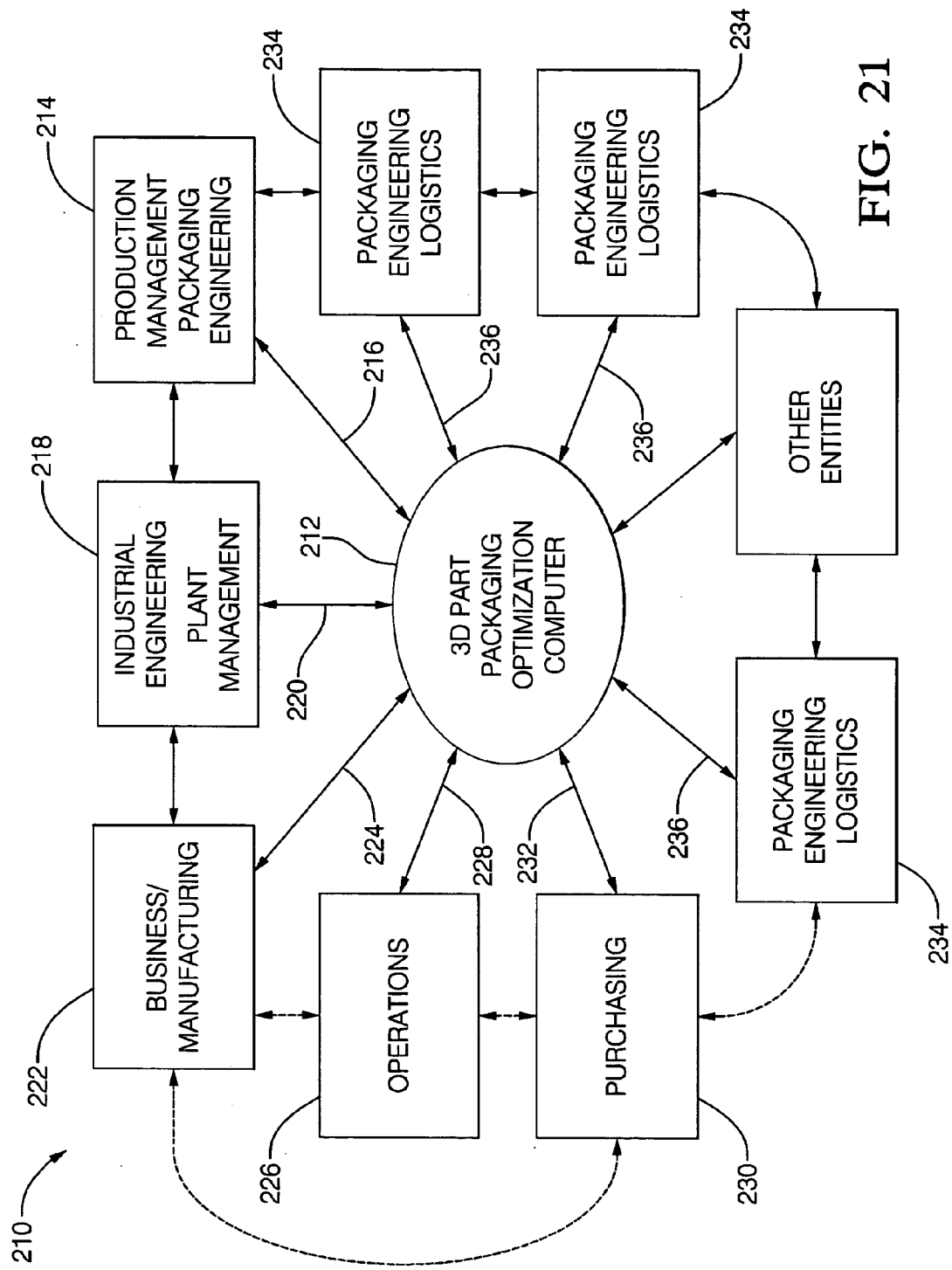
FIG. 21 is a diagrammatic illustration of a collaborative function of an exemplary embodiment of the present invention.

Referring to FIG. 21, a diagrammatic view of an exemplary embodiment of the present invention is illustrated. Here a system 210 for determining a substantially optimal packaging design for a container is illustrated. In accordance with an exemplary embodiment, system 210 is implemented through a computer or equivalent device operating in response to a computer program. In order to perform the prescribed functions and desired processing, as well as the computations therefore, the computer may include, but is not limited to, a processor(s), computer(s), memory, storage, register(s), timing, interrupt(s), communication interfaces, and input/output signal interfaces, as well as combinations comprising at least one of the foregoing.

Referring to FIG. 21, the system 210 in one embodiment includes a 3-D part packaging optimization computer 212 that executes software described in FIGS. 1-20 as well as additional embodiments which are discussed herein. The entities or stakeholders involved in particular aspects of a product life cycle are in communication with the computer 212 wherein particular aspects of each entity are capable of being inputted into computer 212. The system is capable of running a simulation providing an updated set of parameters related to packaging configurations and other outputs generated or used in response to inputs received by one or more of the entities. Further simulations may be run and outputted as other entities provide inputs based upon the latest generation or simulation run.

For example, one of the entities may comprise a production management or packaging engineering arm or group 214 of a business or group employing the methodology of the present invention. The system is able to provide packaging optimization related to in-container part protection through an interface 216, which provides communication between computer 212 and entity 214. An example of such in-container part protection provided by computer 212 is the optimization of the packaging for, among other things, reducing dunnage, decreasing cycle time and reducing part damage.

Another entity may comprise an industrial engineering or plant management arm or group 218 of a business or manufacturing entity employing the methodology of the present invention wherein the system is able to provide packaging optimization related to container handling through an interface 220, which provides communication between computer 212 and entity 218.

Yet another entity may comprise a plant facilities arm or group 222 of a business or manufacturing entity employing the methodology of the present invention wherein the system is able to provide packaging optimization related to container storage and tracking through an interface 224, which provides communication between computer 212 and entity 218. In this example, group 222 may be able to provide to computer 212 a current status of shipping container availability or cycle time or group 222 may run a separate program analysis of container availability, etc.

Thus, if a particular container is selected by one of the other groups for use in the simulation of computer 212 that particular container or container availability is provided to the system that may increase or decrease the time needed for transportation based upon the container availability. Accordingly, access is provided to group 222 and appropriate feedback can be given.

Still another entity may comprise an operations arm or group 226 of a business employing the methodology of the present invention wherein the system is able to provide packaging optimization related to container disposal through an interface 228, which provides communication between computer 212 and entity 226. In addition, and depending on the geographical location of the point of origin and point of delivery particular methods of transportation (air, land, sea, truck, rail etc.) may be involved wherein certain shipping containers may be required (e.g., cargo containers for ships) and particular containers (e.g., open or closed, racks or stackable items) may be required for the items to be transported and the method of transportation.

Such variations in containers, type of transportation and container availability or transportation cycle (returnable and reusable containers) are now considered in the packaging optimization process wherein product configurations are determined through the simulation programs of the present invention and related or required dunnage is also simultaneously designed, which in some instances, through exemplary embodiments of the present invention may actually occur before the product is even made. Thus, all of theses factors will be provided during an early stage of the product lifecycle wherein the particular needs of such items are met during this design stage. Although, and in an alternative embodiment, it is contemplated that these simulations are also usable with products or items already in production.

Still another entity may comprise a purchasing arm or group 230 of a business employing the methodology of the present invention wherein the system is able to provide packaging optimization related to container purchasing through an interface 232. In this example, group 230 may be able to provide to computer 212 a current status of shipping container availability thus; existing inventory may be used at a cost benefit if a particular container is selected by one of the other groups for use in the simulation of computer 212.

Still other entities 234 may relate to packaging engineering logistics arms or groups of a business employing the methodology of the present invention wherein the system is able to provide information concerning container transportation through interfaces 236, which provide communication between computer 212 and entities 234. The entities described above are provided as non-limiting examples and the number and type of entities may, of course, vary.

In addition, entities responsible for requests for quotations may now through the modeling simulations of the present invention provide RFQs that include packaging and freight costs, which are optimized for that particular product.

It is understood that each of the entities can be all one manufacturing entity or business or alternatively a portion may be related to one business while another or others are related to other businesses which interact with the other during a product life cycle.

In addition, and as another alternative each entity or entities may be separate businesses who employ the use of computer 212 operated by another business or organization wherein optimization processes are run for profit. In this embodiment, the use of universal CAD representations (e.g. Unigraphics or equivalent computer code) provides ease of transferability of such information.

It is understood that each of the entities may communicate with computer 212 independently wherein an initial simulation is run and an output is provided to the requesting entity. Further, and in accordance with an exemplary embodiment, the output of the simulation of one entity is now available for use with other entities as the initial simulation is used in order to ensure manufacturing and packaging optimization across the entire spectrum, which comprises the product life cycle (e.g., conception to phase out). For example, an optimal product packaging configuration for entity 214 may require the use of a certain container from entity 232, which according to entity's 232 inventory or suppliers of containers may add or subtract an overall unit cost to the production of the part. Thus, entity 214 will be provided with this knowledge through the use of computer 212 wherein specific packaging modifications may be made in order to provide the most efficient packaging configuration satisfying the most economical configurations for at least entity 232.

It is also understood that the entities providing input into the 3-D packaging optimization system may vary as product development occurs or changes. In addition it is also contemplated that the entities may also be able to share information with each other concerning particular inputs provided to the 3-D packaging optimization system or the results of simulations provided to that particular entity via the 3-D packaging optimization system.

Although the arrows in FIG. 21 show particular communication lines between certain entities, it is contemplated that each of the entities may communicate with each other. Further, when entities are sharing results of simulations run by the optimization system within an organization employing the optimization system globally or across particular business divisions it is also contemplated that these particular results will have an indication means showing which entities have provided input to this simulation and perhaps which entities information should be solicited for information in order to provide a more global result.

In accordance with an exemplary embodiment, it is contemplated that communication with the various entities and computer 212 will be facilitated through at least an Internet or Intranet connection in accordance with known technologies. The Internet allows a vast number of electronic devices to access multiple computer networks each being interconnected through communication links wherein information is exchanged through the Internet (e.g., telephone, DSL, cable, wireless etc.). Therefore, the Internet will facilitate communication between the various entities whether they are part of one international organization or separate businesses spread throughout the world. Further if a single entity is providing access to computer 212 for a fee, the Internet is conducive for conducting such electronic commerce.

An example of at least one facilitator of such communications is described in U.S. patent application Ser. No. 10/142,709, the contents of which are incorporated herein by reference thereto. Still other facilitators may include the teachings of U.S. patent application Ser. Nos. 09/483,301 and 09/483,722, filed Jan. 14, 2000; and U.S. patent application Ser. Nos. 10/033,163; 10/032,960; 10/001,748; 10/033,162; 10/033,333; 10/075,804; 10/002,678; and 10/032,959, filed Oct. 24, 2001 the contents of each application are incorporated herein by reference thereto.

Figure 22:
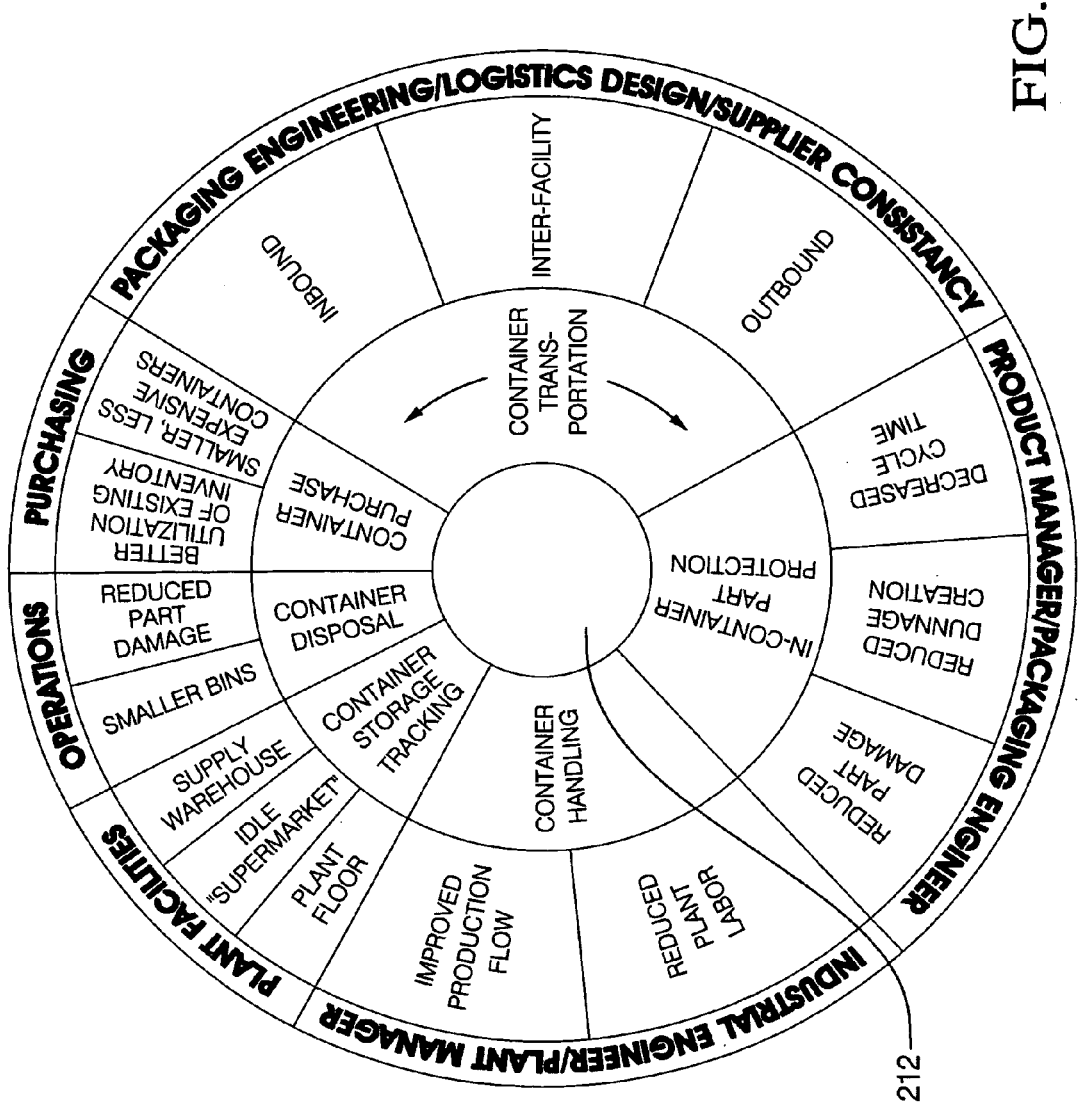
FIG. 22 is an illustration of the interactive collaborative functions provided by exemplary embodiments of the present invention.

FIG. 22 is another illustration of interaction of various groups with computer 212. Noted in FIG. 22 are various entities, which in accordance with an exemplary embodiment of the present invention are able to receive and provide input early on in the product life cycle. Further, these entities will be able to provide associated costs to other entities. For example, the requirement of container disposal will add a cost to the shipping process while optimization of container purchasing or container handling will provide a cost savings. As illustrated in FIGS. 21 and 22 and through a web-based (collaborative engineering) connectivity and communication, the system enables utilization, updates and dissemination of packaging results/data from entity to entity wherein an optimum packaging configuration for at least one manufactured part is achieved.

FIG. 22 illustrates various stakeholders or entities which may be various entities in one organization or may be separate organizations or businesses that interact with each other during the lifecycle of a product. For example, the outer ring identifies stakeholders in the packaging design process including a purchasing department, a packaging engineering department, a logistics department, a product manufacturing department, a plant manufacturing department, an industrial engineering department, a plant facilities department, and an operations department. Further, the center ring illustrates P & L cost savings and the inner ring illustrates activities and resources.

The 3-D packaging optimization system 210 allows user to shorten a time period for developing a part packaging design and allows all the stakeholders to make timely inputs into the optimization of a packaging design based on at least on design parameter. No longer will it be necessary to wait until final prototype products are approved and ready to go into production to begin thinking about packaging. The 3-D packaging system of an exemplary embodiment of the present invention works off a CAD model and automatically evaluates thousands of different layout schemes and ranks them according to the chosen optimization parameters, which are capable of being updated by any one of the entities or shareholders being affected by the product life cycle.

Accordingly, product life cycle management (PLM) systems of exemplary embodiments of the present invention will make visible to all stakeholders the proposed packaging design in advance of the actual prototype parts. Accordingly, the system allows opportunities to implement systemwide a tool that can reduce supply chain costs in multiple areas.

Exemplary embodiments of the present invention for use in computer 212 include methods for determining optimum pack/packaging density for part containerization described in U.S. patent application Ser. No. 10/393,027, the contents of which are incorporated herein by reference thereto as well as methods that use CAD modeling software, (e.g., Unigraphics) for executing an exhaustive investigation using actual 3-D part CAD models, packaging and manufacturing parameters for determining geometric part/container packaging.

Figure 23:
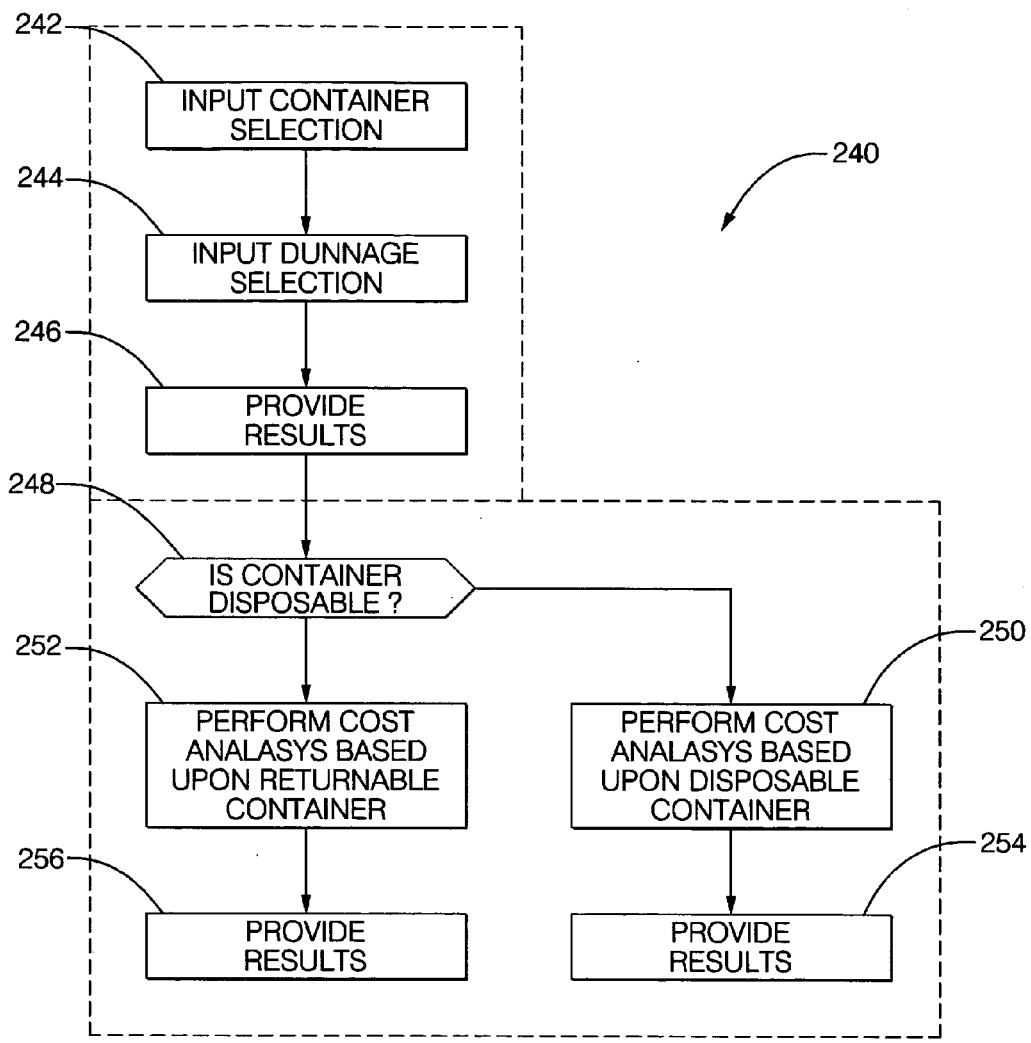
FIG. 23 is a diagrammatic illustration of portions of a collaborative container/dunnage selection process utilizing exemplary embodiment of the present invention.

Referring to FIG. 23, an implementation of a financial and logistic tool 240 is illustrated wherein a solution for optimization of the production-part program lifecycle is provided. Financial and logistic tool 240 is illustrated in FIG. 23 as a flowchart representing an algorithm of the optimization system that can be accessed by any one of the entities illustrated in FIG. 21 or may comprise a subset of for example, the optimization software described in FIGS. 1 through 20. The financial and logistic tool 240 provides an output based upon but not limited to the following information: container and dunnage selection, which is further based upon size, type, optimum usage of raw materials, (e.g., plastic injection molded containers, returnable/expendable corrugated plastic, returnable/expendable corrugated paper, steal racks, etc.), number of parts per container, container cost per piece and per pack, container build and re-pack cost per piece and per pack, disposal cost per piece and per pack, injury cost per piece and per pack. The box 242 represents the container selection process and upon completion box 244 represents the dunnage selection process. The box 246 represents the results provided by the financial and logistic tool that is based upon container and dunnage selection. It is of course contemplated that the simulation of boxes 242 and 244 may be repeated until desirable results are obtained.

Upon selection of a container and dunnage a second portion of the financial and logistic tool will provide an output based upon the container being disposable or returnable. This expendable vs. returnable containerization analysis is also illustrated briefly in FIG. 23 and the analysis is based upon but is not limited to the following parameters; annual part shipping volumes per program lifecycle, container size, number of parts per container, loop size (e.g., shipping time required for returned of container), number of containers and pallets required per day, number of containers and pallets required in the shipping cycle, number of existing/available containers and pallets used in the shipping cycle, number of containers and pallets to be purchased for the shipping cycle, per piece and total container cost, pallet investment cost, replacement container and pallet cost.

For example, box 248 represents a decision node wherein a determination of an expendable or reusable container is made. Depending upon the results of box 248 boxes 250 and 252 perform analysis based upon the container, which include at least some of the parameters mentioned above. Boxes 254 and 256 represent the complementary outputs of the analysis based upon expendable or reusable containers. Is also understood that these analyses may be repeated upon receiving results from either an expendable or reusable container analysis wherein the alternative container is used in the analysis. Further, it is also contemplated that the results of boxes 254 and 256 may be used as a basis when performing the steps outlined in box 242.

Also included in the cost analysis represented by boxes 250 and 252 is the inclusion of at least following information: cost for container/dunnage testing, (i.e., strength, vibration, impact, drop, moisture, etc.), due to container/dunnage selection; and freight cost, including: shipping/freight method, in-transit container/vehicle, transportation company-shipping schedules, rates, shipping parameters, (e.g., ship-by-weight, ship-by-volume). Thus, through the use of the financial and logistic tool of FIG. 23, which in accordance with an exemplary embodiments is a subroutine included with the algorithm described in FIGS. 1-20 synergy is provided with packaging optimization wherein financial and logistics of a product's lifecycle is now included or is complementary to the 3-D packaging optimization program. Further, global access is provided to entities each providing a necessary function in the product's lifecycle, which have traditionally operated autonomously with regard to each other and are typically addressed only after a final product design has been reached.

Referring to FIGS. 24-28, exemplary embodiments of dunnage designs generated by the computer 212 are illustrated. In particular, the computer 212 utilizes one or more part 3-D CAD models, a container 3-D CAD model, and packaging parameters and design criteria to generate a dunnage 3-D CAD model. In particular, the computer 212 can generate 3-D CAD models of the following dunnage types: (i) partition-corrugated dunnage, (ii) tray dunnage, (iii) foam pad dunnage, and (iv) bar dunnage. Of course, computer 212 could also generate 3-D CAD models of other dunnage types known to those skilled in the art.

Figure 24:
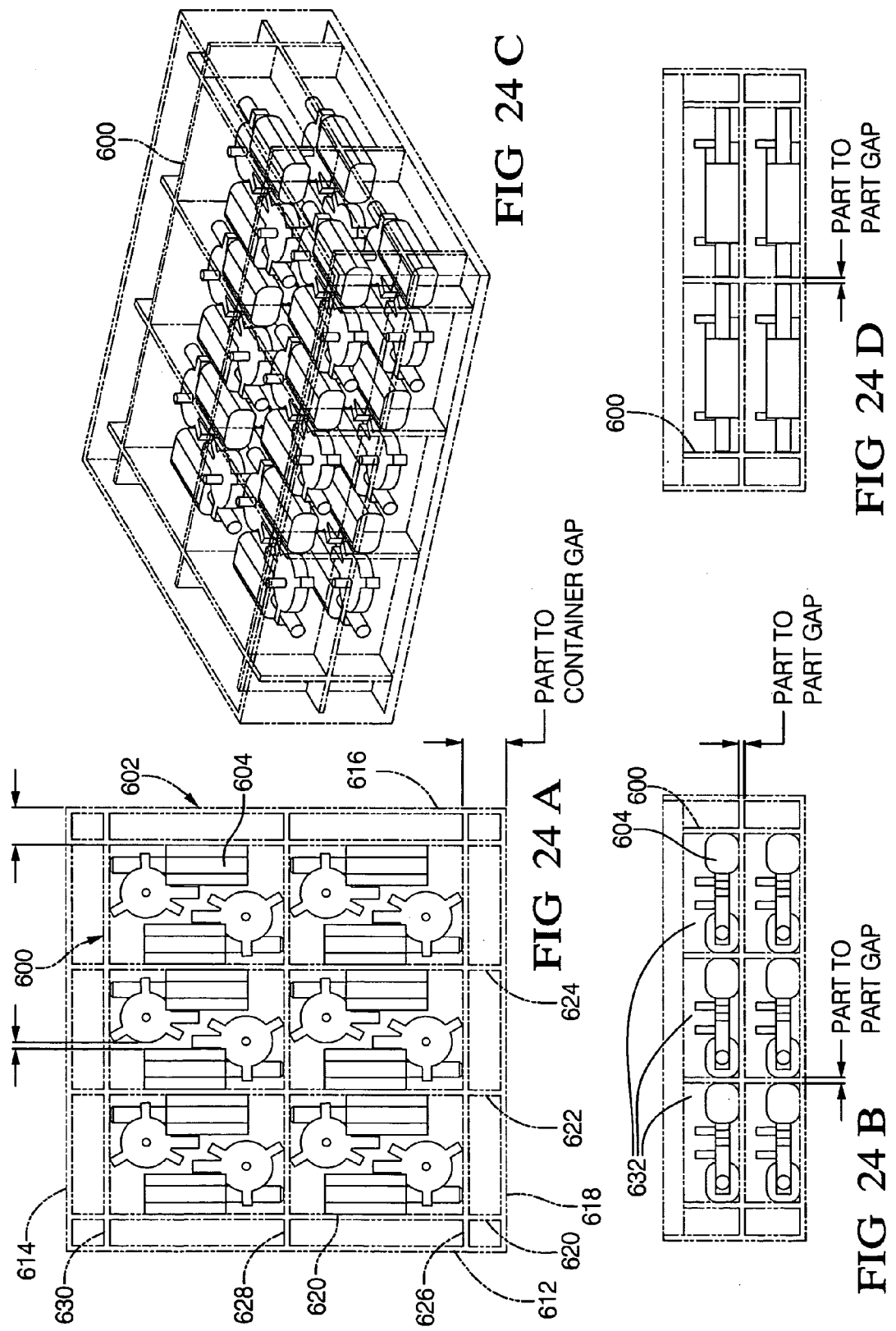
FIGS. 24-29 are exemplary embodiments of dunnage modeling simulations of the present invention.

Referring to FIG. 24, an exemplary partition-corrugated dunnage 3-D CAD model generated by the computer 212 is illustrated. In particular, the computer 212 generates the partition-corrugated dunnage 3-D CAD model 600 utilizing: (i) a container 3-D CAD model 602, and (ii) a plurality of part 3-D CAD models 604, comprising a 3-D part packaging design. The CAD model 600 includes partition walls 620, 622, 624, 626, 628, and 630. The height and length of the partition walls are determined based upon an interior region defined by the container 3-D CAD model 602. The partition walls define a plurality of storage cells 632 for holding the parts therein. As shown, the CAD model 600 includes a part-to-container gap that defines a plurality of air cells between the parts and the walls of the container. Further, the CAD model 600 includes a part-to-part gap that defines a distance between parts that are proximate to one another. The part-to-part gap is substantially equal to the width of each of the partition walls.

Figure 25:
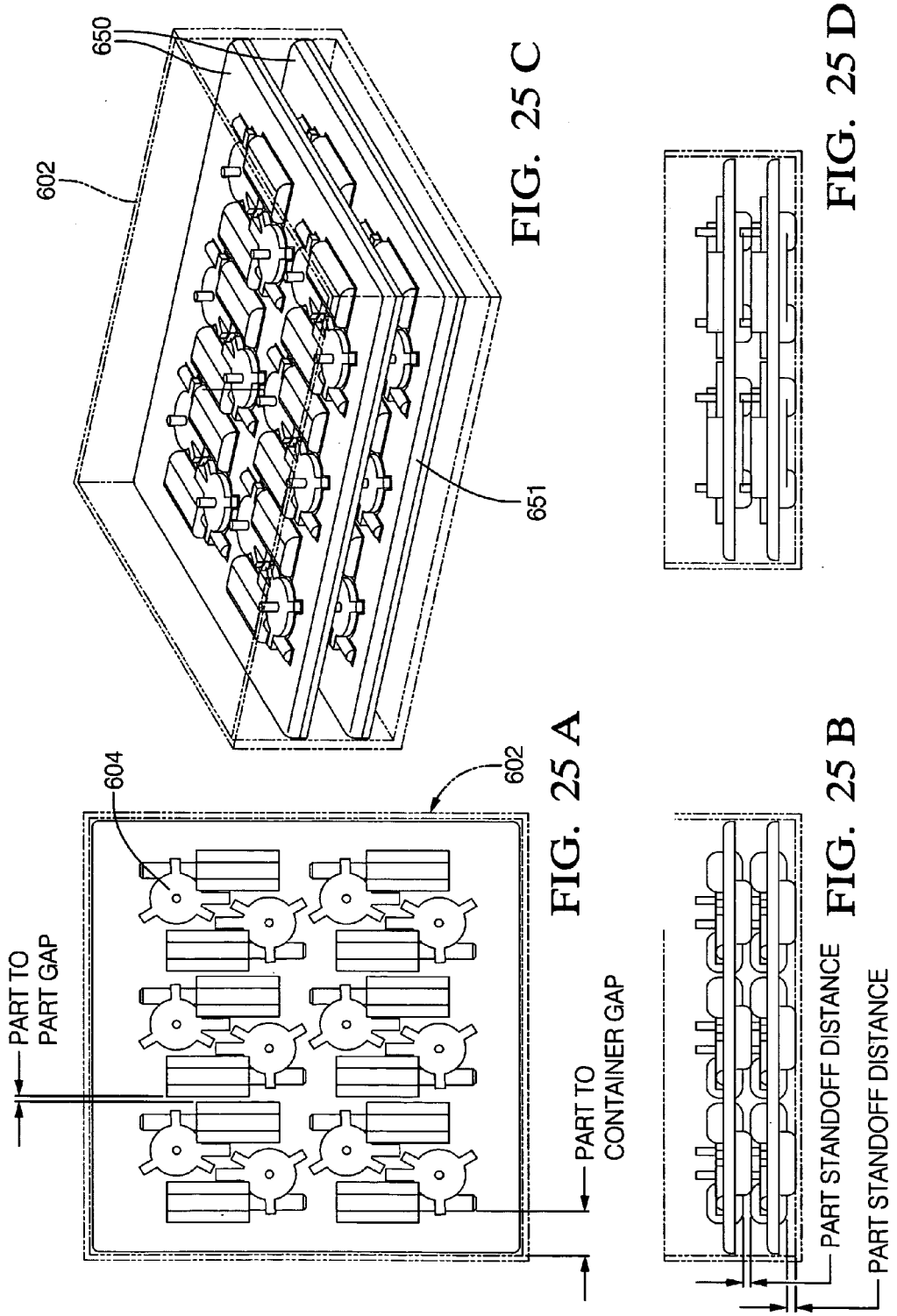

Referring to FIG. 25, an exemplary tray 3-D CAD model generated by the computer 212 is illustrated. In particular, the computer 212 generates the tray dunnage 3-D CAD model 650 utilizing: (i) a container 3-D CAD model 602, and (ii) a plurality of part 3-D CAD models 604, comprising a 3-D part packaging design. The CAD model 650 includes the layer 651 having a plurality of pocket features substantially similar to a surface profile of one side of the part 3-D CAD models 604. The CAD model 650 may further include "stand-offs" to separate part layers, notches/pockets for part extraction, wall draft angles and blends to enable part extraction from tool in forming, tray stiffening features, tray nesting features, and a "hollowing" feature to obtain a tray thickness. The length and the width of the CAD model 650 is determined based upon an interior region defined by the container 3-D CAD model 602. As shown, the CAD model 650 includes a part-to-container gap that defines a minimum distance between a part and a wall of the container.

Figure 26:
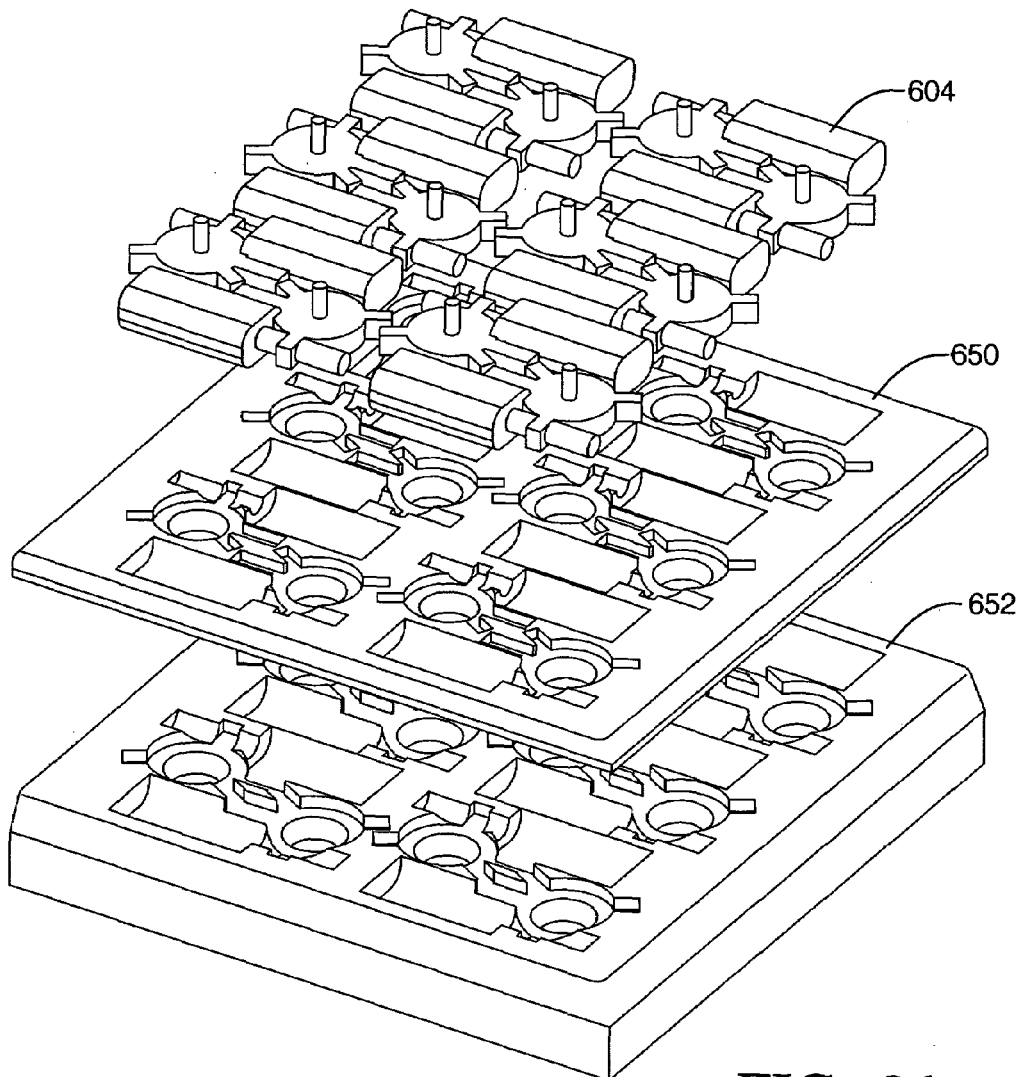
Figure 27:
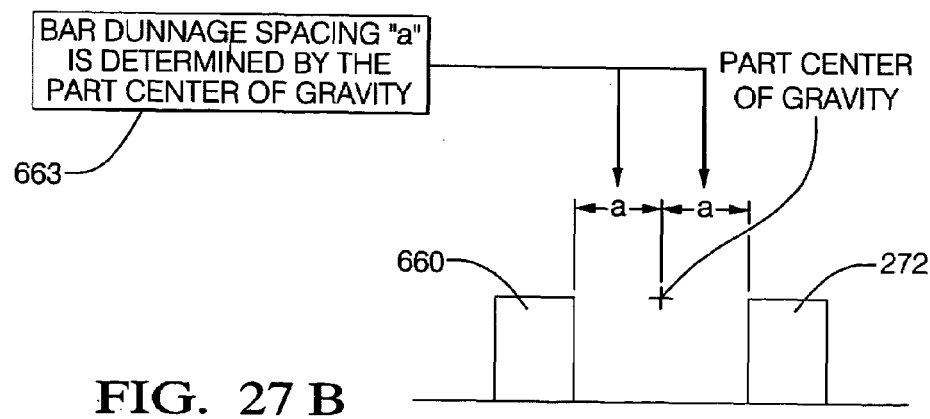
Figure 27:
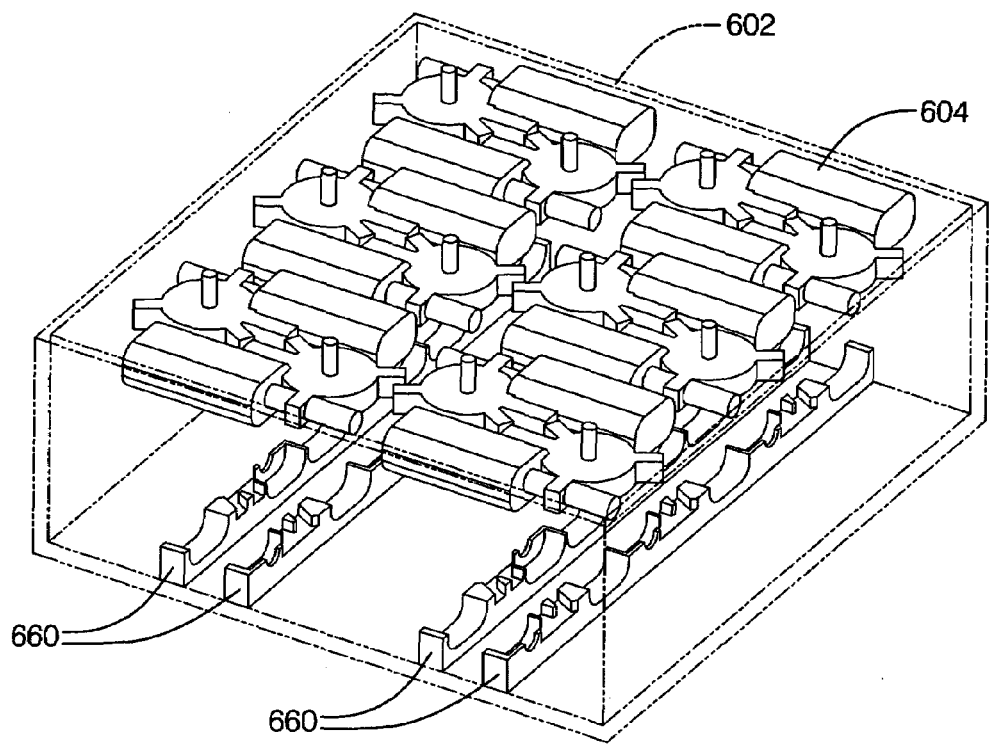

Referring to FIG. 26, an exemplary tray dunnage tool 3-D CAD model 652 is illustrated. The computer 212 can generate the 3-D CAD model 652 utilizing the tray 3-D CAD model 650. The CAD model 652 can be utilized by a computer aided manufacturing (CAM) device for developing a physical tool for producing the tray dunnage. Thus, a CAD representation of a tool for forming the tray is determined at the same time the product configuration and container selection occurs. Therefore, particular costs associated with a particular dunnage design can also be addressed early in the product life-cycle of a part or a plurality of parts.

Referring to FIGS. 27A and 27B, an exemplary bar dunnage 3-D CAD model generated by the computer 212 is illustrated. In particular, the computer 212 generates the bar dunnage 3-D CAD model 660 utilizing: (i) a container 3-D CAD model 602, and (ii) a plurality of part 3-D CAD models 604, comprising a 3-D part packaging design. Each bar 3-D CAD model 660 is generated by extruding a bar cross-section across a container length, width, or height. The plurality of CAD models 660 are positioned with respect to a center-of-gravity of one or more parts and dunnage design rules 663 for balancing a plurality of parts. In order to facilitate the generation of the bar dunnage 3-D CAD model in accordance with this particular embodiment, additional rules-based modeling features can be used. For example, "stand-offs" to separate part layers, notches/pockets for part extraction, bar/log thickness rules based on part weight and protected features as well as resiliency (e.g. foam) of the material used for the bar or log of dunnage, are used when determining a dunnage design.

Figure 28:
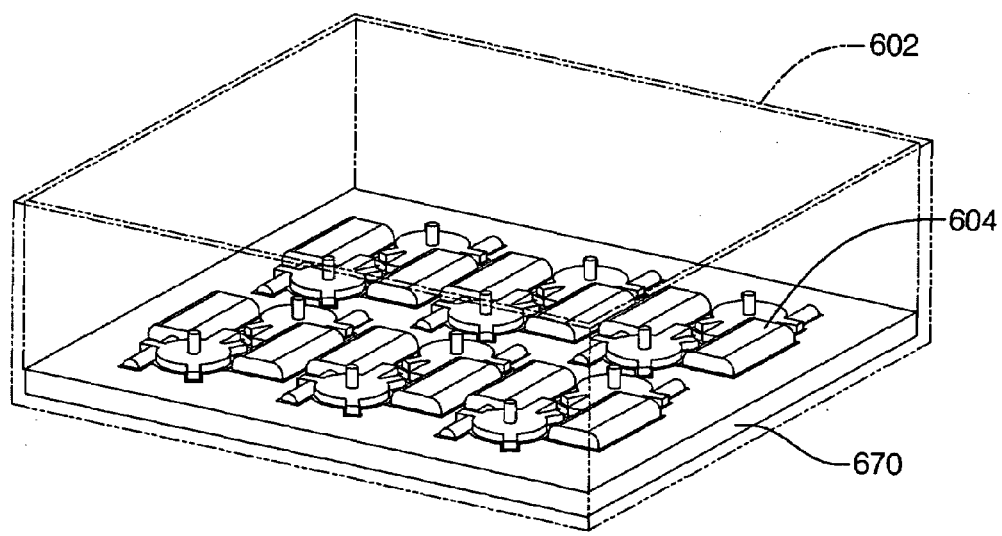
Figure 28:
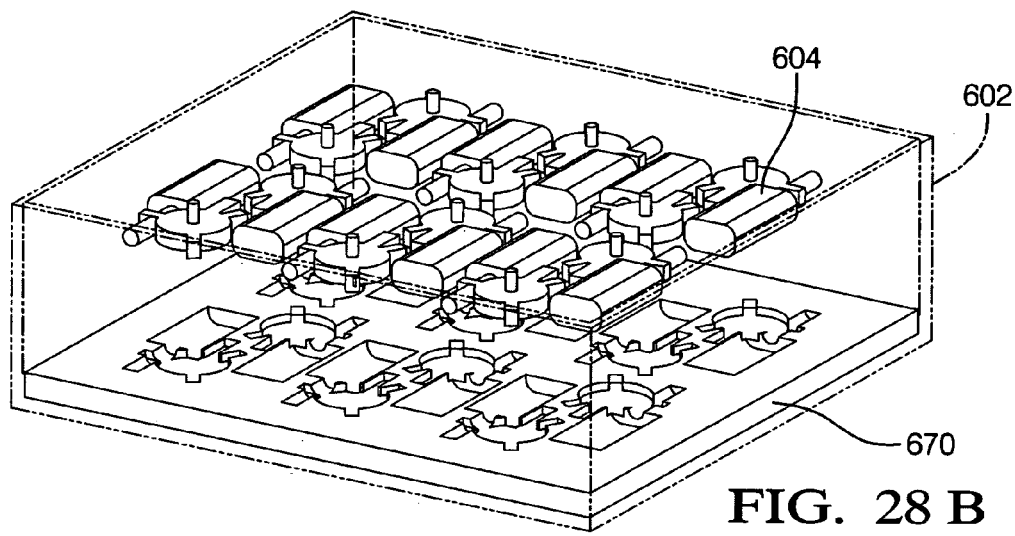
Figure 28:
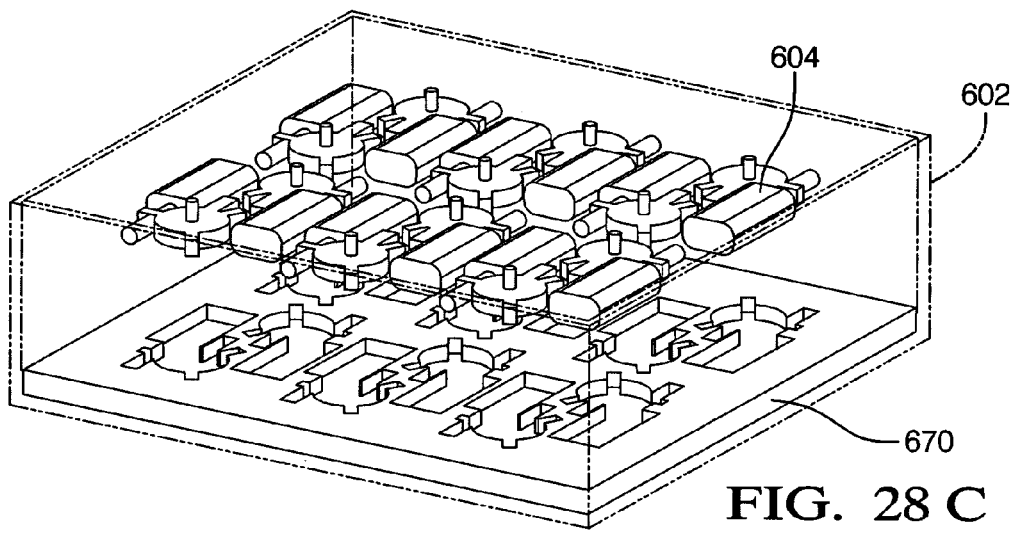
Figure 28:
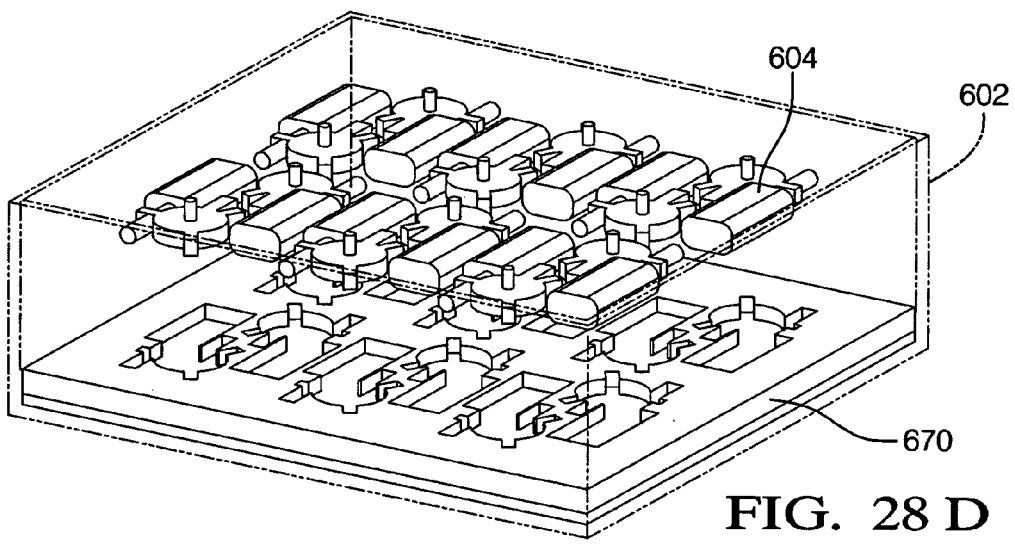

Referring to FIG. 28, an exemplary foam pad dunnage 3-D CAD model generated by the computer 212 is illustrated. In particular, the computer 212 generates the foam pad dunnage 3-D CAD model 670 utilizing: (i) a container 3-D CAD model 602, and (ii) a plurality of part 3-D CAD models 604, comprising a 3-D part packaging design. The 3-D CAD model 670 is generated by: (i) extruding a rectangle a predetermined distance to obtain a 3-D sheet, and (ii) subtracting geometric features of a bottom or top portion of the part 3-D CAD models 604 from the 3-D sheet to form pockets or depressions for receiving the parts therein. The CAD model 670 may further include "stand-offs" to separate part layers, notches/pockets for part extraction, and exterior foam layers with no pockets.

Figure 29:
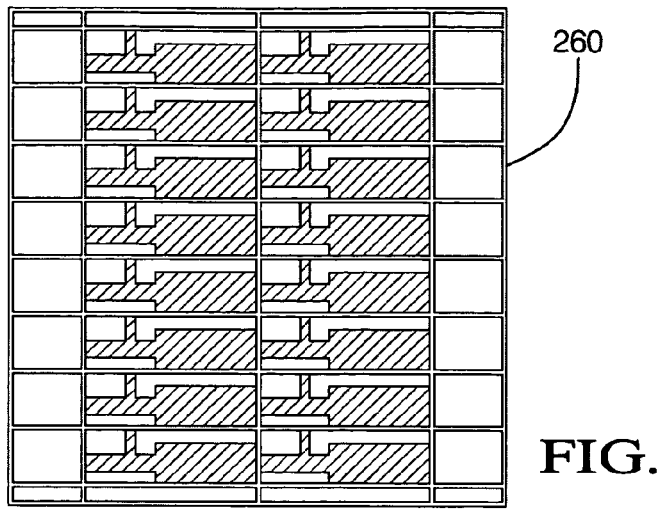
Figure 29:
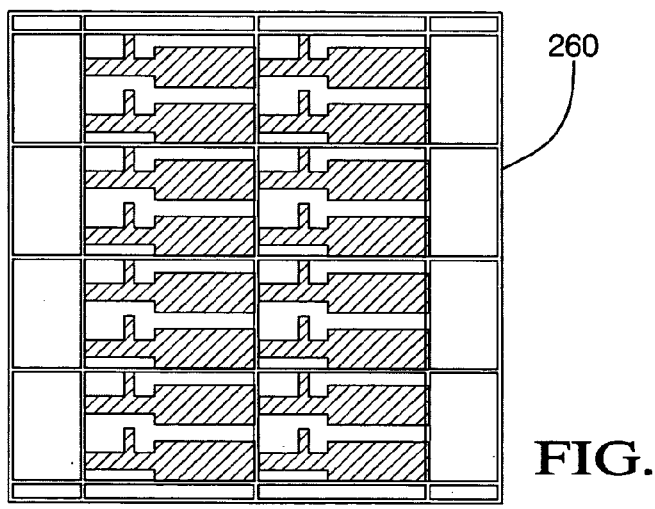
Figure 29:
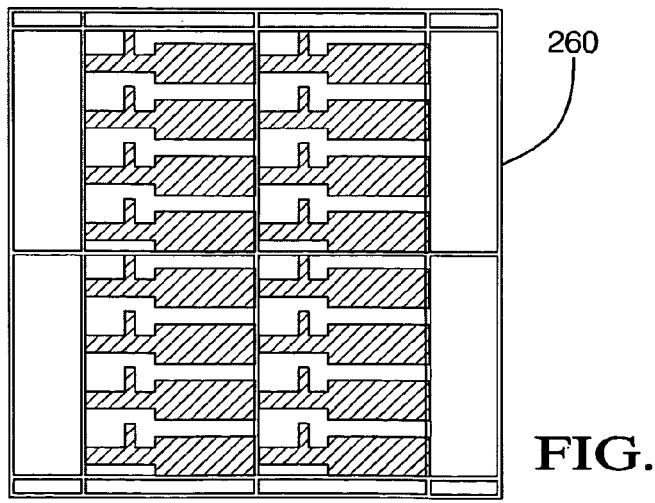

Referring to FIGS. 29A-29C, yet another alternative embodiment is illustrated in which interactive and automatic mode display enhancements for the "Partition" dunnage style are implemented into the simulation program. Typically, the distributing of parts in a container is currently limited to one or two parts per cell, see for example FIG. 29A however, through the use of the simulation program additional (optional) part distribution will be unlimited per cell, (i.e., one, two, four, six, etc., See also FIGS. 29B and 29C). Accordingly, the parts will be redistributed and displayed in each cell of the dunnage. The partition-style dunnage design is determined based upon the desired part-per-cell count, therefore the simulation program will not only be able to provide an optimal configuration (e.g., part-to-part) the same will also be able to provide representation of a cell-to-cell arrangement as well as performing the dunnage analysis illustrated in FIGS. 24A-24D.

Figure 30:
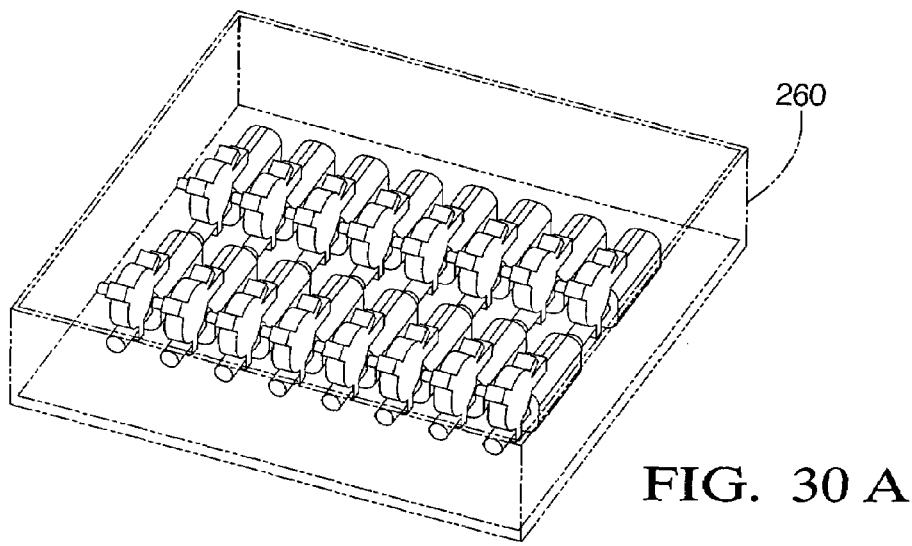
FIGS. 30-33 are exemplary embodiments of various nesting modeling simulations of the present invention.
Figure 30:
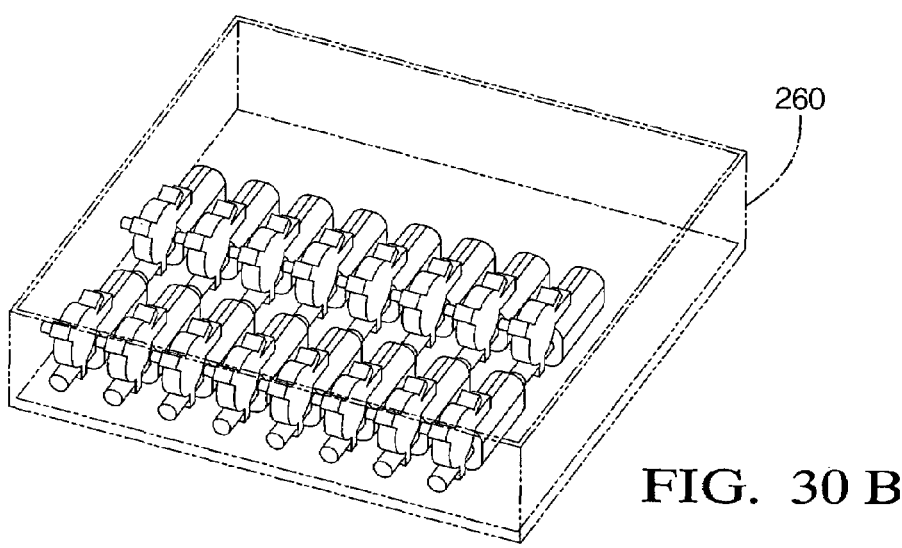
Figure 30:
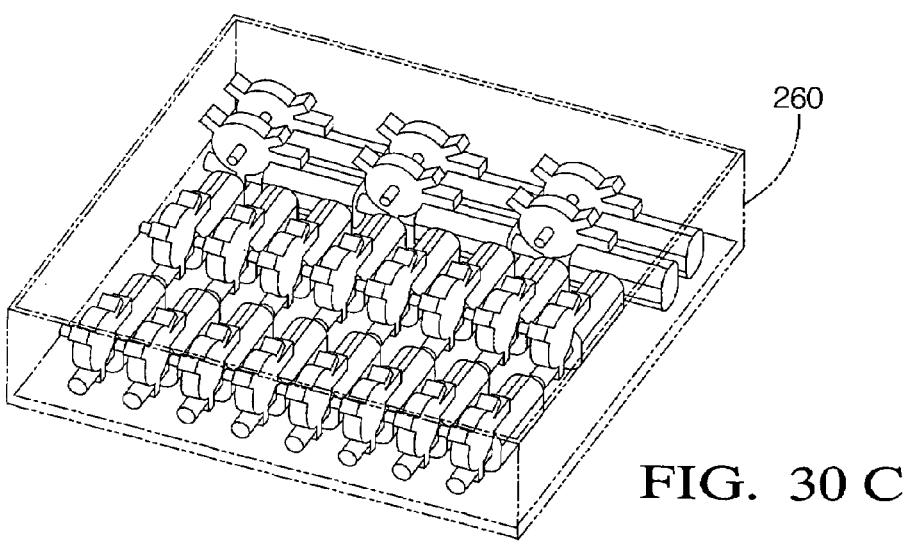

Referring to FIGS. 30A-30C, another alternative embodiment is illustrated. Here interactive and automatic mode display enhancements for distributing (non-pattern orientation) additional parts into a dense part/container layout are implemented into the simulation program. These additional parts are placed in the container using the same "part-to-part gap" and "part-to-container gap" packaging parameters; but with different orientation that is developed for the dense two-part pattern array. For example, FIG. 30A illustrates a simulation for a dense part layout centrally located in a container (e.g., uniform exterior part to wall clearance) while FIG. 30B illustrates a 3-D CAD model having a dense part layout located or centralized about one corner of the container. In addition, FIG. 30C illustrates a 3-D CAD model having a dense part layout of a first set of parts having a unique configuration while an additional set of non-pattern orientated parts are placed within the same container to maximize usage of the container volume. Accordingly, a greater part per container density is realized with this display enhancement.

The 3-D packaging optimization computer 212 allows dunnage tools such as dies, injection molds and vacuum forming tools to be designed and at the same time the product and/or the product packing or shipping configuration is being made. Further, the dunnage is being conformed to the shape of the part during the same time the product and/or the product packing or shipping configuration is being made. Thus, the user is provided with dunnage designs and associated costs while the any one of the following is also being simultaneously performed: product design, product shipping configuration, product shipping method (air, land, sea) and related costs, special product shipping handling requests, customer preference for container and availability and cost.

The computer 212 also provides additional automated dunnage design options including: (i) automatically generating Computer Numerical Control (CNC) cutter-path codes for any of the above-mentioned dunnage 3-D CAD models, and (ii) automatically generating rapid prototypes based on the CND cutter path codes using CAM cutting equipment. Further, the computer 212 can be configured to optimize a casting design for forming one or more parts in a casting process.

Referring to FIGS. 41-45, a method for automatically generating a dunnage design is illustrated. In particular, the computer 212 implements the method to allow a user to generate the following dunnage types: (i) a partition-corrugated dunnage, (ii) a tray dunnage, (iii) a foam pad dunnage, and (iv) a bar dunnage. Of course, the computer 212 could also generate 3-D CAD models of other dunnage types known to those skilled in the art.

At step 702, the computer 212 retrieves from a memory the following packaging parameters: (i) part-to-part gap, (ii) part-to-container gap, (iii) part layout 3-D CAD models, and (iv) a container 3-D CAD model defining a receiving region.

At step 704, the computer 212 requests that a user select one of the following dunnage types: (i) partition-corrugated dunnage, (ii) tray dunnage, (iii) foam dunnage, and (iv) bar dunnage.

At step 706, the computer 212 makes a determination as to whether the user selected to generate a partition-corrugated dunnage design. If the value of step 760 equals "yes", the method advances to step 708. Otherwise, the method advances to step 720.

At step 708, the computer 212 allows a user to input design criteria including one or more of the following: (i) design rules-guidelines, (ii) material properties, (iii) material cost, (iv) part protection requirements, (v) part presentation requirements for loading or unloading parts, (vi) ergonomic requirements, and (vii) economic requirements.

At step 710, the computer 212 determines dunnage parameters based on the packaging parameters. In particular, the computer 212 utilizes the part-to-part gap to define: (i) a partition thickness, (ii) a partition notch width, (iii) a partition clearance, and (iv) a partition location. Further, the computer 212 utilizes the part-to-container gap to define an air cell size, and the part layer size to define a partition height.

At step 712, the computer 212 allows a user to select whether "one" or "two" parts are to be contained within each partition cell.

At step 714, the computer 212 automatically generates a partition-corrugated dunnage 3-D CAD model using: (i) the packaging parameters, (ii) the dunnage parameters, and (iii) the design criteria.

At step 716, the computer 212 allows a user to perform the following functions on the partition-corrugated dunnage 3-D CAD model: (i) add/remove partition, (ii) move partition, (iii) create partition notches, (iv) add/remove partition geometry, (v) retrieve dunnage information such as a bill of materials, and (vi) create CAD drawing of partitions and partition layout.

At step 718, the computer 212 translates a CAD drawing of the partitions into a format for a CAM cutting machine to cut a partition-corrugated dunnage design from a sheet of material. After step 718, the method is exited.

Referring again to step 720, the computer 212 makes a determination as to whether the user selected to generate a tray dunnage design. If the value of step 720 equals "yes", the method advances to step 722. Otherwise, the method advances to step 732.

At step 722, the computer 212 determines dunnage parameters for the tray dunnage design based on the packaging parameters. In particular, the computer 212 utilizes the part-to-part gap and the part-to-container gap to define the tray thickness. Further, the computer 212 utilizes the part layer size to define a tray height.

At step 724, the computer 212 allows a user to input design criteria including one or more of the following: (i) design rules-guidelines, (ii) material properties, (iii) material cost, (iv) part protection requirements, (v) part presentation requirements for loading or unloading parts, (vi) ergonomic requirements, and (vii) economic requirements.

At step 726, the computer 212 automatically generates a tray dunnage 3-D CAD model using (i) the packaging parameters, (ii) the dunnage parameters, and (iii) the design criteria.

At step 728, the computer 212 allows a user to perform the following functions on the tray dunnage 3-D CAD model: (i) define/edit tray height, (ii) define/edit tray draft angle or draw direction, (iii) define/edit tray standoffs and pockets, (iv) create exact/offset part cutout, (v) add/remove tray geometry, (vi) create tray, and (vii) retrieve dunnage information such as a bill of materials.

At step 730, the computer 212 generates a rapid prototype file for a CAM cutting machine to cut a tray dunnage design from a sheet of material. After step 730, the method is exited.

Referring again to step 732, the computer 212 makes a determination as to whether the user selected to generate a foam pad dunnage design. If the value of step 732 equals "yes", the method advances to step 734. Otherwise, the method advances to step 750.

At step 734, the computer 212 allows a user to input design criteria including one or more of the following: (i) design rules-guidelines, (ii) material properties, (iii) material cost, (iv) part protection requirements, (v) part presentation requirements for loading or unloading parts, (vi) ergonomic requirements, and (vii) economic requirements.

At step 736, the computer 212 determines dunnage parameters for the foam pad dunnage design based on the packaging parameters. In particular, the computer 212 utilizes the part-to-part gap and the part-to-container gap to define the foam pad thickness. Further, the computer 212 utilizes the part layer size to define a foam pad height.

At step 738, the computer 212 automatically generates top and bottom foam pad dunnage 3-D CAD models using: (i) the packaging parameters, (ii) the dunnage parameters, and (iii) the design criteria.

At step 740, the computer 212 allows a user to perform the following functions on the foam pad dunnage 3-D CAD models: (i) create top and bottom pad, (ii) define/edit top and bottom pad heights, (iii) create exact/offset part cutout, (iv) create parameter/offset cut out, (v) add/remove pad geometry, and (vi) retrieve dunnage information such a bill of materials.

At step 742, the computer 212 generates a rapid prototype file for a CAM cutting machine to cut a top foam pad dunnage design and a bottom foam pad dunnage design from a sheet of material. After step 742, the method is exited.

Referring again to step 750, the computer 212 makes a determination as to whether the user selected to generate a foam bar dunnage design. If the value of step 750 equals "yes", the method advances to step 752. Otherwise, the method is exited.

At step 752, the computer 212 allows a user to input design criteria including one or more of the following: (i) design rules-guidelines, (ii) material properties, (iii) material cost, (iv) part protection requirements, (v) part presentation requirements for loading or unloading parts, (vi) ergonomic requirements, and (vii) economic requirements.

At step 754, the computer 212 determines dunnage parameters for the foam bar dunnage design based on the packaging parameters. In particular, the computer 212 utilizes the part-to-part gap and the part-to-container gap to define the foam bar thickness. The computer 212 utilizes the part/container layer size to define the foam bar height. Further, the computer 212 calculates the center of gravity and location for each part. Further, the computer 212 generates foam bars for each row or column of parts for a given layer of parts within the container. Still further, the computer retrieves dunnage information such as a bill of materials.

At step 756, the computer 212 automatically generates one or more foam bar 3-D CAD models using: (i) the packaging parameters, (ii) the dunnage parameters, and (iii) the design criteria.

At step 758, the computer 212 allows a user to perform the following functions on a foam bar dunnage 3-D CAD model: (i) define/edit bar height and width, (ii) define/edit bar location and separation, (iii) create exact/offset part cutout, (iv) create parameter/offset cut out, and (v) add/remove bar geometry.

At step 760, the computer 212 generates a rapid prototype file for a CAM cutting machine to cut a foam bar dunnage design from a sheet of material. After step 760, the method is exited.

Thus, the system and methods disclosed herein allows 3-D modeling to determine a unique product configuration for a particular container and part orientation layout. Further, because the 3-D modeling system of exemplary embodiments allows for modifications to be made, particular part orientation layouts and containers may be selected based upon overall affect on the product cost or lifecycle. Accordingly, best solutions may be obtained for each container size which could be based upon any one of the following: parts per container; part orientation per container, wherein less parts are included for a more preferred orientation which may relate to insertion and removal from the container and/or related dunnage materials, as well as shipping method. For example, shipping methods that encounter high stress forces may require larger amounts of dunnage, which in turn may affect part per container orientation that may also affect the number of parts per container.

Further, once the container and part orientation (e.g., arrangement of part to part arrays within a predetermined configuration) is determined, the dunnage and related dunnage tools are designed in an automated process. Thus, the dunnage design and related tools are also optimized while the container and part orientation are optimized. Further, and through the collaborative engineering techniques disclosed herein container costs related to shipping methods, container availability, customer preference etc. are also brought in line with the optimization process. Therefore, part-to-part orientation, container selection and related dunnage designs are maximized or optimized having the benefits of the preferred or provided rules of the various aspects affecting the product life cycle.

Figure 31:
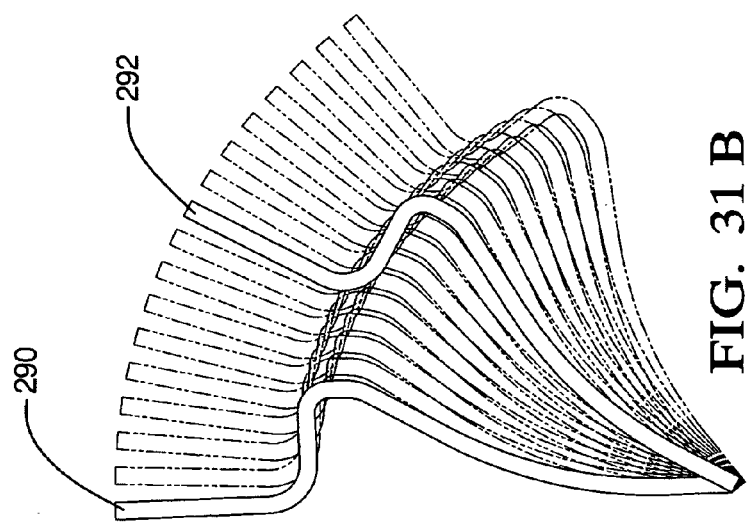
Figure 31:
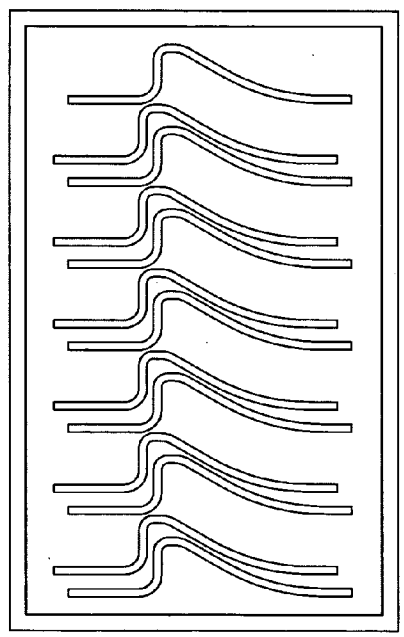
Figure 31:
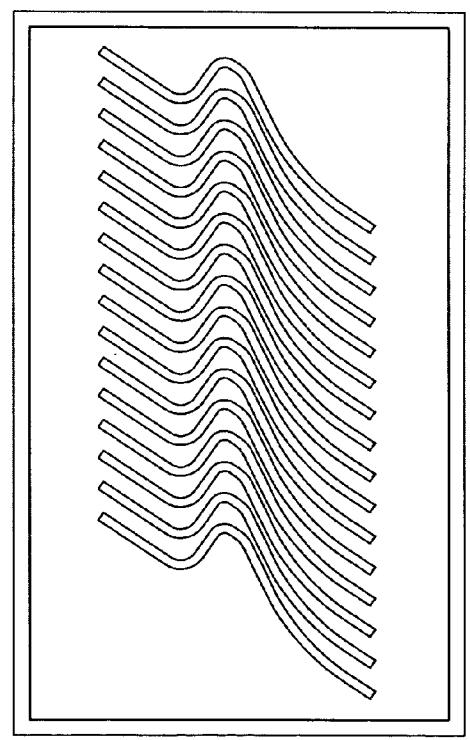
Figure 32:
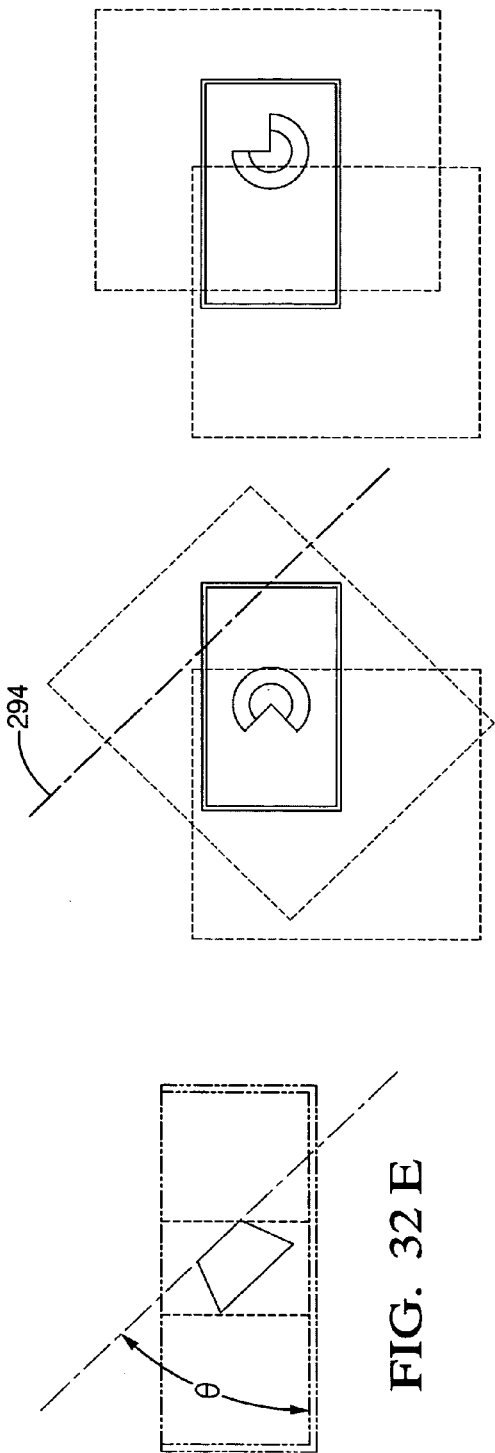
Figure 33:
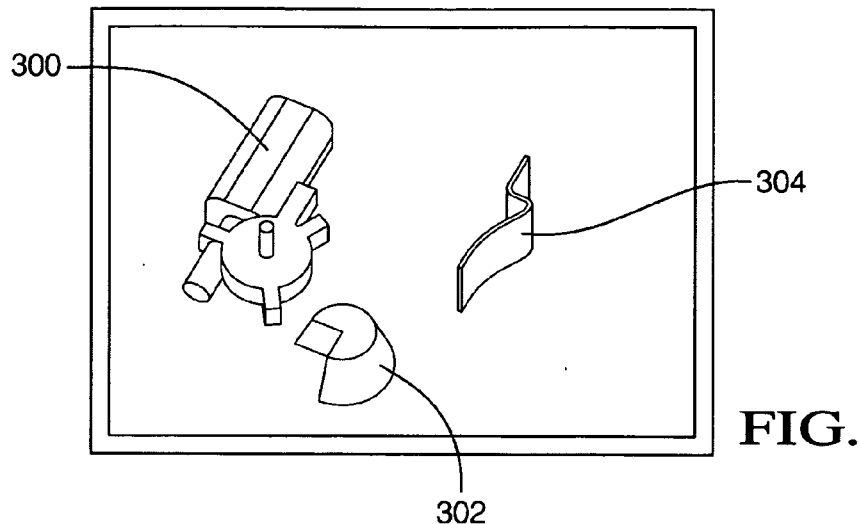
Figure 33:
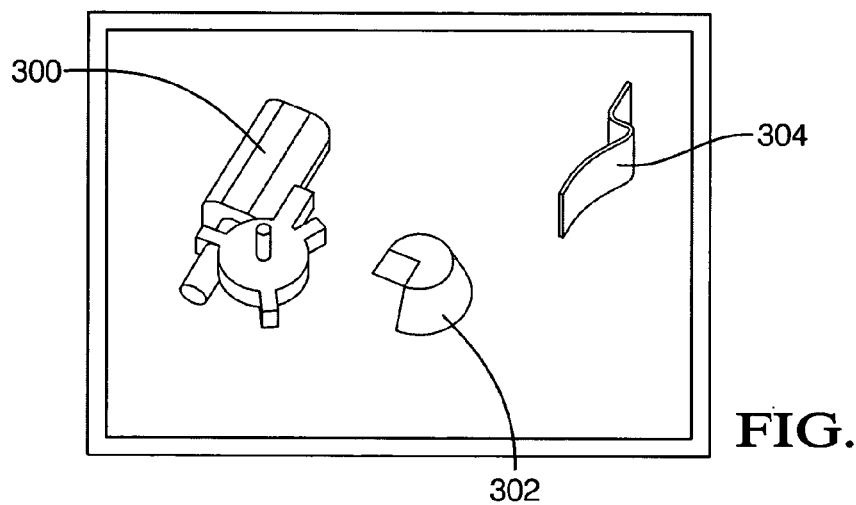
Figure 33:
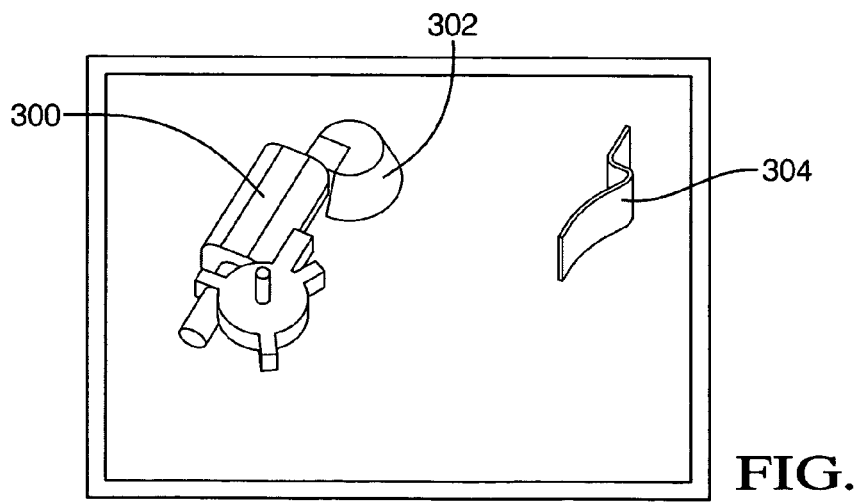

Referring to FIGS. 31A-31C, an illustration of a cylindrical and spherical coordinate system for development of a two-part pattern and for a two-part pattern-to-container orientation is provided. These additional coordinate systems are used in the NESTING routine of the simulation program disclosed herein. For example, and referring to FIG. 31B a primary part 290 is cyclically positioned using cylindrical or spherical coordinates (illustrated by the dashed lines in FIG. 31B) until the simulation program provides an optimal primary part position 292 wherein the nesting portion of the program provides an optimal part/container layout (FIG.

31C). Accordingly, and in comparison to the part layout using Cartesian coordinates for a two-part pattern development (FIG. 31A) a greater amount of parts are capable of being transported in a particular container (FIG. 31C) using this modeling technique. Accordingly, and depending on the angular configuration of the particular part the modeling software in accordance with exemplary embodiments of the present invention allows an angular representation of the primary part to be included in the optimization process.

Referring to FIGS. 32A-32I, an illustration of a method for orientation of the primary part to container coordinate system is illustrated. Again, the method of orientation of the primary part to a container coordinate system is adapted for use in the NESTING routine of the simulation program. In this embodiment, planes for orientation are defined on the part to be packaged. An intersection line is created between one of these part planes and one of the principal planes of the container and the angle between these planes is measured. For example, the angle θ illustrated in FIG. 32E. The part to be packaged is rotated about an intersection line 294 by the measured angle between these intersecting planes wherein a desired part container layout (FIGS. 32H and 32I) is achieved. Therefore, a horizontal plane to plane configuration is achieved for optimizing the packaging configurations.

Referring to FIGS. 33A-33F, an illustration of a method for multiple mixed part/container layout simulation is illustrated. As with the all of the exemplary embodiments of the present invention the simulation program of this embodiment is contemplated with the interactive and automatic modes of the nesting program. Here, multiple unique parts of unique different configurations are used in developing the part/container layout, (i.e., a mixed-pack design). In this embodiment, a primary part 300 is positioned and oriented while a second part 302 is positioned and oriented using any of the available coordinate systems, (i.e., Cartesian, cylindrical or spherical). The NESTING routine is then used to develop the two part-pattern (illustrated in FIG. 33C). Additional parts having unique configurations are positioned and oriented one at a time with the existing parts-pattern and nested using the simulation program NESTING routine. For example, a third or additional part 304 is then nested with the two part pattern. Accordingly, and after a final parts-pattern 306 is developed (FIG. 33d), the parts-pattern is arrayed (x,y,z) for considered layouts with a container list (FIGS. 33E and 33F) using any one of the methodologies discussed herein.

Figure 34:
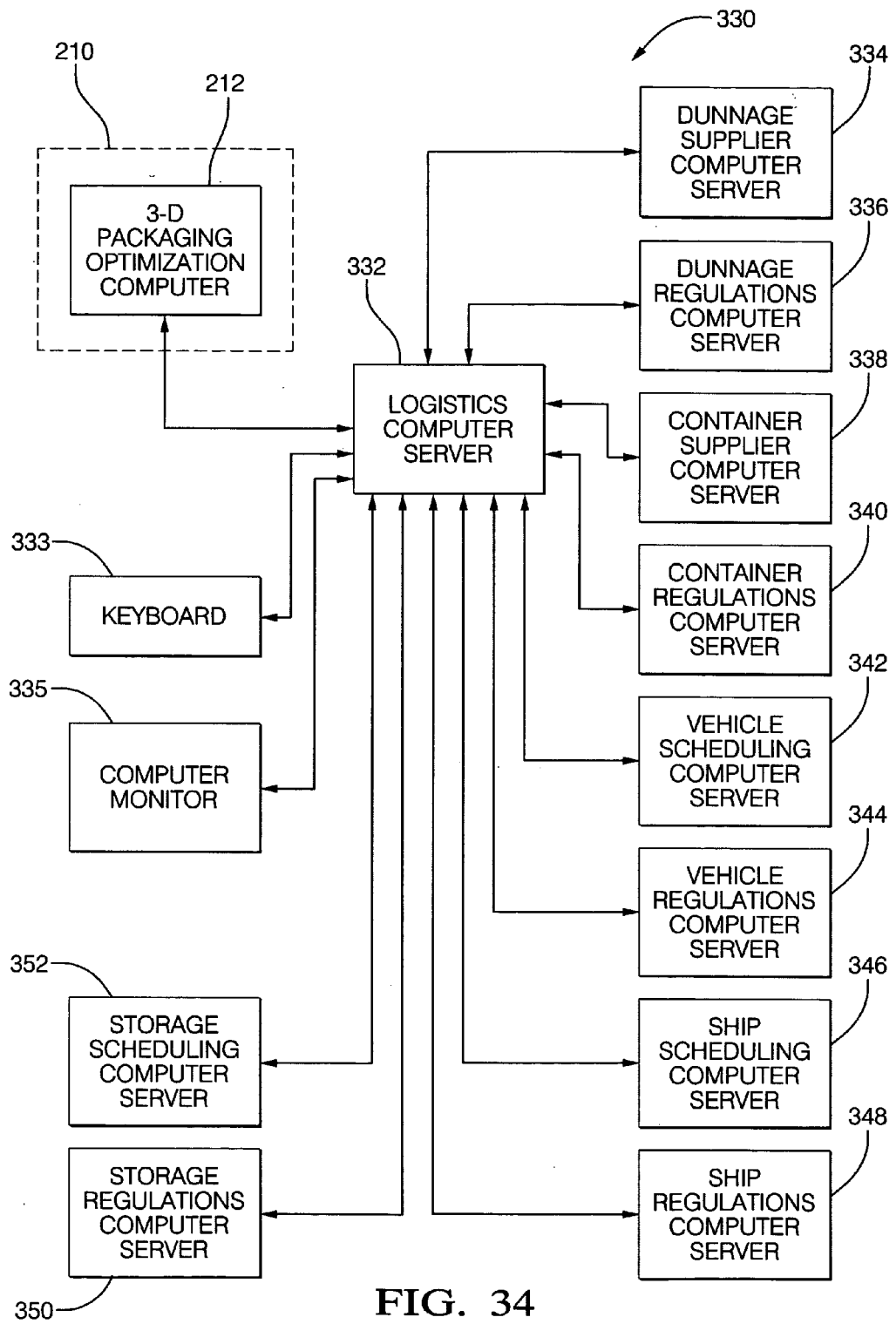
FIG. 34 is a diagrammatic illustration of a logistics subsystem that can collaborate with the exemplary embodiment of FIG. 21.
Figure 35:
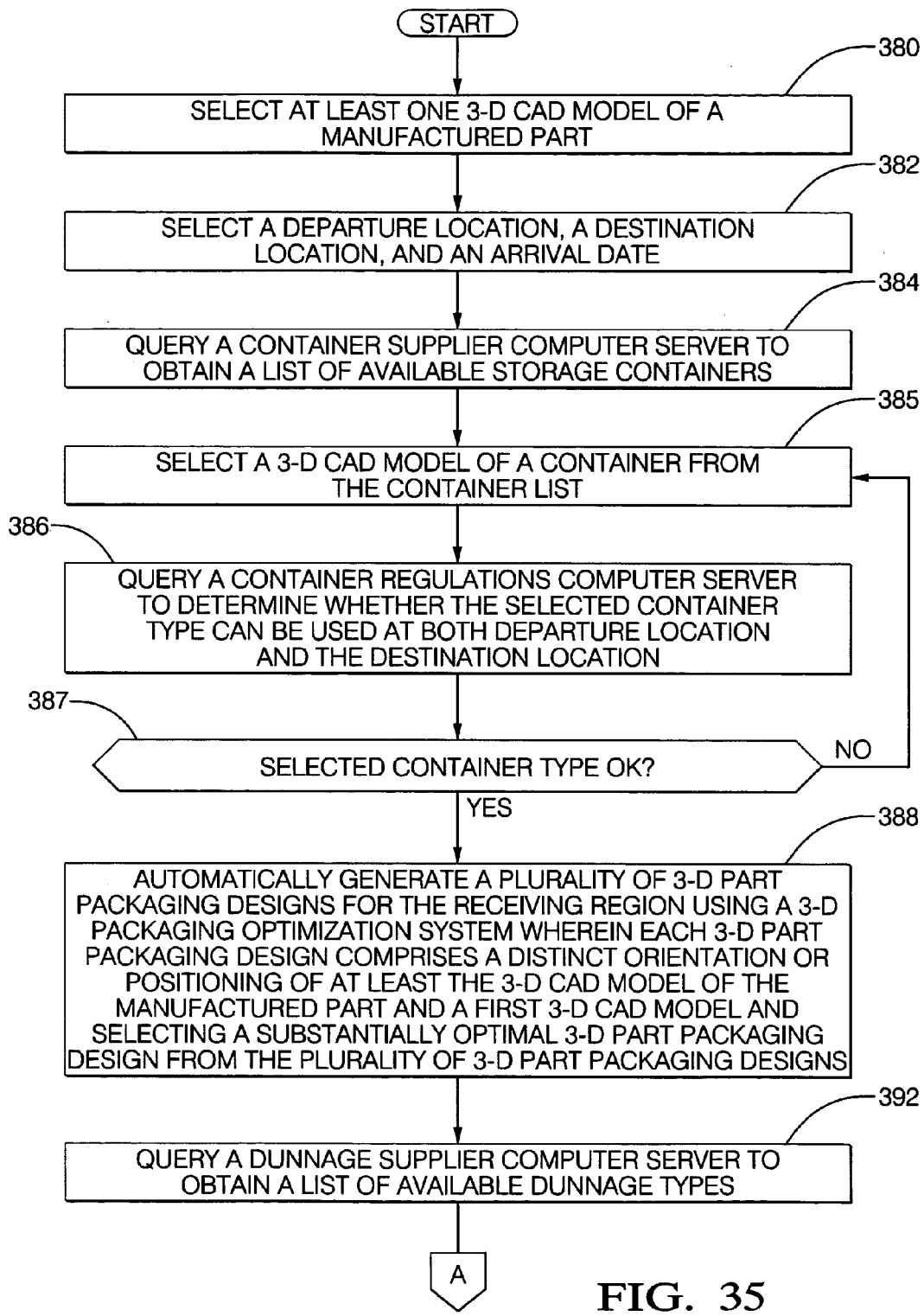
FIGS. 35-40 are flowcharts of a method for estimating transportation costs utilizing the logistics subsystem of FIG. 34.
Figure 36:
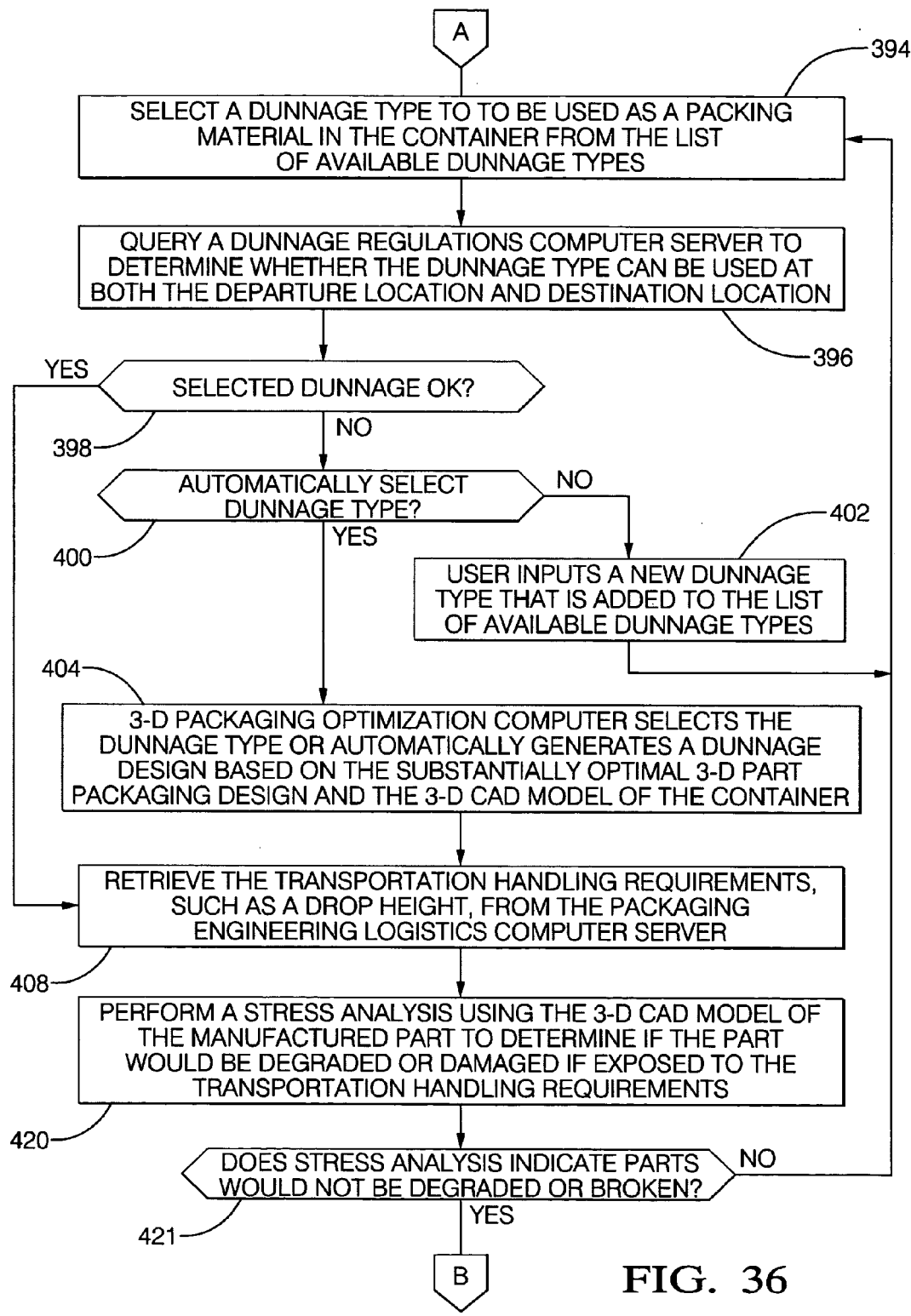
Figure 37:
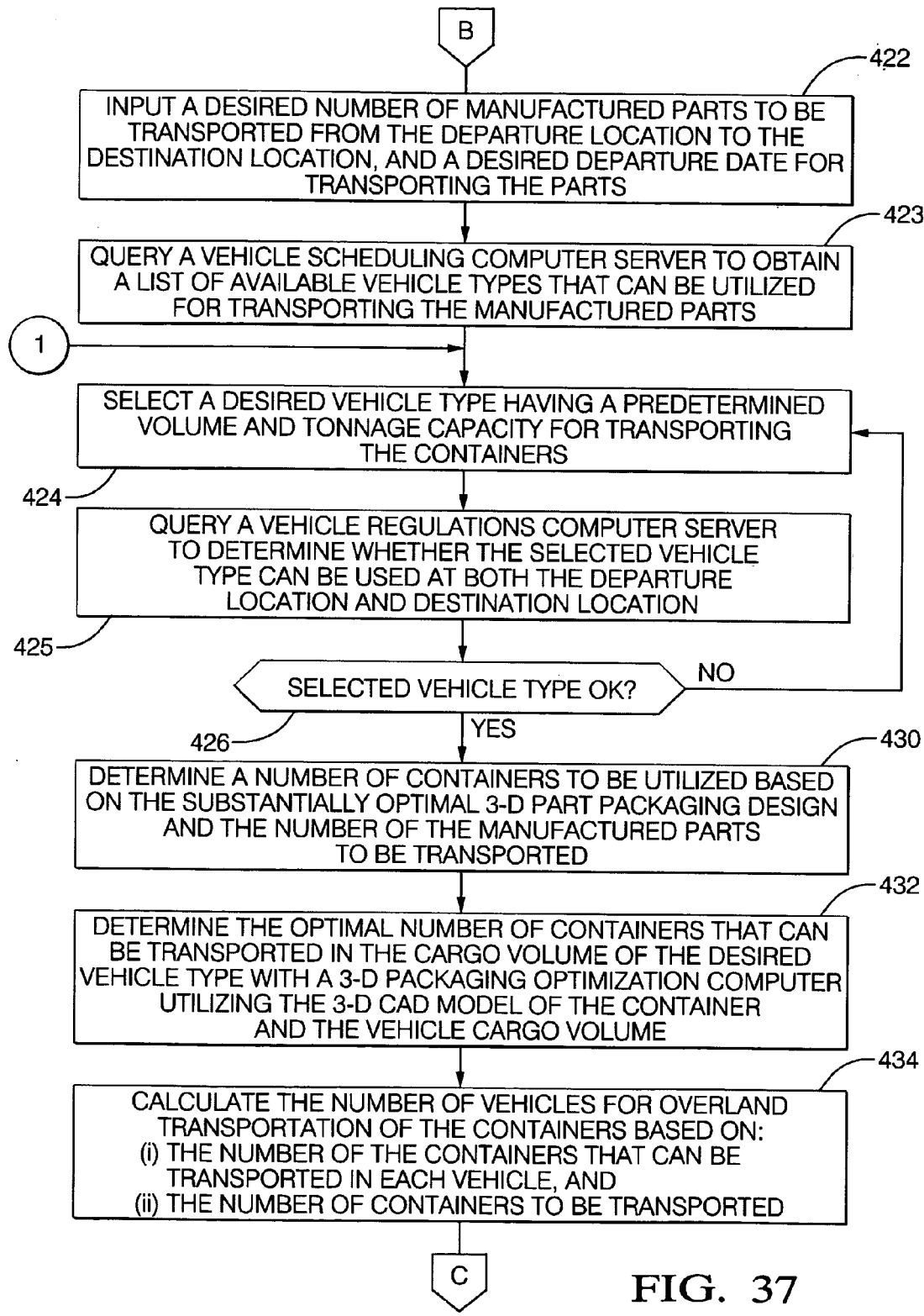
Figure 38:
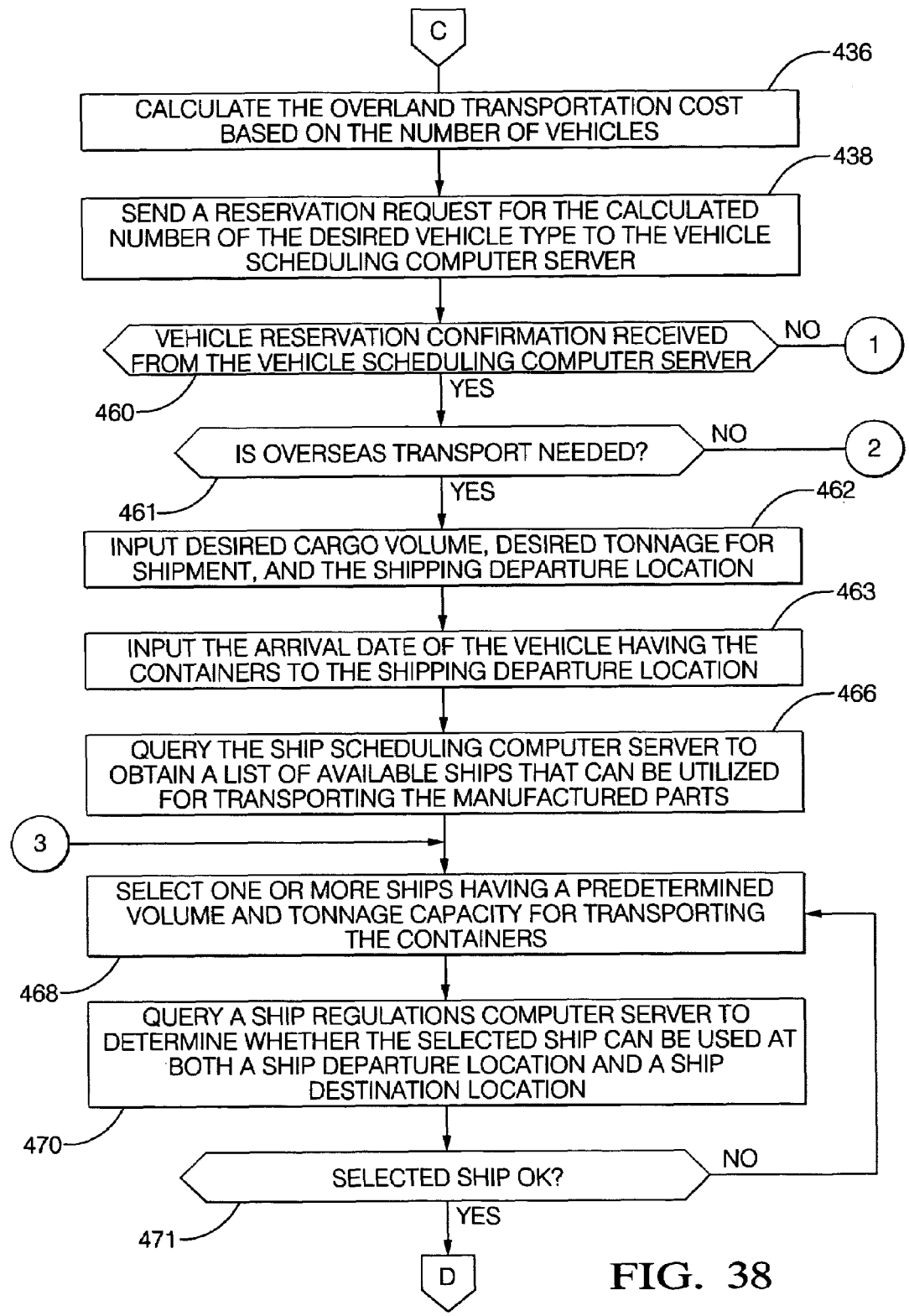
Figure 39:
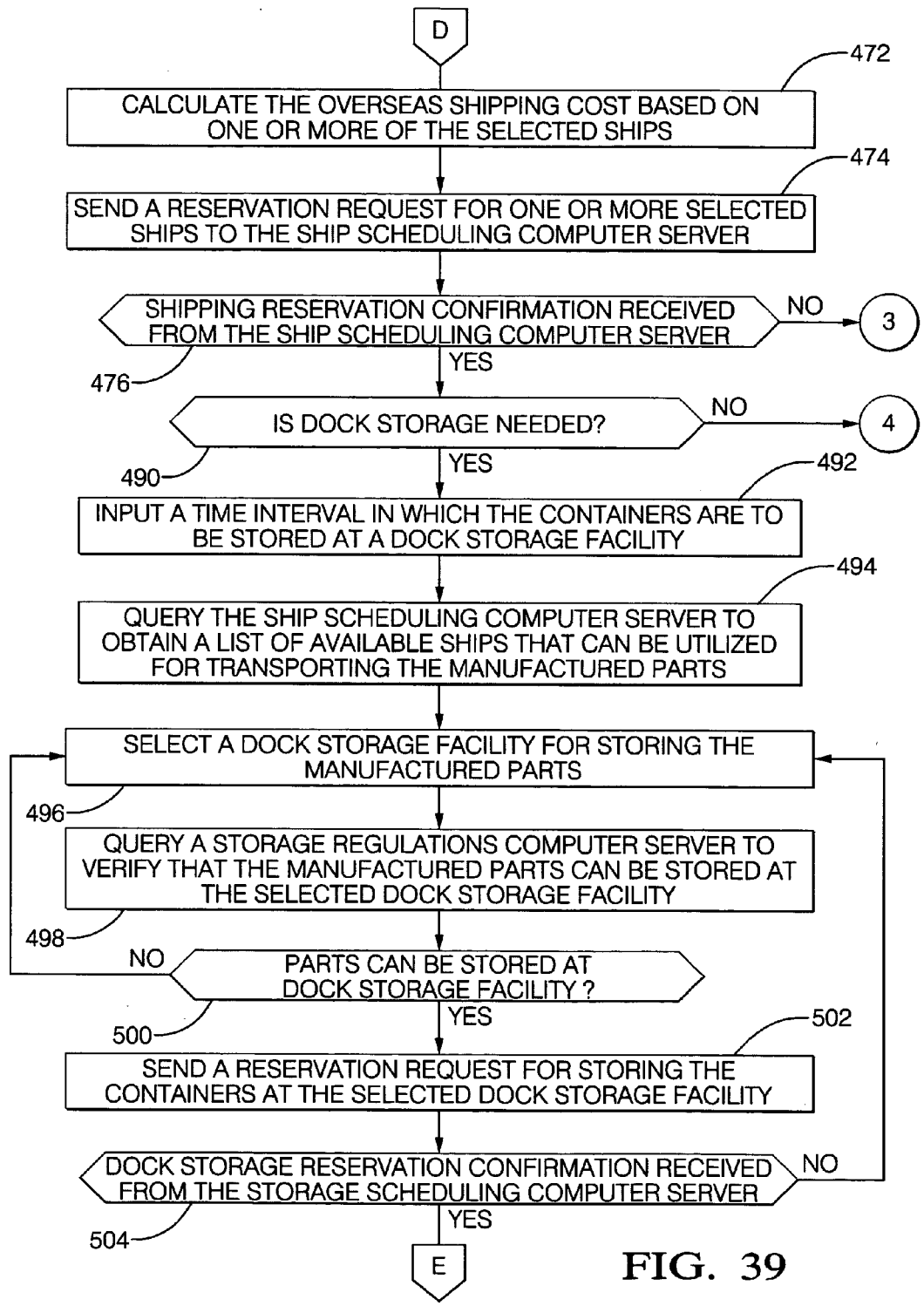
Figure 40:
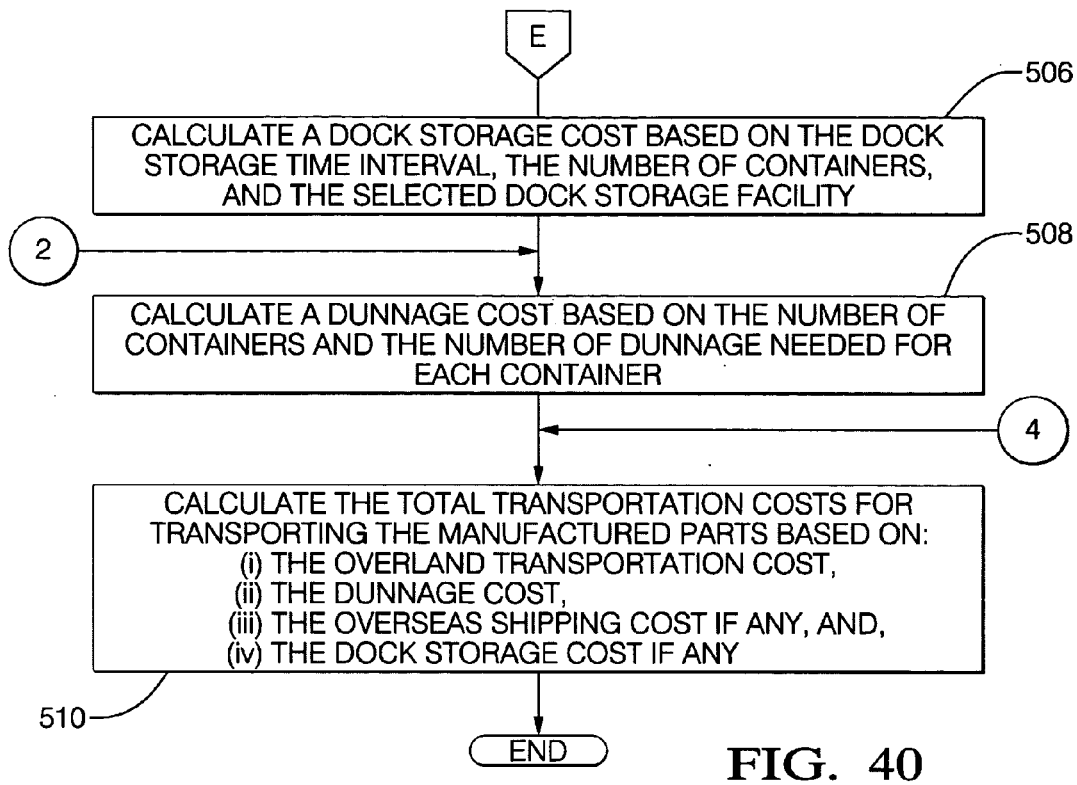
Figure 41:
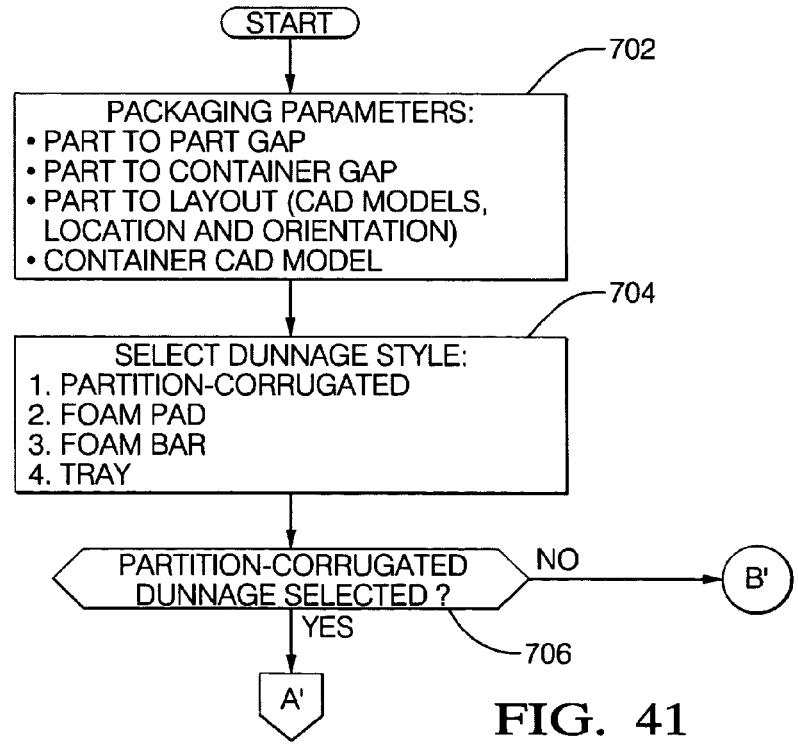
FIGS. 41-45 are flowcharts of a method for automatically generating dunnage designs.
Figure 42:
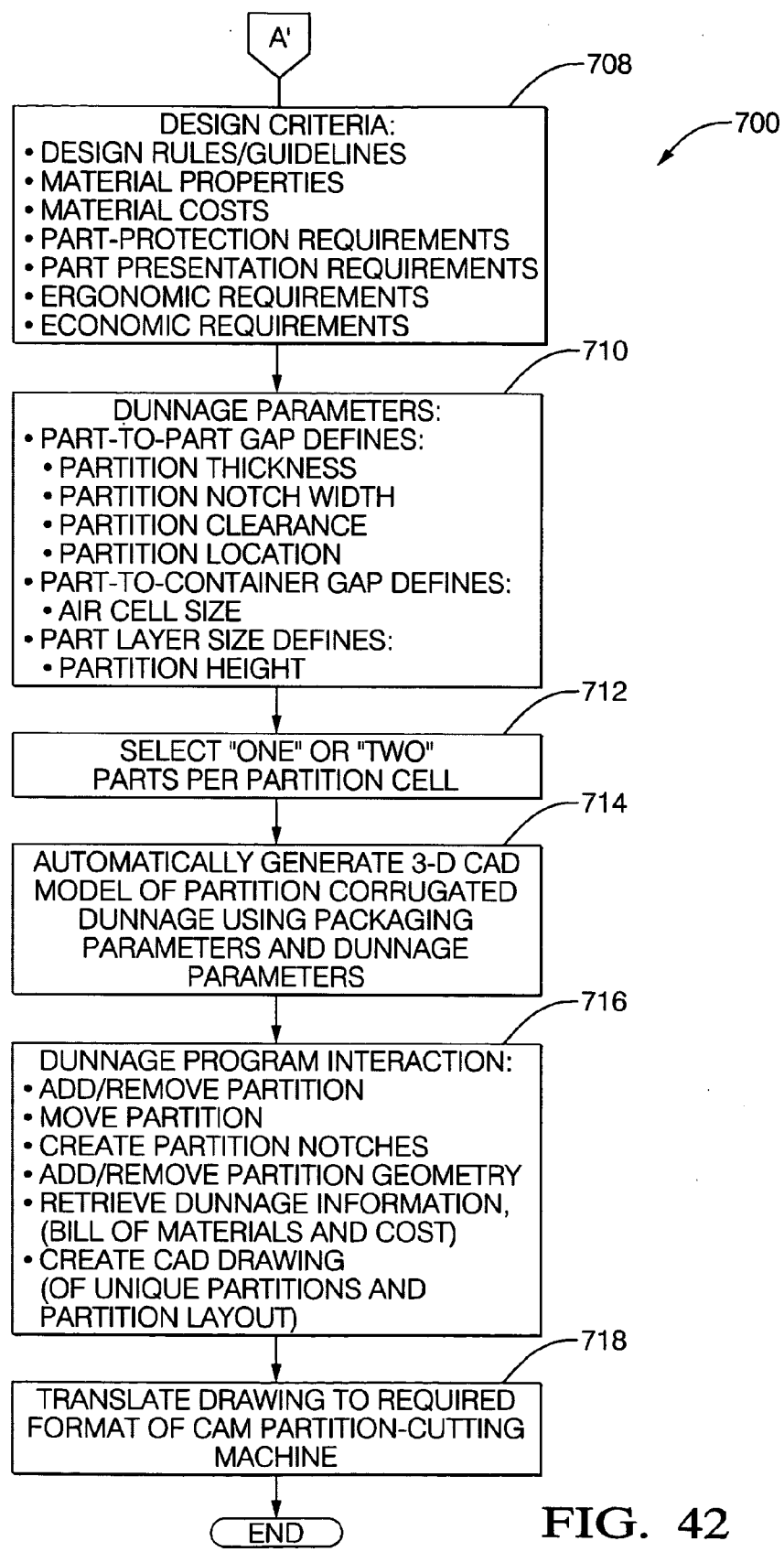
Figure 43:
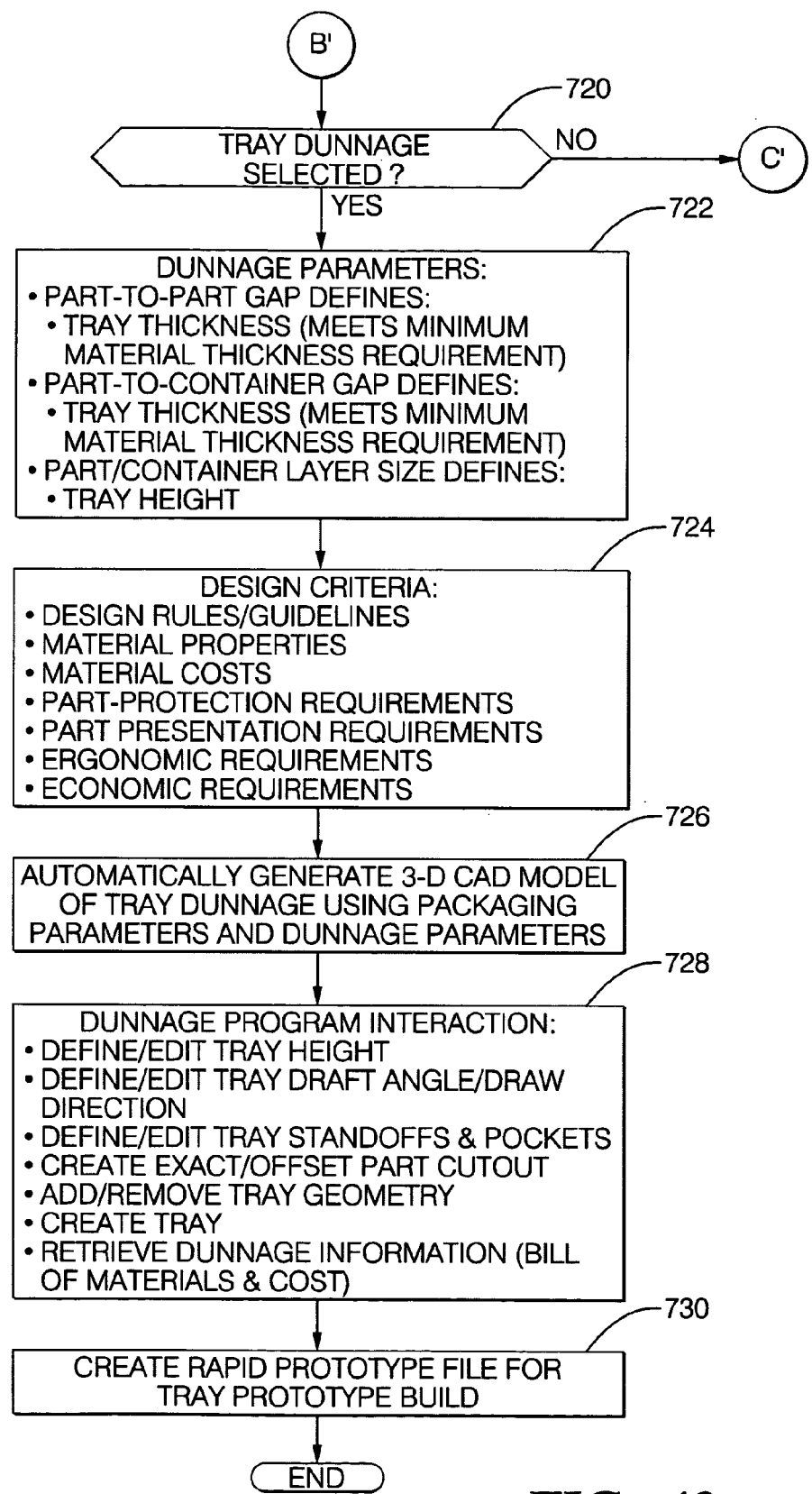
Figure 44:
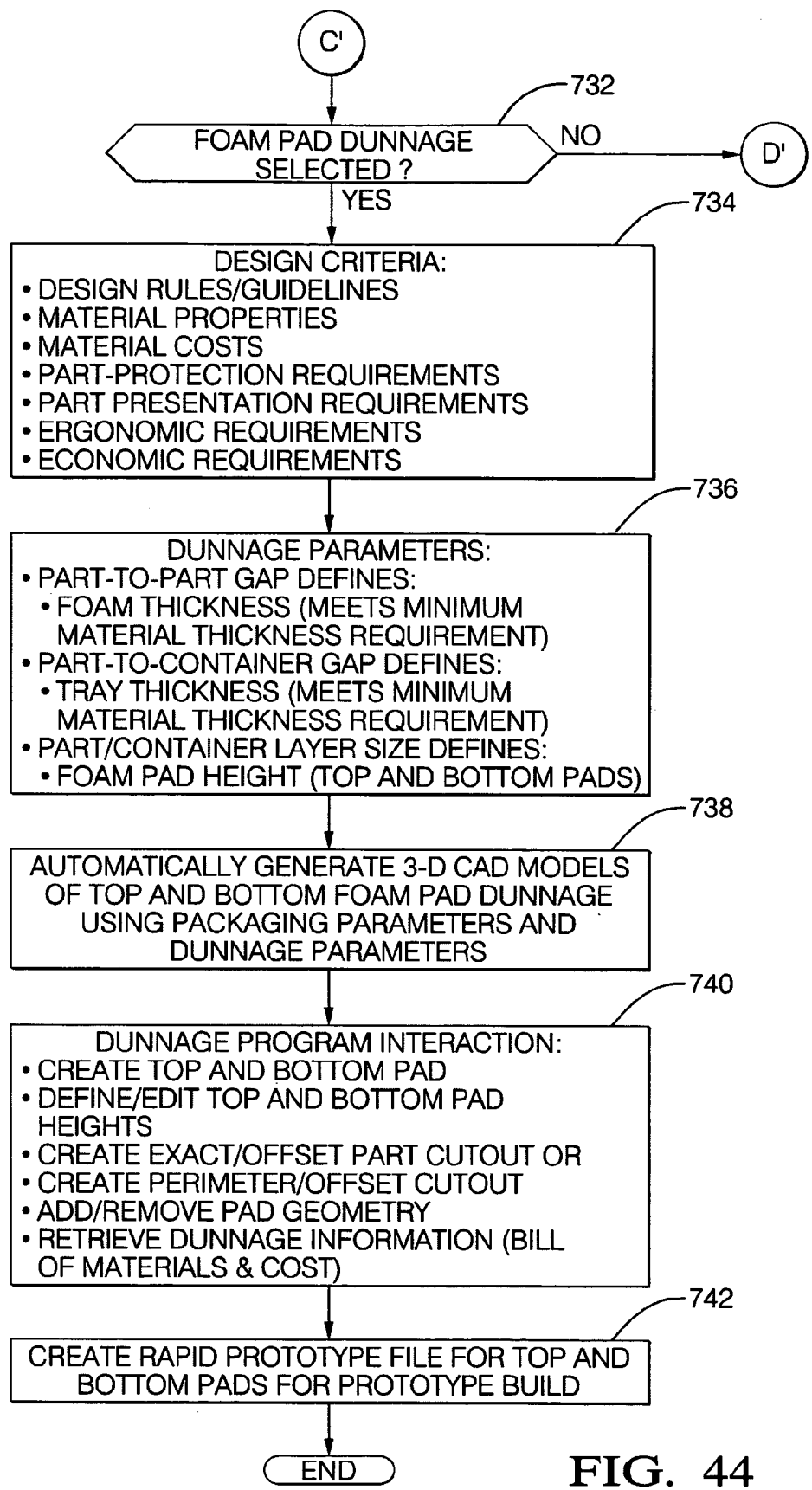
Figure 45:
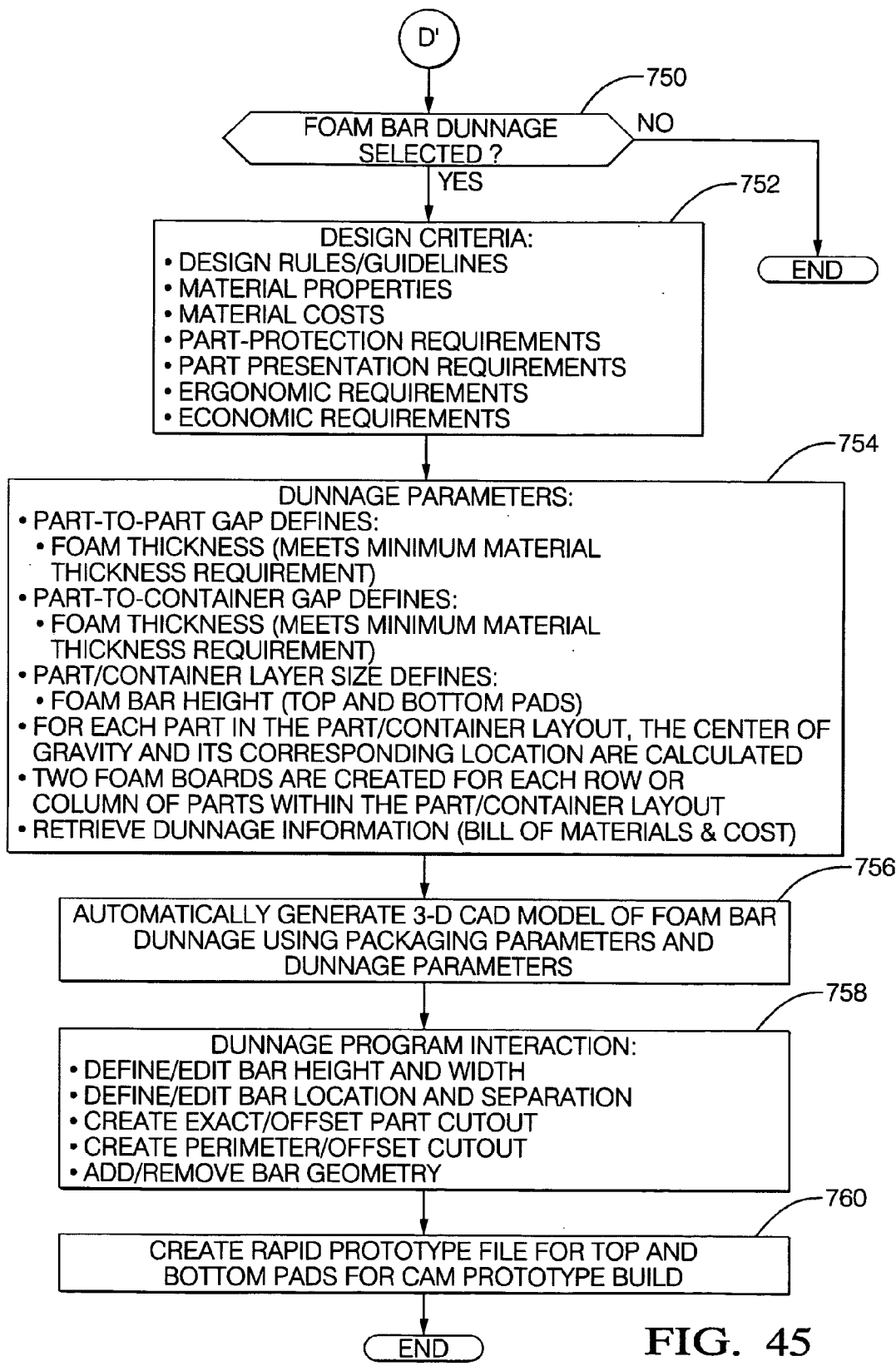

Referring to FIGS. 21 and 34, a logistics subsystem 330 operably communicates with the system 210 for estimating and reducing transportation costs associated with transporting manufactured parts from a departure location to a destination location using an optimized part packaging design.

The logistics subsystem 330 includes a logistics computer server 332, a dunnage supplier computer server 334, a dunnage regulations computer server 336, a container supplier computer server 338, a container regulations computer server 340, a vehicle scheduling computer server 342, a vehicle regulations computer server 344, ship scheduling computer server 346, a ship regulations computer server 348, a storage regulations computer server 350, and a storage scheduling computer server 352.

The logistics computer server 332 is provided to allow a user to input parameters associated with different transportation scenarios for transporting manufactured products from a departure location to a destination location. Thereafter, a user can view estimated transportation costs and/or dunnage costs associated with transporting the manufactured products for each of a plurality of transportation scenarios. Thereafter, the user can select a desired transportation cost. Further, the user can reserve selected transportation vehicles, ships, and storage facilities. The logistics computer server 332 operably communicates with the 3-D packaging optimization computer 212, and the computer servers 334-352.

During operation, the logistics computer server 332 allows a user to specify: (i) a 3-D CAD model of a manufactured part, (ii) a 3-D model of a container for holding the parts during transport, and the (iii) number of parts to be transported. The 3-D packaging optimization computer 212 retrieves a 3-D CAD model of the manufactured part and of the container and executes packaging optimization programs to determine a substantially optimal part packaging design for the parts in the container. The computer 332 allows the user to select a vehicle type for overland transportation and/or a ship for overseas transportation. Thereafter, the logistics computer server 332 calculates a transportation cost for transporting the parts from a departure location to a destination location utilizing the substantially optimal part packaging design, as will be explained in greater detail below.

The dunnage supplier computer server 334 operably communicates with a first database that lists the various available dunnage types that can be utilized for packing and holding the manufactured parts in a storage container. For example, the database can contain a list of the following dunnage types: (i) styrofoam pellets, (ii) cardboard, (iii) saw dust, (iv) plastic bubble wrap, (v) formed plastic members, and (vi) formed styrofoam members. Further, the first database can contain a cost of each of the dunnage types for a predetermined unit volume or a predetermined unit weight. The logistics computer server 332 is configured to query the dunnage supplier computer server 334 for a list of the various types of dunnage. Thereafter, the server 334 is configured to transmit a return message having a list of the dunnage types and associated unit costs to the logistics computer server 332. Upon receipt of the return message, the server 332 is configured to display the list of dunnage types and associated unit costs on a computer monitor 335.

The dunnage regulations computer server 336 operably communicates with a second database that lists the various types of dunnage that can be utilized at various departure locations and destination locations. Government regulatory agencies regulate the types of dunnage that can be utilized in containers within a respective geographic region or location. Thus, it is important that manufacturers transporting parts utilize the types of dunnage allowed within the respective geographic regions or locations in order to comply with the dunnage regulations. The logistics computer server 332 is configured to allow a user to query the dunnage regulations computer server 336 to determine whether a selected type of dunnage can be used at the departure location and the destination location. Thereafter, the server 336 compares the selected dunnage type to the dunnage types associated with the departure location and the destination location in the second database. Then, the server 336 transmits a return message to the logistics computer server 332 indicating whether the selected type of dunnage can be used at the departure location and the destination location.

The container supplier computer server 338 operably communicates with a third database that lists the various types of containers that can be utilized for holding manufactured parts therein. For example, the third database can contain a list of the following containers: trays, racks, returnable packaging, pallets, boxes, hand held containers, collapsible containers, enclosed containers, partially enclosed containers, stackable racks, and trays configured for insertion into containers. The logistics computer server 332 is configured to allow a user to query the container supplier computer server 338 for a list of the various types of containers and their associated 3-D CAD models. Thereafter, the server 334 can transmit a return message containing a list of the container types to the logistics computer server 332. Upon receipt of the return message, the server 332 displays the list of container types on the computer monitor 335.

The container regulations computer server 336 operably communicates with a fourth database that lists the various types of containers that can be utilized at various departure locations and destination locations. Government regulatory agencies regulate the types of containers that can be utilized in storage containers within a respective geographic region or location. Thus, it is important that manufacturers transporting parts utilize the types of containers allowed within the respective geographic regions or locations in order to comply with the container regulations. The logistics computer server 332 is configured to allow a user to query the container regulations computer server 340 to determine whether a selected container can be used at the departure location and the destination location. Thereafter, the server 340 compares the selected container to the container types associated with the departure location and the destination location in the fourth database. Then, the server 340 transmits a return message to logistics computer server 332 indicating whether the selected container can be used at the departure location and the destination location.

The vehicle scheduling computer server 342 operably communicates with a fifth database that: (i) lists various vehicle types available for transporting parts, and (ii) lists the number vehicles, of a particular vehicle type, that are available at a departure location or a destination location. The logistics computer server 332 is configured to allow a user to query the vehicle scheduling computer server 342 to obtain the list of vehicle types. Thereafter, the server 342 can transmit a return message containing the list of vehicle types to the logistics computer server 332. Upon receipt of the return message, the server 332 displays the list of vehicle types on a computer monitor 335.

The vehicle regulations computer server 344 operably communicates with a sixth database that lists the various types of vehicle types that can be utilized at various departure locations and destination locations. Government regulatory agencies regulate the types of vehicle types that can be utilized within a respective geographic region or location. Thus, it is important that manufacturers transporting parts utilize the vehicle types allowed within the respective geographic regions or locations in order to comply with the vehicle regulations. The logistics computer server 332 is configured to allow a user to query the vehicle regulations computer server 344 to determine whether a selected vehicle type can be used at the departure location and the destination location. Thereafter, the server 344 compares the selected vehicle type to the vehicle types associated with the departure location and the destination location in the sixth database. Then, the server 344 transmits a return message to logistics computer server 332 indicating whether the selected vehicle type can be used at the departure location and the destination location.

The ship scheduling computer server 346 operably communicates with a seventh database that lists the ships available for transporting parts that are available at a departure location. The logistics computer server 332 is configured to allow a user to query the ship scheduling computer server 346 to obtain the list of available ships. Thereafter, the server 346 can transmit a return message containing the list of ships to the logistics computer server 332. Upon receipt of the return message, the server 332 displays the list of vehicle types on the computer monitor 335.

The ship regulations computer server 348 operably communicates with an eighth database that lists the various types of ships that can be utilized at various departure locations and destination locations. Government regulatory agencies regulate the types of ships that can be utilized within a respective geographic region or location. Thus, it is important that manufacturers transporting parts utilize the ships allowed within the respective geographic regions or locations in order to comply with the associated regulations. The logistics computer server 332 is configured to allow a user to query the ship regulations computer server 348 to determine whether a selected ship can be used at the ship departure location and a ship destination location. Thereafter, the server 348 compares the selected ship to the ship types associated with the departure location and the destination location in the eighth database. Then, the server 348 transmits a return message to logistics computer server 332 indicating whether the selected ship can be used at the departure location and the destination location.

The storage scheduling computer server 352 operably communicates with a ninth database that lists the dock storage facilities available for storing the parts near a ship departure location. The logistics computer server 332 is configured to allow a user to query the storage scheduling computer server 352 to obtain the list of the dock storage facilities. Thereafter, the server 352 can transmit a return message containing the list of dock storage facilities to the logistics computer server 332. Upon receipt of the return message, the server 332 displays the list of dock storage facilities on the computer monitor 335.

The storage regulations computer server 350 operably communicates with a tenth database that lists the various types storage containers or parts that can be stored at various dock storage facilities at a ship departure location. Government regulatory agencies regulate the types of storage containers or parts that can be stored within a respective dock storage facility. Thus, it is important that manufacturers transporting parts utilize the dock storage facilities that are allowed to store the containers or part types in order to comply with the storage regulations. The logistics computer server 332 is configured to allow a user to query the storage regulations computer server 350 to determine whether a selected container or part type can be stored at a selected dock storage facility. Thereafter, the server 350 compares the selected container type or part type to the allowable containers or part types in the tenth database. Then, the server 350 transmits a return message to logistics computer server 332 indicating whether the selected storage container type or parts can be stored at the selected dock storage facility.

Referring to FIGS. 34-40, a method for estimating transportation costs, and for obtaining an optimal transportation cost, associated with transporting parts between locations will now be explained. The following method can be implemented utilizing the logistics subsystem 330 in conjunction with the 3-D packaging optimization computer 212. Although, the method will be explained with reference to a single container, it should be understood that the method could be iteratively performed to determine transportation costs associated with a plurality of the other containers. An advantage of the following method is that a user can determine transportation costs for each of a plurality of packaging designs in order to select a desired packaging design for reducing and/or minimizing transportation costs.

At step 380, a user of the logistics computer server 332 selects at least one 3-D CAD model of a manufactured part for transportation, using a computer input device, such as a keyboard 333 for example, wherein the selection is transmitted to the 3-D packaging optimization computer 212.

At step 382, a user of the logistics computer server 332 selects a departure location, a destination location, and an arrival date, using the keyboard 333.

At step 384, the logistics computer server 332 queries a container supplier computer 338 server to obtain a list of available containers. Thereafter, the server 338 transmits a return message containing the container list to the server 332 that is then displayed on the computer monitor 335.

At step 385, the user selects a 3-D CAD model of a container identified in the container list, using the keyboard 333.

At step 386, the logistics computer server 332 queries the container regulations computer server 340 to determine whether the selected container type can be used at both the departure location and the destination location.

At step 387, the container regulations computer server 340 searches a database to determine whether the selected container type is listed for use at both the departure location and the destination location. If the selected container type can be used at both the departure location and the destination location, the method advances to step 388. Otherwise, the method returns to step 385.

At step 388, the 3-D packaging optimization computer 212 automatically generates a plurality of 3-D part packaging designs for the receiving region using a 3-D packaging optimization system wherein each 3-D part packaging design comprises a distinct orientation or positioning of at least the 3-D CAD model of the manufactured part and a first 3-D CAD model and selecting a substantially optimal 3-D part packaging design from the plurality of 3-D part packaging designs. The computer 212 can also calculate a packing efficiency of the container utilizing the following equation:

$$\text{Packing efficiency} = \frac{\text{volume of parts stored in a container}}{\text{volume of the container}}$$

At step 392, the logistics computer server 332 queries the dunnage supplier computer server 334 to obtain a list of available dunnage types. Thereafter, the server 334 transmits a return message containing the list of available dunnage types to the server 332 that is then displayed on the computer monitor 335.

At step 394, a user of the logistics computer server 332 selects a dunnage type to be used as a packing material in the container from the list of available dunnage types, using the keyboard 333.

At step 396, the logistics computer server 330 queries the dunnage regulations computer server 336 to determine whether the dunnage can be used at both the departure location and the destination location.

At step 398, the dunnage regulations computer server 336 searches a database to determine whether the selected dunnage type is listed for use at both the departure location and the destination location. In particular, the database contains information relating to the types of returnable dunnage, non-returnable dunnage, re-cyclable dunnage, and dunnage materials, that can be utilized at both the departure location and the destination location. If the selected dunnage type cannot be used at both the departure location and the destination location, the method advances to step 400. Otherwise, the method advances to step 408.

At step 400, the user of logistics computer server 332 inputs whether the dunnage type should be automatically selected by the 3-D packaging optimization computer 212. If the value of step 400 equals "yes", the method advances to step 404. Otherwise, the method advances to step 402.

At step 402, the user inputs a new dunnage type that is added to the list of available dunnage types stored in the dunnage supplier computer server 334. Thereafter, the method returns to step 394.

Referring again to step 400, when the user indicates that the dunnage type should be automatically selected, the method advances to step 404 wherein the 3-D packaging optimization computer 212 selects a dunnage type or automatically generates a dunnage design based on the substantially optimal 3-D part packaging design and the 3-D CAD model of the container.

At step 408, the 3-D packaging optimization computer 212 retrieves the transportation handling requirements, such as a drop height, from the packaging engineering logistics computer server 332.

At step 420, the 3-D packaging optimization computer 212 performs a stress analysis using the 3-D CAD model of the manufactured part to determine if the part would be degraded or damaged if exposed to the transportation handling requirements.

At step 421, the 3-D packaging optimization computer 212 makes a determination on whether the part types would not be degraded or broken if exposed to transportation handling requirements. If the value of step 421 equals "yes" the method advances to step 422. Otherwise, the method returns to step 394.

At step 422, a user inputs a desired number of manufactured parts to be transported from the departure location to the destination location, and a desired departure date for transporting the parts, utilizing the keyboard 333.

At step 423, the logistics computer server 332 queries a vehicle scheduling computer server 342 to obtain a list of available vehicle types that can be utilized for transporting the manufactured parts.

At step 424, a user selects a desired vehicle type having a predetermined volume and tonnage capacity for transporting the containers, utilizing the keyboard 333.

At step 425, the logistics computer server 332 queries the vehicle regulations computer server 344 to determine whether the selected vehicle type can be used at both the departure location and the destination location.

At step 426, the vehicle regulations computer server 344 searches a database to determine whether the selected vehicle type is listed for use at both the departure location and the destination location and transmits such determination to the logistics computer server 332. If the selected vehicle type can be used at both the departure location and the destination location, the method advances to step 430. Otherwise, the method returns to step 424.

At step 430, the 3-D packaging optimization computer 212 determines a number of containers to be utilized based on the substantially optimal 3-D part packaging design and the number of manufactured parts to be transported.

At step 432, the 3-D packaging optimization computer 212 determines the optimal number of containers that can be transported in the cargo volume of the desired vehicle type with a 3-D packaging optimization system utilizing the 3-D CAD model of the container and a vehicle cargo volume. The computer 212 transmits the calculated number of storage containers to the logistics computer server 332. The computer 212 can also calculate a number of manufactured parts that can be transported by the vehicle based on the number of storage containers.

At step 434, the logistics computer server 332 calculates the number of vehicles for overland transportation of the containers based on: (i) the number of the containers that can be transported in each vehicle, and (ii) the number of containers to be transported.

At step 436, the logistics computer server 332 calculates the overland transportation cost based on the number of vehicles.

At step 438, the logistics computer server 332 sends a reservation request for the calculated number of the desired vehicle type to the vehicle scheduling computer server 342.

At step 460, the logistics computer server 332 makes a determination as to whether a vehicle reservation confirmation was received from the vehicle scheduling computer server 342. If the value of step 460 equals "yes", the method advances to step 461. Otherwise, the method returns to step 424.

At step 461, a user of the logistics computer server 332 inputs whether overseas transportation is needed, utilizing the keyboard 333. If overseas transportation is needed, the method advances to step 462. Otherwise, the method advances to step 508 explained below.

At step 462, the user of the logistics computer server 332 inputs the desired cargo volume, desired tonnage for shipment, and the shipping departure location, utilizing the keyboard 333.

At step 463, the user of logistics computer server 332 inputs the arrival date of the vehicles having the containers to the shipping departure location, utilizing the keyboard 333.

At step 466, the logistics computer server 332 queries the ship scheduling computer server 346 to obtain a list of available ships that can be utilized for transporting the manufactured parts.

At step 468, the user of logistics computer server 332 selects one or more ships having a predetermined volume and tonnage capacity for transporting the containers, utilizing the keyboard 333.

At step 470, the logistics computer server 332 queries the ship regulations computer server 348 to determine whether the selected ship can be used at both a ship departure location and a ship destination location.

At step 471, the ship regulations computer server 348 searches a database to determine whether the selected ship can be used at both the departure location and the destination location. The determination of step 471 is transmitted to the logistics computer server 332. If the ship can be used at both the departure location and the destination location, the method advances to step 472. Otherwise, method returns to step 468.

At step 472, the logistics computer server 332 calculates an overseas shipping cost based on the one or more selected ships.

At step 474, the logistics computer server 332 sends a reservation request for the one or more selected ships to the ship scheduling computer server 346.

At step 476, the logistics computer server 332 makes a determination as to whether a shipping reservation confirmation was received from the ship scheduling computer server 346. If the value of step 476 equals "yes", the method advances to step 490. Otherwise, the method returns to step 468.

At step 490, a user of the logistics computer server 332 inputs whether dock storage is needed, utilizing the keyboard 333. If dock storage is needed, the method advances to step 492. Otherwise, the method advances to step 508 explained below.

At step 492, the user of logistics computer server 332 inputs a time interval in which the containers are to be stored at a dock storage facility, using the keyboard 333.

At step 494, the logistics computer server 332 queries a storage scheduling computer server 352 to obtain a list of available dock storage facilities that can be utilized for storing the manufactured parts. Thereafter, the server 352 transmits a return message containing the list of dock storage facilities to the server 332 that is then displayed on the computer monitor 335.

At step 496, the user of logistics computer server 332 selects a dock storage facility for storing the manufactured parts, utilizing the keyboard 333.

At step 498, the logistics computer server 332 queries the storage regulations computer server 350 to verify that the manufactured parts can be stored at the selected dock storage facility.

At step 500, the storage regulations computer server 350 makes a determination as to whether the parts can be stored at the selected dock storage facility. The value of step 500 equals "yes", the method advances to step 502. Otherwise, the method returns to step 496.

At step 502, the logistics computer server 332 sends a reservation request for storing the containers at the selected dock storage facility to the storage scheduling computer server 352.

At step 504, the logistics computer server 332 makes a determination as to whether a dock storage reservation confirmation was received from the storage scheduling computer server 352. If the value of step 504 equals "yes", the method advances to step 506. Otherwise, the method returns to step 496.

At step 506, the logistics computer server 332 calculates a dock storage cost based on the docket storage time interval, the number of containers, and the selected dock storage facility.

At step 508, the logistics computer server 332 calculates a dunnage cost based on the number of containers and the amount of dunnage needed for each container.

Finally, at step 510, the logistics computer server 332 calculates the total transportation costs for transporting the manufactured parts based on: (i) the overland transportation cost, (ii) the dunnage cost, (iii) the overseas shipping cost if any, and (iv) the dock storage cost if any.

The system 210 for determining a substantially optimal packaging design for a container provides substituted advantages over other systems and methods. The system 210 provides substantially optimized part packaging designs that provide substantial cost savings over non-optimized part packaging designs developed manually. In particular, the optimized part packaging designs provide one or more of: (i) an increased part density within a storage container, (ii) a decreased time in designing dunnage members, and (iii) a reduced amount of parts being damaged due to an optimal dunnage design. Further, the decreased design time relating to the part packaging design and the dunnage member design result in a substantial lifecycle cost savings associated with the part. Still further, because the system 210 utilizes CAD models, instead of prototype parts, substantial cost savings is obtained since no prototype parts need to be built for each proposed dunnage design. Still further, the system 210 allows a manufacturer to utilize a predetermined container for multiple part types that results in decreased container design costs. Still further, the system 210 provides for cost savings on an assembly-line by providing an optimal part packaging design that allows for the easy removal of parts from a container.

Further, the logistics subsystem 330 operably communicates with the system 210 to obtain an optimal transportation cost associated with an optimized part packaging design. In particular, the subsystem 330 utilizes the optimized part packaging design to obtain an optimal transportation cost by obtaining: (i) the lowest vehicle transportation cost, (ii) the lowest ship transportation cost, (iii) the lowest dunnage cost, and (iv) the lowest dock storage cost. Thus, the logistics subsystem 330 provides for ongoing transportation cost savings associated with a part during the entire lifecycle of the part. Further, the logistics subsystem 330 allows engineers to quickly develop a request for quote ("RFQ") documents, based upon the optimal part packaging design including proposed packaging and transportation costs. Still further, the subsystem 330 allows sales representatives to quickly determine transportation costs associated with purchased or sold parts.

In summation, collaboration tools as well as the simulation programs discussed herein are used to transfer information and/or data to all stakeholders in the engineering/planning departments that are affected by, and/or effecting, the part/containerization input/output data. These collaboration tools/method enable the development of better quality data for part-packaging optimization, part-protection, and cost. Further, because the collaboration tool is accessible and capable of providing information via the World Wide Web (Internet), these collaboration tools/method are made available for web-based connectivity, communication, utilization of the packaging optimization program with application service providers (ASP), updates, dissemination of data, etc.

The packaging optimization solutions of exemplary embodiments of the present invention are not limited to production-part shipping containers. Rather, any type of container whose information is capable of being provided to the simulation program for consideration in the nesting process may be utilized. Examples of contemplated containers include but are not limited to: inter-modal containers, racks for post-processing parts, etc.

In addition, and referring to the embodiments illustrated in FIGS. 1-22, FIGS. 25A-D, FIG. 26 and FIGS. 33A-F, design processes are optimized wherein part layout for a multiplicity of parts each being related to the other (e.g., an item that is transported disassembled and is assembled at the point of delivery or end-user wherein a unique packaging configuration is utilized to assist assembly at the point of delivery) accordingly, these modeling simulations using collaborative engineering techniques allows the packaging configuration to be optimized for a particular application. Further, such an application will require the use of particular dunnage (e.g., a multiple cavity tray and related forming tool) that can also be optimized through the use of the packaging optimization program.

Further, unique product configuration or desired product configuration can be imported into the simulation process through the use of collaboration tools whereby a particular product angular positioning is desired in order subject the same to an automated (e.g., robotic) container access at the final destination point.

In addition, and referring to the embodiments illustrated herein actual design processes can be optimized and varied wherein part layout for a particular container allows for a significant cost reduction along the entire product lifecycle. Therefore, design engineers provided with this information early on in the design process of the particular product and accordingly these design engineers may be able to alter a design configuration not readily apparent to the particular application but is significant in an optimization packaging configuration. Accordingly, and through the collaborative aspects of exemplary embodiments the present invention real-time data concerning transportation can be provided to design engineers at the point of novelty or product design.

Accordingly, and through the implementation of the method, systems and software of FIGS. 1-45, at least the following advantages are provided by exemplary embodiments of the present invention: optimum part packaging design and part orientation is established quickly using a 3-D simulation program; a reduction in cost and timing of the development process for the containerization of production parts is also obtained; a reduction in freight cost is also obtained; a reduction in material handling activity is achieved (e.g., parts are properly oriented from the operator's perspective); a reduction in prototype container builds and cost is achieved by running simulations wherein optimal configurations are achieved; and alternative part packaging designs can be determined without additional packaging constraints. This system and method of the present invention can be used for any part/assembly modeled in a 3-D CAD software. Also, a web-based interactive (collaborative engineering) connectivity and communication enables utilization, updates and dissemination of packaging results/data.

In exemplary embodiments an exact 3-D CAD model (e.g., Unigraphics or other equivalent universal computer code language) is used in the investigation for determining: part-placement patterns, orientations, and part-packaging optimization. By simulating the packaging for optimization the methods and systems disclosed herein enables packaging plans to be developed and pulled ahead in program timing.

Further, the use of collaboration tools/methods, proper part-packaging optimization and planning enables at least the following advantages: lowest freight/transportation costs; minimization of the containers needed for a production program; and prevention of double handling of parts by plant floor personnel.

Additionally, the simulation program produces hundreds of efficient part-packaging design solutions and dunnage designs without the additional constraints of whether manufacturing, packaging, dunnage and container styles, freight method, etc. will be able to accommodate these designs as they will now be part of the collaborative process.

These efficient part-packaging design solutions enable early product feedback as no formal prints are necessary and since the products are still being designed, the design solutions are easily transmitted in CAD compatible format. In addition, collaborative engineering with access to the simulation programs provides access or allows packaging and freight costs to be saved as well as being included in production bids. Dunnage designs and costs are optimized and obtainable for the same applications and dunnage designs can be forwarded to dunnage companies early on in the product life cycle. Transportation logistics is improved as containers are selected, if applicable, from existing stock and are managed early on in the product life cycle. Cost savings and warehouse management is provided with lower shipping volumes since the containers can be optimized for product configurations to match transportation needs. Thus, less warehouse space is needed and fewer containers are tracked and documented.

Factory floor operations are also improved as the container orientations can be optimized to minimize labor require for removal or reorientation of parts.

The algorithms for performing the various steps and methods disclosed herein can be embodied in the form of computer-implemented processes and apparatuses for practicing those processes. The algorithms can also be embodied in the form of computer program code containing instructions embodied in tangible media, such as floppy diskettes, CD-ROMs, hard drives, or any other computer-readable storage medium, wherein, when the computer program code is loaded into and executed by a computer and/or equivalent device, the computer becomes an apparatus for practicing the invention. The algorithms can also be embodied in the form of computer program code, for example, whether stored in a storage medium, loaded into and/or executed by a computer, or as a data signal transmitted whether a modulated carrier wave or not, over some transmission medium, such as electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The computer-readable storage medium will include a series of computer-executable instructions, as described herein, which will allow exemplary embodiments of the present invention to be implemented. These instructions may reside, for example, in RAM of the computer. Alternatively, the instructions may be contained on a data storage device with a computer readable medium, such as a computer diskette. Or, the instructions may be stored on a magnetic tape, conventional hard disk drive, electronic read-only memory, optical storage device, or other appropriate data storage device. In an illustrative embodiment of the invention, the computer-executable instructions comprise lines of GRIP software code or C++ software code. The technical effect of the executed instructions is to determine an optimal packaging design for a container.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It should also be noted that the terms "first", "second", and "third" and the like may be used herein to modify elements performing similar and/or analogous functions. These modifiers do not imply a spatial, sequential, or hierarchical order to the modified elements unless specifically stated.

What is claimed is:

1. A method for determining a packaging design for one or more containers, comprising:
    selecting at least one 3-D CAD model of a manufactured part;
    selecting a first 3-D CAD model of a first container defining a first receiving region;
    automatically generating a first plurality of 3-D part packaging designs for the first receiving region wherein each 3-D part packaging design comprises a distinct orientation or positioning of at least the 3-D CAD model of the manufactured part and a second 3-D CAD model and selecting a first 3-D part packaging design from the first plurality of 3-D part packaging designs; and
    generating a first dunnage design based on the first 3-D part packaging design and the first receiving region;
    wherein a first volume defined by the first 3-D part packaging design and the first dunnage design can be held within the first receiving region.

2. The method of claim 1, wherein selecting the first 3-D part packaging design, comprises:
    selecting one of the first plurality of 3-D part packaging designs based on at least one parameter.

3. The method of claim 2, wherein the at least one parameter comprises at least one of a number of manufactured parts in a 3-D part packaging design, a weight of a 3-D part packaging design, a weight a dunnage design, a cost of a dunnage design, a shape of a dunnage design, a weight of a container, a cost of a container, a packaging efficiency of the container.

4. The method of claim 1, wherein the second 3-D CAD model comprises another 3-D CAD model of the manufactured part.

5. The method of claim 1, wherein the second 3-D CAD model comprises a 3-D CAD model of another manufactured part.

6. The method of claim 1, further comprising:
    selecting a second 3-D CAD model of a second container defining a second receiving region;
    automatically generating a second plurality of 3-D part packaging designs for the second receiving region wherein each 3-D part packaging design comprises a distinct orientation or positioning of at least the 3-D CAD model of the manufactured part and the second 3-D CAD model and selecting a second 3-D part packaging design from the second plurality of 3-D part packaging designs; and
    generating a second dunnage design based on the second 3-D part packaging design and the second receiving region;
    wherein a second volume defined by the second 3-D part packaging design and the second dunnage design can be held within the second receiving region.

7. A system for determining a packaging design for one or more containers, comprising:
    a database storing a 3-D CAD model of a manufactured part and a first 3-D CAD model of a first container defining a first receiving region; and
    a computer operably coupled to the database, the computer configured to retrieve both the 3-D CAD model of the manufactured part and the first 3-D CAD model of the first container from the database, the computer further configured to automatically generate a first plurality of 3-D part packaging designs for the first receiving region wherein each 3-D part packaging design comprises a distinct orientation or positioning of at least the 3-D CAD model of the manufactured part and a second 3-D CAD model and to select a first 3-D part packaging design from the first plurality of 3-D part packaging designs, the computer further configured to generate a first dunnage design based on the first 3-D part packaging design and the first receiving region, wherein a first volume defined by the first 3-D part packaging design and the first dunnage design can be held within the first receiving region.

8. The system of claim 7, wherein the computer being configured to select the first 3-D part packaging design comprises:
the computer being further configured to select one of the first plurality of 3-D part packaging designs based on at least one parameter.

9. The system of claim 8, wherein the at least one parameter comprises at least one of a number of manufactured parts in the 3-D part packaging design, a weight of the 3-D part packaging design, a weight of a dunnage design, a cost of the dunnage design, a shape of the dunnage design, a weight of a container, a cost of the container, and a packaging efficiency.

10. The system of claim 7, wherein the second 3-D CAD model comprises another 3-D CAD model of the manufactured part.

11. The system of claim 7, wherein the second 3-D CAD model comprises a 3-D CAD model of another manufactured part.

12. The system of claim 7, wherein:
the computer is further configured to retrieve a second 3-D CAD model of a second container defining a second receiving region from the database, the computer further configured to automatically generate a second plurality of 3-D part packaging designs for the second receiving region wherein each 3-D part packaging design comprises a distinct orientation or positioning of at least the 3-D CAD model of the manufactured part and the second 3-D CAD model and selecting a second 3-D part packaging design from the second plurality of 3-D part packaging designs, the computer further configured to generate a second dunnage design based on the second 3-D part packaging design and the second receiving region, wherein a second volume defined by the second 3-D part packaging design and the second dunnage design can be held within the second receiving region.

13. A method for estimating transportation costs for transporting manufactured parts from a departure location to a destination location, comprising:
selecting at least one 3-D CAD model of a manufactured part;
determining a number of manufactured parts to be transported from the departure location to the destination location;
selecting a vehicle type for transporting the manufactured parts;
selecting a 3-D CAD model of a container defining a receiving region;
automatically generating a plurality of 3-D part packaging designs for the receiving region wherein each 3-D part packaging design comprises a distinct orientation or positioning of at least the 3-D CAD model of the manufactured part and a first 3-D CAD model and selecting a first 3-D part packaging design from the plurality of 3-D part packaging designs;
automatically determining a number of containers for transporting the manufactured parts based on the first 3-D part packaging design and the number of the manufactured parts to be transported;
automatically determining a number of vehicles for transporting the manufactured parts based on the number of containers to be transported and a number of containers that can be held with the cargo volume of the selected vehicle type; and
automatically determining an overland transportation cost associated with transporting the parts from the departure location to the destination location based on the number of vehicles.

14. The method of claim 13, further comprising automatically determining the number of containers that can be held within the cargo volume of the selected vehicle type based on the type of the container and the vehicle cargo volume.

15. The method of claim 13, further comprising:
selecting one or more ships having a predetermined volume and tonnage capacity for transporting the number of containers; and
automatically determining a shipping cost based on the number of vehicles and the selected one or more ships.

16. The method of claim 15, further comprising:
determining an amount of dunnage required for the transporting the manufactured parts; and
automatically determining a dunnage cost based on the amount of dunnage.

17. The method of claim 16, further comprising:
determining a time interval in which the number of containers are stored in a dock storage facility; and,
automatically determining a dock storage cost based on the time interval and the number of containers.

18. The method of claim 17, further comprising automatically determining a total transportation cost based on the overland transportation cost, the shipping cost, the dunnage cost, and the dock storage cost.

19. The method of claim 13, wherein the second 3-D CAD model comprises another 3-D CAD model of the manufactured part.

20. The method of claim 13, wherein the second 3-D CAD model comprises a 3-D CAD model of another manufactured part.

21. A method for estimating a cost of dunnage for protecting parts while transporting manufactured parts, comprising:
selecting at least one 3-D CAD model of a manufactured part;
determining a desired number of the manufactured parts to transport;
selecting a 3-D CAD model of a container defining a receiving region;
automatically generating a plurality of 3-D part packaging designs for the receiving region wherein each 3-D part packaging design comprises a distinct orientation or positioning of at least the 3-D CAD model of the manufactured part and a second 3-D CAD model and selecting a first 3-D part packaging design from the plurality of 3-D part packaging designs;
selecting a type of dunnage to be used in the container;
automatically determining a desired amount of dunnage for the selected type of container based on the first 3-D part packaging design and the type of container; and
automatically determining a cost of the selected type of dunnage based on the amount of the dunnage to be used in the container and a number of the containers to be utilized for holding the desired number of manufactured parts.

22. The method of claim 21, wherein the selected dunnage type comprises at least one of a partition corrugated dunnage, a foam pad dunnage, a foam bar dunnage, and a tray dunnage.

23. The method of claim 21, wherein the first 3-D part packaging design contains a substantially maximum number of the manufactured parts that can be transported within the selected type of container.

24. The method of claim 21, wherein the selected dunnage type is utilized at both a departure location and a destination location.

25. The method of claim 21, wherein the second 3-D CAD model comprises another 3-D CAD model of the manufactured part.

26. The method of claim 21, wherein the second 3-D CAD model comprises a 3-D CAD model of another manufactured part.

27. A storage medium encoded with machine-readable program code for determining a packaging design for one or more containers, the program code including instructions for causing a processor to implement a method, comprising:

selecting at least one 3-D CAD model of a manufactured part;

selecting a first 3-D CAD model of a first container defining a first receiving region;

automatically generating a first plurality of 3-D part packaging designs for the first receiving region wherein each 3-D part packaging design comprises a distinct orientation or positioning of at least the 3-D CAD model of the manufactured part and a second 3-D CAD model and selecting a first 3-D part packaging design from the first plurality of 3-D part packaging designs; and generating a first dunnage design based on the first 3-D part packaging design and the first receiving region;

wherein a first volume defined by the first 3-D part packaging design and the first dunnage design can be held within the first receiving region.

28. A storage medium encoded with machine-readable program code for estimating transportation costs for transporting manufactured parts from a departure location to a destination location, the program code including instructions for causing a processor to implement a method, comprising:

selecting at least one 3-D CAD model of a manufactured part;

determining a number of manufactured parts to be transported from the departure location to the destination location;

selecting a vehicle type for transporting the manufactured parts;

selecting a 3-D CAD model of a container defining a receiving region;

automatically generating a plurality of 3-D part packaging designs for the receiving region wherein each 3-D part packaging design comprises a distinct orientation or positioning of at least the 3-D CAD model of the manufactured part and a first 3-D CAD model and selecting a first 3-D part packaging design from the plurality of 3-D part packaging designs;

automatically determining a number of containers for transporting the manufactured parts based on the first 3-D part packaging design and the number of the manufactured parts to be transported;

automatically determining a number of vehicles for transporting the manufactured parts based on the number of containers to be transported and a number of containers that can be held with the cargo volume of the selected vehicle type; and automatically determining an overland transportation cost associated with transporting the parts from the departure location to the destination location based on the number of vehicles.

29. A storage medium encoded machine-readable program code for estimating a cost of dunnage for protecting parts while transporting manufactured parts, the program code including instructions for causing a processor to implement a method, comprising:

selecting at least one 3-D CAD model of a manufactured part;

determining a desired number of the manufactured parts to transport;

selecting a 3-D CAD model of a container defining a receiving region;

automatically generating a plurality of 3-D part packaging designs for the receiving region wherein each 3-D part packaging design comprises a distinct orientation or positioning of at least the 3-D CAD model of the manufactured part and a second 3-D CAD model and selecting a first 3-D part packaging design from the plurality of 3-D part packaging designs;

selecting a type of dunnage to be used in the container;

automatically determining a desired amount of dunnage for the selected type of container based on the first 3-D part packaging design and the type of container; and automatically determining a cost of the selected type of dunnage based on the amount of the dunnage to be used in the container and a number of the containers to be utilized for holding the desired number of manufactured parts.

* * * * *